US008542228B2

(12) United States Patent
Sugihara et al.

(10) Patent No.: US 8,542,228 B2
(45) Date of Patent: Sep. 24, 2013

(54) LIQUID CRYSTAL DISPLAY, LIQUID CRYSTAL DISPLAY DRIVING METHOD, AND TELEVISION RECEIVER UTILIZING A PRELIMINARY POTENTIAL

(75) Inventors: Toshinori Sugihara, Osaka (JP); Atsushi Ban, Osaka (JP); Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 329 days.

(21) Appl. No.: 12/735,171

(22) PCT Filed: Nov. 11, 2008

(86) PCT No.: PCT/JP2008/070494
§ 371 (c)(1), (2), (4) Date: Jun. 18, 2010

(87) PCT Pub. No.: WO2009/084332
PCT Pub. Date: Jul. 9, 2009

(65) Prior Publication Data

US 2010/0265410 A1 Oct. 21, 2010

(30) Foreign Application Priority Data

Dec. 27, 2007 (JP) ................................. 2007-338260

(51) Int. Cl.
*G06F 3/038* (2013.01)
*G09G 3/36* (2006.01)
*G09G 5/02* (2006.01)
*G02F 1/1343* (2006.01)

(52) U.S. Cl.
USPC ............. 345/215; 345/96; 345/100; 345/209; 345/694; 349/139; 349/144

(58) Field of Classification Search
USPC ................... 345/87–104, 204, 209, 215, 694; 349/77, 139, 143–144, 149, 152
See application file for complete search history.

(56) References Cited

U.S. PATENT DOCUMENTS 6,211,851 B1 * 4/2001 Lien et al. ....................... 345/89
6,552,706 B1 4/2003 Ikeda et al.

(Continued)

FOREIGN PATENT DOCUMENTS

EP 1 383 105 1/2004
EP 1 564 714 8/2005

(Continued)

OTHER PUBLICATIONS

Election of Species Requirement for corresponding U.S. Appl. No. 12/735,033 mailed Nov. 21, 2012.

(Continued)

*Primary Examiner* — Bipin Shalwala
*Assistant Examiner* — Keith Crawley
(74) *Attorney, Agent, or Firm* — Harness, Dickey & Pierce, P.L.C.

(57) ABSTRACT

In a liquid crystal display, a first data signal line and a second data signal line are provided for each pixel column. In at least one embodiment, in a case where every two pixels in the pixel column are paired, one of two pixels in each pair is connected with the first data signal line and the other of the two pixels is connected with the second data signal line, two scanning signal lines respectively connected with the two pixels are simultaneously selected during one horizontal scanning period so that signal potentials are written into the two pixels from the first data signal line and the second data signal line, respectively, during each horizontal scanning period, supply of the signal potentials to the first data signal line and the second data signal line is performed after supply of preliminary potentials to the first data signal line and the second data signal line. This allows improving the display quality of a liquid crystal display in which a larger size, higher definition, or higher-speed driving etc. makes full charging of pixels difficult even when simultaneous scanning.

28 Claims, 58 Drawing Sheets

(56) References Cited

U.S. PATENT DOCUMENTS

| | | | | |
|---|---|---|---|---|
| 2002/0003522 | A1* | 1/2002 | Baba et al. | 345/89 |
| 2004/0046901 | A1 | 3/2004 | Matsuoka et al. | |
| 2005/0007324 | A1 | 1/2005 | Inada | |
| 2005/0122441 | A1* | 6/2005 | Shimoshikiryoh | 349/38 |
| 2005/0219188 | A1* | 10/2005 | Kawabe et al. | 345/94 |
| 2006/0044241 | A1* | 3/2006 | Yuh-Ren et al. | 345/89 |
| 2007/0132684 | A1 | 6/2007 | Baek et al. | |

FOREIGN PATENT DOCUMENTS

| | | | |
|---|---|---|---|
| JP | 10-253987 | A | 9/1998 |
| JP | 2004-233949 | A | 8/2004 |
| JP | 2005-31202 | A | 2/2005 |
| JP | 2006-106062 | A | 4/2006 |
| JP | 2007-256540 | A | 10/2007 |
| JP | 2007-298769 | A | 11/2007 |

OTHER PUBLICATIONS

International Search Report.

Restriction Requirement dated May 30, 2012 for corresponding U.S. Appl. No. 12/735,033.

Office Action for corresponding U.S. Appl. No. 12/735,033 mailed Apr. 29, 2013.

* cited by examiner (a)

FIG. 59

| | MODE A | MODE B | MODE C | MODE D | MODE E | MODE F | MODE G |
|---|---|---|---|---|---|---|---|
| POWER CONSUMPTION AND GENERATION OF HEAT | INTERMEDIATE | LARGE | INTERMEDIATE | RATHER SMALL | INTERMEDIATE | SMALL | INTERMEDIATE -LARGE |
| SENSORY EVALUATION | ○ | ◎ | ○ | ○~△ | ○ | △ | ◎ |

LIQUID CRYSTAL DISPLAY, LIQUID CRYSTAL DISPLAY DRIVING METHOD, AND TELEVISION RECEIVER UTILIZING A PRELIMINARY POTENTIAL

TECHNICAL FIELD

The present invention relates to a liquid crystal display capable of simultaneously writing data in a plurality of pixels in one pixel column.

BACKGROUND ART

Liquid crystal displays are becoming larger and having higher definition. However, this raises the increase in the number of pixels and the increase in wiring resistance etc. of data signal lines, with a result that it is getting difficult to sufficiently charge individual pixels. In order to deal with this problem, Patent Literature 1 discloses an arrangement in which two data signal lines are provided for one pixel column and scanning signal lines respectively connected with adjacent two pixels are selected simultaneously. The polarity of a signal potential supplied to individual data signal lines is inverted with respect to each frame. This arrangement allows simultaneously writing signal potentials in adjacent two pixels, thereby increasing a time for charging one pixel.

[Patent Literature 1] Japanese Patent Application Publication, Tokukaihei, No. 10-253987 A (publication date: Sep. 25, 1998)

SUMMARY OF INVENTION

However, recently, liquid crystal displays are requested not only to have further larger size and further higher definition, but also to perform high-speed driving (driving in which a frequency for rewriting a frame is increased). Consequently, there is a case where even the method disclosed in Patent Literature 1 does not secure a sufficient time for charging pixels. In this regard, the inventors of the present invention found that when such full charging of pixels is difficult, inverting the polarities of signal potentials to be supplied to data signal lines with respect to each frame as disclosed in Patent Literature 1 would cause a problem that a reached potential (charging ratio) during a current horizontal scanning period varies due to a difference in the levels of signal potentials supplied to the same data signal line during the previous horizontal scanning period.

The present invention was made in view of the foregoing problem. An object of the present invention is to improve the display quality of a liquid crystal display in which a larger size, higher definition, or higher-speed driving etc. makes full charging of pixels difficult even when simultaneous scanning of two lines is performed.

A liquid crystal display of the present invention is a liquid crystal display, having pixels aligned in a row direction and a column direction, the row direction being a direction in which scanning signal lines are extended, the liquid crystal display comprising pixel columns, first data signal lines, and second data signal lines, a first data signal line and a second data signal line being provided for each pixel column, each pixel included in the pixel column being connected with a scanning signal line, in a case where every two pixels in the pixel column are paired, one of two pixels in each pair being connected with the first data signal line and the other of the two pixels being connected with the second data signal line, two scanning signal lines respectively connected with two pixels in a pair being simultaneously selected during one horizontal scanning period so that signal potentials are written into the two pixels in a pair from the first data signal line and the second data signal line, respectively, during each horizontal scanning period, supply of the signal potentials to the first data signal line and the second data signal line being performed after supply of preliminary potentials to the first data signal line and the second data signal line.

As described above, by supplying a signal potential (corresponding to a data signal) to a data signal line after supplying a preliminary potential to the data signal line during each horizontal scanning period, it is possible to cause charging waveforms of a pixel to be substantially uniform with each other regardless of signal potentials supplied during the previous horizontal scanning period. Consequently, a liquid crystal display in which a larger size, higher definition, or higher-speed driving etc. makes full charging of pixels difficult even when simultaneous scanning of two lines is performed may be arranged so as to subdue variations in reached potential (charge ratio) during a current horizontal scanning period due to a difference in levels of signal potentials supplied during the previous horizontal scanning period.

The liquid crystal display of the present invention may be arranged such that a polarity of the signal potential is inverted with respect to one horizontal scanning period. This arrangement allows further subduing the variations. The liquid crystal display of the present invention may be arranged such that a polarity of the signal potential is inverted with respect to n (n is an integer of two or more) scanning periods, or may be arranged such that a polarity of the signal potential is inverted with respect to one vertical scanning period (1 frame).

The liquid crystal display of the present invention may be arranged such that the preliminary potential has a constant value. This arrangement allows simplifying a configuration for supplying a preliminary potential. In this case, the constant value may be a middle value of a range of the signal potential or may be a potential equal to a common potential (Vcom) or equal to a signal potential corresponding to black display.

The liquid crystal display of the present invention may be arranged such that the preliminary potential is determined based on a signal potential supplied to a data signal line during a previous horizontal scanning period and a signal potential to be supplied to the data signal line during a current horizontal scanning period. This arrangement allows further subduing the variations.

The liquid crystal display of the present invention may be arranged such that an intermediate selection period is provided between scanning periods for a scanning signal line in accordance with timing of supplying the preliminary potential, and the preliminary potential is written in a pixel connected with the scanning signal line during the intermediate selection period. This arrangement allows pixels to display an input image (data signal) during a certain period of one frame period and to display in accordance with the preliminary potential during a remaining period of the one frame period. Consequently, when the preliminary potential is set to correspond to black display or grayscale display close to the black display, it is possible to reduce tailing etc. while displaying a moving image, thereby improving the quality of a displayed moving image.

A liquid crystal display of the present invention is a liquid crystal display, having pixels aligned in a row direction and a column direction, the row direction being a direction in which scanning signal lines are extended, the liquid crystal display comprising pixel columns, first data signal lines, and second data signal lines, a first data signal line and a second data signal line being provided for each pixel column, each pixel included in the pixel column being connected with a scanning signal line, in a case where every two pixels in the pixel column are paired, one of two pixels in each pair being connected with the first data signal line and the other of the two pixels being connected with the second data signal line, two scanning signal lines respectively connected with two pixels in a pair being simultaneously selected during one horizontal scanning period so that signal potentials are written into the two pixels in a pair from the first data signal line and the second data signal line, respectively, a polarity of the signal potential being inverted with respect to each horizontal scanning period.

By inverting the polarity of a signal potential supplied to a data signal line with respect to one horizontal scanning period as described above, it is possible to cause charging waveforms of a pixel to be substantially uniform with each other regardless of signal potentials supplied during the previous horizontal scanning period. Consequently, a liquid crystal display in which a larger size, higher definition, or higher-speed driving etc. makes full charging of pixels difficult even when simultaneous scanning of two lines is performed may be arranged so as to subdue variations in reached potential (charge ratio) during a current horizontal scanning period due to a difference in levels of signal potentials supplied during the previous horizontal scanning period.

The liquid crystal display of the present invention is arranged such that signal potentials with opposite polarities are supplied to the first data signal line and the second data signal line, respectively, in a case where a predetermined pixel in the pixel column is regarded as a first-positioned pixel from which counting of pixel starts, an odd-number-positioned pixel and an even-number-positioned pixel are paired, and each pair is given a count number, an odd-number-positioned pixel in one of two pairs with successive count numbers and an odd-number-positioned pixel in the other of the two pairs with successive count numbers are connected with different data signal lines, a pair is selected according to the count number, and scanning signal lines respectively connected with two pixels in the selected pair are simultaneously selected. For example, the liquid crystal display of the present invention may be arranged such that two pixels in each pair are adjacent to each other, the predetermined pixel in the pixel column is regarded as a first-positioned pixel from which counting of a pixel starts, each pixel other than $2\times i+1^{st}$ (i is a natural number) pixel and its upstream-adjacent pixel of the pixel are connected with different data signal lines and the $2\times i+1^{st}$ pixel and its upstream-adjacent pixel are connected with a same data signal line, and the scanning signal lines are sequentially selected with starting from a scanning signal line connected with the predetermined pixel in such a manner that adjacent two scanning signal lines are selected simultaneously. This arrangement allows individual pixel columns to make dot-inversion, thereby subduing flickers.

The liquid crystal display of the present invention is arranged such that signal potentials with opposite polarities are supplied to the first data signal line and the second data signal line, respectively, in a case where a predetermined pixel in the pixel column is regarded as a first-positioned pixel from which counting of pixel starts, an odd-number-positioned pixel and an even-number-positioned pixel counted in a scanning direction are paired, n (n is an integer of two or more) pairs are regarded as a group, and each group is given a count number, each group is configured such that two pixels in each pair are connected with different signal lines and when n is two or more, each odd-number-positioned pixel is connected with one data signal line, and in two groups with successive count numbers, an odd-number-positioned pixel in one group and an odd-number-positioned pixel in the other group being connected with different data signal lines, a group is selected according to the count number, in the selected group, simultaneous selection of scanning signal lines respectively connected with two pixels in a pair is performed, and the simultaneous selection is performed sequentially with respect to each pair.

For example, the liquid crystal display of the present invention may be arranged such that the predetermined pixel is regarded as a first-positioned pixel from which counting of a pixel starts, each pixel other than $2\times n\times i+1^{st}$ pixel counted in a scanning direction and its upstream-adjacent pixel of the pixel are connected with different data signal lines and the pixel and its upstream-adjacent pixel are connected with a same data signal line, and the scanning signal lines are sequentially selected from a scanning signal line connected with the predetermined pixel in such a manner that adjacent two scanning signal lines are selected simultaneously. This arrangement allows individual pixel columns to make dot-inversion, thereby subduing flickers.

The liquid crystal display of the present invention may be arranged such that signal potentials with opposite polarities are supplied to the first data signal line and the second data signal line, respectively, in a case where a predetermined pixel in the pixel column is regarded as a first-positioned pixel from which counting of pixel starts, an odd-number-positioned pixel and an even-number-positioned pixel counted in a scanning direction are paired, and each pair is given a count number, two pixels in each pair are connected with different data signal lines, in two pairs with successive count numbers, an odd-number-positioned pixel in one of the two pairs and an odd-number-positioned pixel in the other of the two pairs are connected with a same data signal line, a pair is selected according to the count number, and scanning signal lines respectively connected with two pixels in the selected pair are selected simultaneously. For example, the liquid crystal display of the present invention may be arranged such that the pixels in a pair are adjacent to each other, each pixel provided at downstream of the scanning direction from the predetermined pixel and a pixel which is upstream-adjacent of the pixel are connected with different data signal lines, the scanning signal lines are sequentially selected from a scanning signal line connected with the predetermined pixel in such a manner that adjacent two scanning signal lines are selected simultaneously. This arrangement allows individual pixel columns to make dot-inversion, thereby subduing flickers.

The liquid crystal display of the present invention may be arranged such that pixels in one pixel row are connected with a same scanning signal line, a first data signal line for one of adjacent two pixel columns and a first data signal line for the other of the adjacent two pixel columns are supplied with a signal potential with a same polarity, and connections with a first data signal line and a second data signal line are made oppositely between pixels adjacent in a row direction. This arrangement allows not only individual pixel columns but also individual pixel rows to make dot-inversion, thereby further subduing flickers.

The liquid crystal display of the present invention may be arranged such that a first data signal line and a second data signal line for a pixel column are provided at both sides of the pixel column, and a first data signal line for one of adjacent two pixel columns and a first data signal line for the other of the adjacent two pixel columns are adjacent to each other without a pixel column therebetween or a second data signal line for one of adjacent two pixel columns and a second data signal line for the other of the adjacent two pixel columns are adjacent to each other without a pixel column therebetween.

This arrangement allows supplying signal potentials with the same polarity to two data signal lines adjacent to each other without a pixel column therebetween. Consequently, power consumption due to parasitic capacitance between the two data signal lines is reduced, thereby reducing a load on a source driver.

The liquid crystal display of the present invention may be arranged such that a first data signal line and a second data signal line for a pixel column are provided at both sides of the pixel column, and a first data signal line for one of adjacent two pixel columns and a second data signal line for the other of the adjacent two pixel columns are adjacent to each other without a pixel column therebetween or a second data signal line for one of adjacent two pixel columns and a first data signal line for the other of the adjacent two pixel columns are adjacent to each other without a pixel column therebetween.

The liquid crystal display of the present invention may be arranged such that signal potentials with a same polarity are supplied to the first data signal line and the second data signal line, respectively, in a case where a predetermined pixel in the pixel column is regarded as a first-positioned pixel from which counting of pixel starts, two odd-number-positioned pixels counted in a scanning direction are paired and two even-number-positioned pixels counted in the scanning direction are paired, and a pair consisting of two odd-number-positioned pixels and a pair consisting of two even-number-positioned pixels are alternately given a count number, two pixels in each pair are connected with different data signal lines, and a pair is selected according to the count number, and scanning signal lines respectively connected with two pixels in the selected pair are selected simultaneously. This arrangement allows individual pixel columns to make dot-inversion, thereby subduing flickers.

The liquid crystal display of the present invention may be arranged such that signal potentials with a same polarity are supplied to the first data signal line and the second data signal line, respectively, in a case where a predetermined pixel in the pixel column is regarded as a first-positioned pixel from which counting of pixel starts, two odd-number-positioned pixels counted in a scanning direction are paired and two even-number-positioned pixels counted in the scanning direction are paired, and a group including n pairs each consisting of two odd-number-positioned pixels and a group including n pairs each consisting of two even-number-positioned pixels are alternately given a count number, two pixels in each pair are connected with different data signal lines, and a group is selected according to the count number, in the selected group, scanning signal lines respectively connected with two pixels in a pair are selected simultaneously, and the simultaneous selection is performed sequentially with respect to each pair. This arrangement allows individual pixel columns to make dot-inversion, thereby subduing flickers.

The liquid crystal display of the present invention may be arranged such that a polarity of a signal potential supplied to a first data signal line and a second data signal line for one of adjacent two pixel columns is different from a polarity of a signal potential supplied to a first data signal line and a second data signal line for the other of the adjacent two pixel columns. This arrangement allows not only individual pixel columns but also individual pixel rows to make dot-inversion, thereby further subduing flickers.

The liquid crystal display of the present invention may be arranged such that there are provided a plurality of retention capacitance lines whose potentials are controllable (e.g. retention capacitance lines to which retention capacitance line signals are supplied), the pixel includes a first transistor, a second transistor, a first pixel electrode, and a second pixel electrode, the first pixel electrode and the second pixel electrode are connected with a same data signal line via the first transistor and the second transistor, respectively, the first transistor and the second transistor are connected with the scanning signal line, and the first pixel electrode and the second pixel electrode form retention capacitances with different retention capacitance lines, respectively. This arrangement allows one pixel to display a halftone based on a configuration including a bright sub-pixel and a dark sub-pixel, thereby subduing excess brightness when displaying a halftone. This improves a viewing angle characteristic.

The liquid crystal display of the present invention may be arranged such that a retention capacitance line is provided for two pixels adjacent in a column direction, and a first pixel electrode or a second pixel electrode provided in one of the two pixels and a first pixel electrode or a second pixel electrode provided in the other of the two pixels form retention capacitances with the retention capacitance line. This arrangement allows two pixel rows to share one retention capacitance line, thereby reducing the number of retention capacitance lines.

The liquid crystal display of the present invention may be arranged such that the first data signal line and the second data signal line are supplied with signal potentials with opposite polarities, respectively. Further, the liquid crystal display of the present invention may be arranged such that the first data signal line and the second data signal line are supplied with signal potentials with a same polarity, respectively, and a polarity of a signal potential supplied to a first data signal line and a second data signal line for one of adjacent two pixel columns is different from a polarity of a signal potential supplied to a first data signal line and a second data signal line for the other of the adjacent two pixel columns. These arrangements allow individual pixel columns to make dot-inversion or V-line-inversion.

The liquid crystal display of the present invention may be arranged such that one of the first data signal line and the second data signal line is provided at one side of the pixel column and the other of the first data signal line and the second data signal line is provided in such a manner as to overlap the pixel column. This arrangement allows keeping a wider distance between data signal lines compared with a configuration in which data signal lines for a pixel column are provided at both sides of the pixel column. This allows reducing the ratio of short-circuit between data signal lines, thereby increasing the process yield.

The liquid crystal display of the present invention may be arranged such that the simultaneously selected scanning signal lines are connected in a liquid crystal panel or connected with a same output terminal of a gate driver for driving the scanning signal lines.

The liquid crystal display of the present invention may be arranged such that a display section includes a plurality of domains, and each of the plurality of domains includes data signal lines, scanning signal lines, lines, and the pixels included in each domain are driven with respect to said each domain.

The liquid crystal display of the present invention is applicable to a liquid crystal display in which the number of frames (e.g. the number of frames, the number of sub-frames, and the number of fields) displayed per one second is more than 60 (e.g. liquid crystal display of 120 frames/sec). Further, the liquid crystal display of the present invention is preferably used for a digital-cinema-standard liquid crystal display having 2160 scanning signal lines and a super-high-vision-standard liquid crystal display having 4320 scanning signal lines.

The liquid crystal display of the present invention may be arranged to meet a relation represented by $$Vr=Vq+\{(Vq-V\mathrm{com})-(Vp-V\mathrm{com})\}/2$$

wherein Vr represents a preliminary potential, Vp represents a signal potential supplied to a data signal line during a previous horizontal scanning period, Vq represents a signal potential supplied to the data signal line during a current horizontal scanning period, and Vcom represents a common electrode.

The liquid crystal display of the present invention may be arranged such that a period for supplying a preliminary potential is 90 to 100% with respect to a time constant of the data signal lines.

A method of the present invention for driving a liquid crystal display is a method for driving a liquid crystal display having pixels aligned in a row direction and a column direction, the row direction being a direction in which scanning signal lines are extended, the liquid crystal display comprising pixel columns, first data signal lines, and second data signal lines, a first data signal line and a second data signal line being provided for each pixel column, each pixel being connected with a scanning signal line, in a case where every two pixels in the pixel column are paired, one of two pixels in each pair being connected with the first data signal line and the other of the two pixels being connected with the second data signal line, the method comprising the step of simultaneously selecting, during one horizontal scanning period, scanning signal lines respectively connected with two pixels in a pair so that signal potentials supplied to the first data signal line and the second data signal line are written into the two pixels, whereby during each horizontal scanning period, supply of the signal potentials to the first data signal line and the second data signal line are performed after supply of preliminary potentials to the first data signal line and the second data signal line.

As described above, by supplying a signal potential (corresponding to a data signal) to a data signal line after supplying a preliminary potential to the data signal line, it is possible to cause charging waveforms of a pixel to be substantially uniform with each other regardless of signal potentials supplied during the previous horizontal scanning period. Consequently, a liquid crystal display in which a larger size, higher definition, or higher-speed driving etc. makes full charging of pixels difficult even when simultaneous scanning of two lines is performed may be arranged so as to subdue variations in reached potential (charge ratio) during a current horizontal scanning period due to a difference in levels of signal potentials supplied during the previous horizontal scanning period.

A method of the present invention for driving a liquid crystal display is a method for driving a liquid crystal display having pixels aligned in a row direction and a column direction, the row direction being a direction in which scanning signal lines are extended, the liquid crystal display comprising pixel columns, first data signal lines, and second data signal lines, a first data signal line and a second data signal line being provided for each pixel column, each pixel being connected with a scanning signal line, in a case where every two pixels in the pixel column are paired, one of two pixels in each pair being connected with the first data signal line and the other of the two pixels being connected with the second data signal line, the method comprising the step of simultaneously selecting, during one horizontal scanning period, scanning signal lines respectively connected with two pixels in a pair so that signal potentials supplied to the first data signal line and the second data signal line are written into the two pixels, whereby polarities of the signal potentials are inverted with respect to each horizontal scanning period. By inverting the polarity of a signal potential supplied to a data signal line with respect to one horizontal scanning period as described above, it is possible to cause charging waveforms of a pixel to be substantially uniform with each other regardless of signal potentials supplied during the previous horizontal scanning period. Consequently, a liquid crystal display in which a larger size, higher definition, or higher-speed driving etc. makes full charging of pixels difficult even when simultaneous scanning of two lines is performed may be arranged so as to subdue variations in reached potential (charge ratio) during a current horizontal scanning period due to a difference in levels of signal potentials supplied during the previous horizontal scanning period.

A television receiver of the present invention includes the aforementioned liquid crystal display and a tuner section for receiving television broadcasting.

As described above, the liquid crystal display of the present invention allows a liquid crystal display in which a larger size, higher definition, or higher-speed driving etc. makes full charging of pixels difficult even when simultaneous scanning of two lines is performed to be arranged so as to subdue variations in reached potential (charge ratio) during a current horizontal scanning period due to a difference in levels of signal potentials supplied during the previous horizontal scanning period.

BRIEF DESCRIPTION OF DRAWINGS

FIG. 59 is a table showing sensory evaluations of modes A-G (evaluations of the effect of subduing variations in reached potential in modes A-G) and power consumption and the amount of generated heat in the modes A-G.

REFERENCE SIGNS LIST

10*a*-10*k*•10*p*: display section
10A-10F: display section
P(i,j): pixel
S1*x*, S2*x*: first data signal line
S1*y*, S2*y*: second data signal line
S1*a*, S2*b*: first data signal line
S1A, S2B: second data signal line
G1-G7: scanning signal line
Cs1-Cs7: retention capacitance line
PS1, PS2: pixel column
PE: pixel electrode
PE1: first pixel electrode
PE2: second pixel electrode
84: liquid crystal display unit
601: television receiver
800: liquid crystal display

DESCRIPTION OF EMBODIMENTS

Embodiments of the present invention are explained below with reference to FIGS. 1-59. In a display section of a liquid crystal display (normally-black mode for example) of the present invention, pixels are arrayed in row and column directions. Hereinafter, a pixel row on i-th row is referred to as PGi, a pixel column on j-th column is referred to as PSj, and a pixel on j-th column on i-th row is referred to as P (i, j). For convenience of explanation, hereinafter, a direction in which a scanning signal line extends is regarded as a row direction. However, it goes without saying that when the liquid crystal display is used (is seen by a user), the scanning signal line may extend either in a lateral direction or in a longitudinal direction. Further, in the following, one horizontal scanning period (1H) is a period in which a potential corresponding to one pixel (signal potential or signal potential and refresh potential) is supplied to a data signal line.

Embodiment 1

Figure 1:
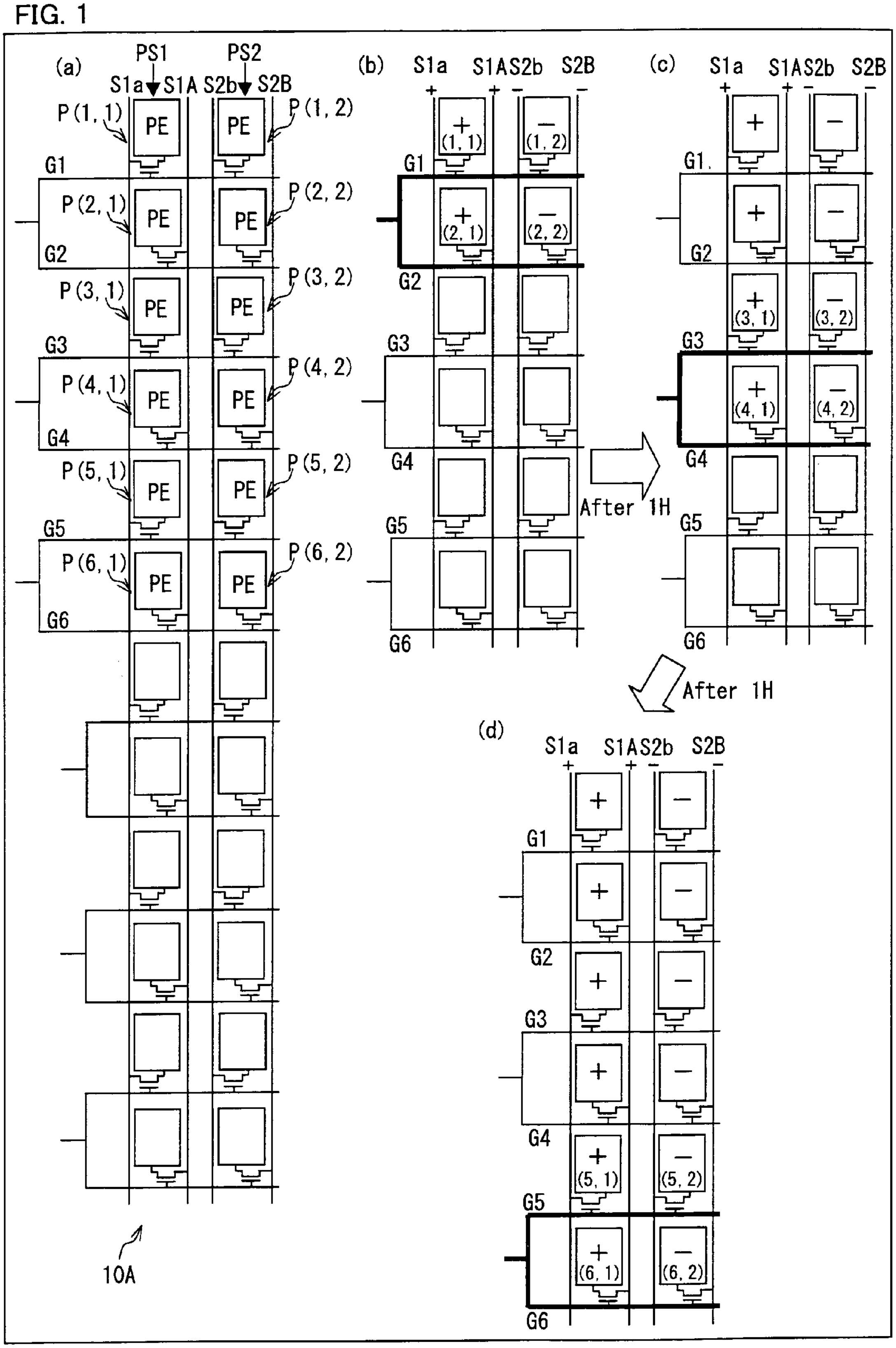
FIG. 1 (*a*) of FIG. 1 is a drawing schematically showing a display section of a liquid crystal display in accordance with Embodiment 1. (*b*) to (*d*) of FIG. 1 are drawings showing a method for driving the display section.

(*a*) of FIG. 1 is a drawing schematically showing one example of a configuration of a display section of the liquid crystal display of the present invention. (*b*)-(*d*) of FIG. 1 show a driving method of the display section. (*a*) and (*b*) of FIG. 2 are timing charts showing the driving method.

As shown in (*a*) of FIG. 1, a display section 10A includes a first data signal line and a second data signal line (e.g. S1*a* and S1A) which are provided with respect to each pixel column (e.g. PS1) and which are positioned at both sides of the pixel column, and one pixel (e.g. P (1, 1)) included in the pixel column is connected with one scanning signal line (e.g. G1) and is connected with one of the first and second data signal lines (e.g. S1*a* and S1A). Specifically, assume that pixels on each pixel column are sequentially made pairs from a pixel on a first row on the pixel column in such a manner that two pixels adjacent in a column direction are made a pair. In this case, two pixels in each pair are connected with different data signal lines. For example, in one pixel column, each of pixels on second row and thereafter is connected with a data signal line which is different from a data signal line with which a pixel on its upstream-adjacent row is connected. Pixels on one pixel row are connected with the same scanning signal line, and in each pixel, a pixel electrode PE is connected with one data signal line via a transistor (TFT) and the gate terminal of the transistor is connected with one scanning signal line.

Simultaneous selection of two scanning signal lines respectively connected with two pixels in a pair is sequentially carried out in a scanning direction. That is, scanning signal lines are sequentially selected from a scanning signal line connected with a pixel on a first row in such a manner that adjacent two scanning signal lines are selected simultaneously (simultaneous scanning of two lines).

Figure 2:
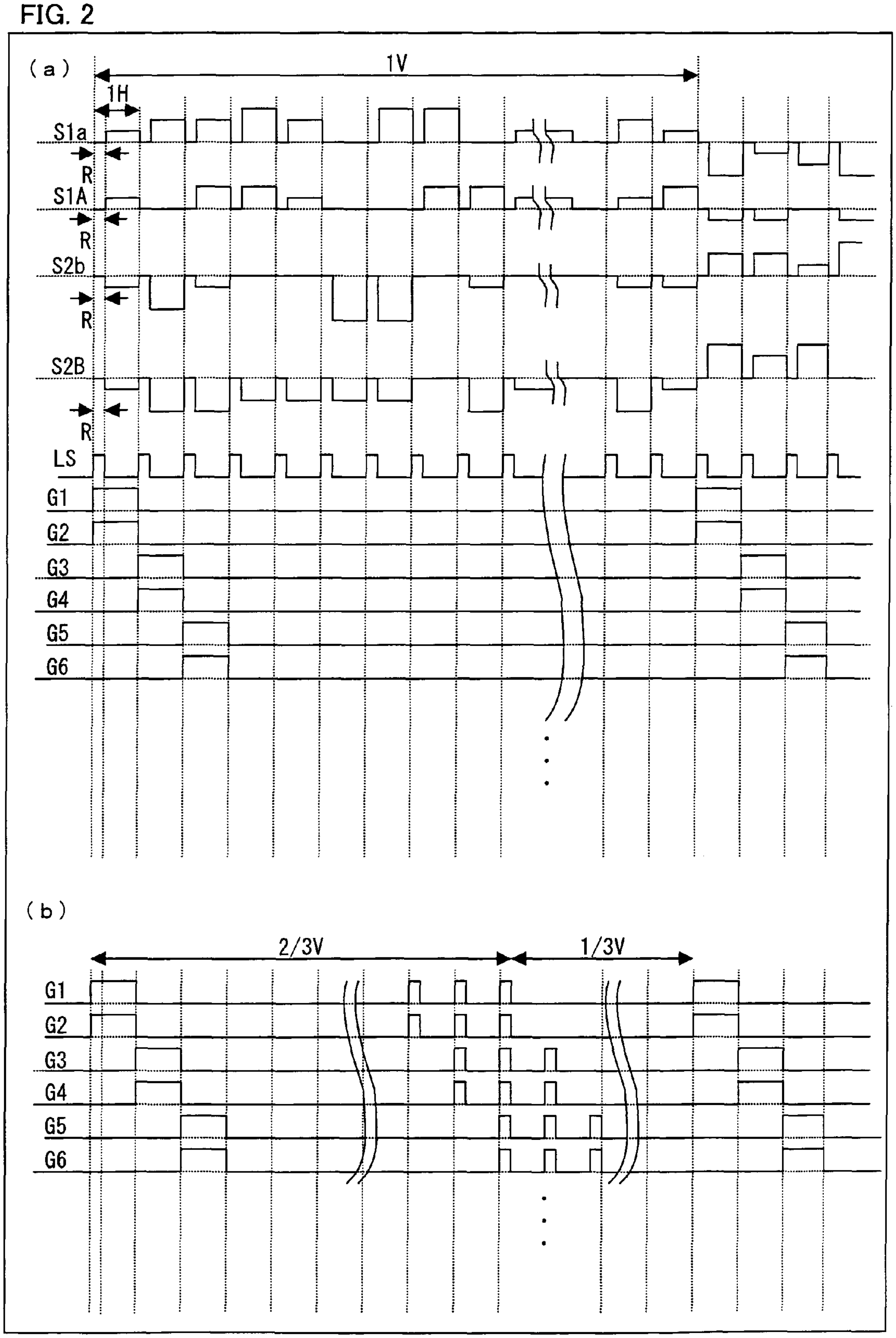
FIG. 2 (*a*) of FIG. 2 is a timing chart showing a method for driving the display section shown in (*a*) of FIG. 1. (*b*) of FIG. 2 is a timing chart showing a modification example of the method.

In the present embodiment, as shown in (*a*) of FIG. 2, during each horizontal scanning period, first and second data signal lines are initially supplied with refresh potentials (preliminary potentials) and then supplied with signal potentials (potentials corresponding to data signals). Specifically, a refresh period R is provided at the beginning of each horizontal scanning period (1H), and a refresh potential is supplied to each data signal line during the refresh period R. The refresh potential is a potential equal to a potential Vcom of a common electrode for example, but may be a potential at the middle of a dynamic range of a signal potential, or may be a potential equal to a signal potential corresponding to a black display or a grayscale display close to the black display. In (*a*) of FIG. 2, the refresh period R is in synchronization with a period during which a latch strobe signal LS for defining each horizontal scanning period is in a "High" state.

Further, the first and second data signal lines are supplied with signal potentials with the same polarity and the polarity of signal potentials supplied to the first and second data signal lines is inverted with respect to each vertical scanning period (1 frame), and two data signal lines for one of two adjacent pixel columns and two data signal lines for the other of the two adjacent pixel columns are supplied with signal potentials with opposite polarities, respectively.

For example, in a case of the pixel column PS1, the first data signal line S1*a* and the second data signal line S1A are provided at both sides of the pixel column PS1, respectively, a first-positioned pixel P(1,1) and a second-positioned pixel P(2,1) are regarded as a pair, the pixel P(1,1) is connected with the scanning signal line G1 and the first data signal line S1*a*, and the pixel (2, 1) is connected with a scanning signal line G2 and the second data signal line S1A. Similarly, a third-positioned pixel P(3,1) and a fourth-positioned pixel P(4,1) are regarded as a pair, the pixel P(3,1) is connected with the scanning signal line G3 and the first data signal line S1*a*, and the pixel (4,1) is connected with a scanning signal line G4 and the second data signal line S1A. Similarly, a fifth-positioned pixel P(5,1) and a sixth-positioned pixel P(6, 1) are regarded as a pair, the pixel P(5,1) is connected with the scanning signal line G5 and the first data signal line S1*a*, the pixel (6,1) is connected with a scanning signal line G6 and the second data signal line S1A.

Further, in a case of a pixel column PS2, a first data signal line S2*b* and a second data signal line S2B are provided at both sides of a pixel column PS2, respectively, a first-positioned pixel P(1,2) and a second-positioned pixel P(2,2) are regarded as a pair, the pixel P(1,2) is connected with the scanning signal line G1 and the first data signal line S2*b*, and the pixel (2,2) is connected with a scanning signal line G2 and the second data signal line S2B. Similarly, a third-positioned pixel P(3,2) and a fourth-positioned pixel P(4,2) are regarded as a pair, the pixel P(3,2) is connected with the scanning signal line G3 and the first data signal line S2*b*, and the pixel (4,2) is connected with a scanning signal line G4 and the second data signal line S2B. Similarly, a fifth-positioned pixel P(5,2) and a sixth-positioned pixel P(6,2) are regarded as a pair, the pixel P(5,2) is connected with the scanning signal line G5 and the first data signal line S2*b*, the pixel (6,2) is connected with a scanning signal line G6 and the second data signal line S2B.

In one frame (frame shown in (*b*)-(*d*) of FIG. 1), the first data signal line S1*a* and the second data signal line S1A are supplied with signal potentials with plus polarities, whereas in the next frame, the first data signal line S1*a* and the second data signal line S1A are supplied with signal potentials with minus polarities. Further, in one frame (frame shown in (*b*)-(*d*) of FIG. 1), the first data signal line S2*b* and the second data signal line S2B are supplied with signal potentials with minus polarities, whereas in the next frame, the first data signal line S2*b* and the second data signal line S2A are supplied with signal potentials with plus polarities.

As shown in (*b*)-(*d*) of FIG. 1 and FIG. 2, initially, the scanning signal line G1 connected with the pixels P(1,1) and P(1,2) and the scanning signal line G2 connected with the pixels P(2, 1) and P(2, 2) are selected simultaneously. Then, the scanning signal line G3 connected with the pixels P(3, 1) and P(3,2) and the scanning signal line G4 connected with the pixels P(4,1) and P(4, 2) are selected simultaneously. Then, the scanning signal line G5 connected with the pixels P(5,1) and P(5,2) and the scanning signal line G6 connected with the pixels P(6,1) and P(6,2) are selected simultaneously.

Consequently, in the display section 10A, during a first horizontal scanning period, sequential writing of a refresh potential and a signal potential with a plus polarity from the first data signal line S1*a* to the pixel electrode of the pixel P(1,1) and sequential writing of a refresh potential and a signal potential with a plus polarity from the second data signal line S1A to the pixel electrode of the pixel P(2,1) are carried out simultaneously. Sequential writing of a refresh potential and a signal potential with a minus polarity from the first data signal line S2*b* to the pixel electrode of the pixel P(1,2) and sequential writing of a refresh potential and a signal potential with a minus polarity from the second data signal line S2B to the pixel electrode of the pixel P(2,2) are carried out simultaneously (see (*b*) of FIG. 1 and (*a*) of FIG. 2). During a next horizontal scanning period, sequential writing of a refresh potential and a signal potential with a plus polarity from the first data signal line S1*a* to the pixel electrode of the pixel P(3,1) and sequential writing of a refresh potential and a signal potential with a plus polarity from the second data signal line S1A to the pixel electrode of the pixel P(4,1) are carried out simultaneously. Sequential writing of a refresh potential and a signal potential with a minus polarity from the first data signal line S2*b* to the pixel electrode of the pixel P(3,2) and sequential writing of a refresh potential and a signal potential with a minus polarity from the second data signal line S2B to the pixel electrode of the pixel P(4,2) are carried out simultaneously (see (*c*) of FIG. 1 and (*a*) of FIG. 2). During a further next horizontal scanning period, sequential writing of a refresh potential and a signal potential with a plus polarity from the first data signal line S1*a* to the pixel electrode of the pixel P(5,1) and sequential writing of a refresh potential and a signal potential with a plus polarity from the second data signal line S1A to the pixel electrode of the pixel P(6,1) are carried out simultaneously. Sequential writing of a refresh potential and a signal potential with a minus polarity from the first data signal line S2*b* to the pixel electrode of the pixel P(5,2) and sequential writing of a refresh potential and a signal potential with a minus polarity from the second data signal line S2B to the pixel electrode of the pixel P(6,2) are carried out simultaneously (see (*d*) of FIG. 1 and (*a*) of FIG. 2). Consequently, in the display section 10A, polarity distribution of potentials written into pixels exhibits V line inversion as shown in (*d*) of FIG. 1.

The configuration shown in FIG. 1 and (*a*) of FIG. 2 is configured such that during each horizontal scanning period, data signal lines are supplied with signal potentials after being supplied with refresh potentials. Accordingly, the configuration allows charging waveforms of a pixel to be substantially uniform with each other regardless of the level of signal potentials supplied to the data signal lines during the previous horizontal scanning period, in a case where even simultaneous scanning of two lines does not secure full charging.

Figure 43:
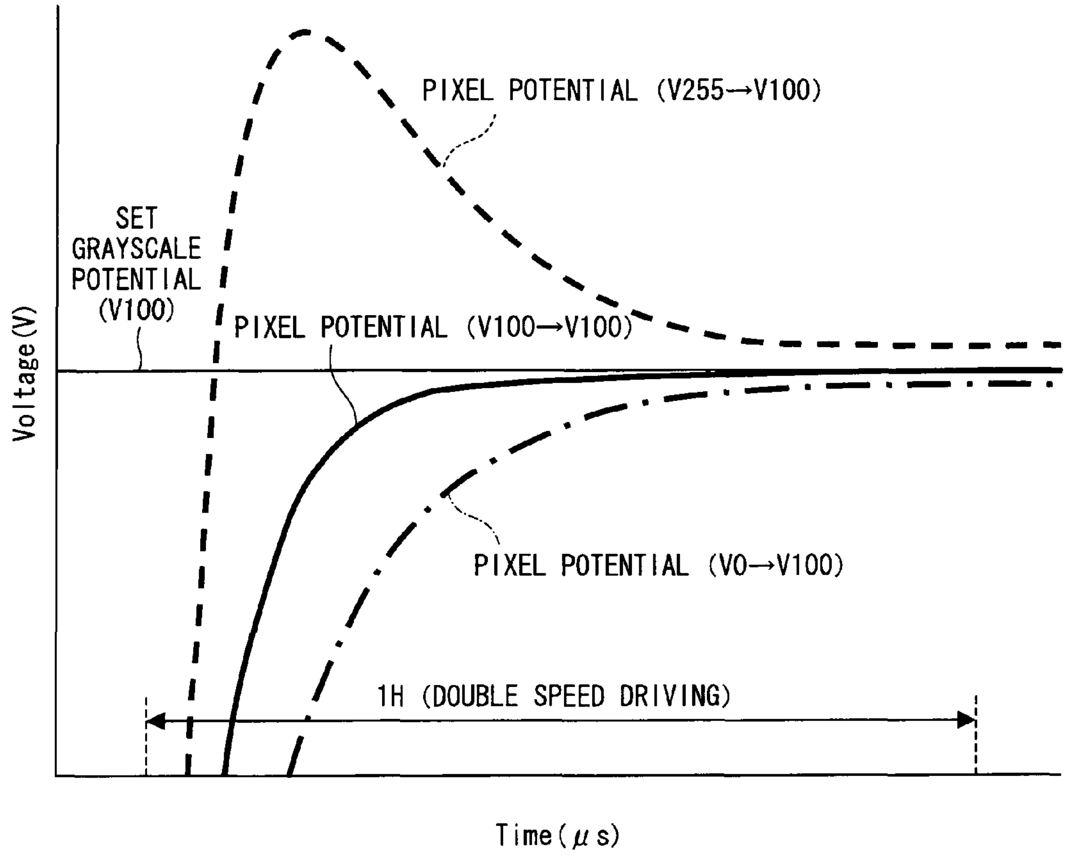
FIG. 43 is a waveform chart showing variation in reached potential during a current horizontal scanning period due to the level of a potential supplied during the previous horizontal scanning period in a case where the polarity of a signal potential supplied to a data signal line is inverted with respect to each vertical scanning period.

In this regard, the inventors of the present invention have found that in a case where the grayscale during a current horizontal scanning period is a halftone (for example, grayscale 101 of grayscales 0-255 in 256 grayscales display, grayscale potential V101=2.1V (potential at the time when Vcom is potential 0), a reached level of a pixel potential (hereinafter reached potential) differs between when the level of a potential supplied during the previous horizontal scanning period corresponds to a white tone and when the level corresponds to a black tone. For example, in a case where the polarity of a signal potential supplied to a data signal line in the double speed driving is plus in one frame and the grayscale during a current horizontal scanning period is a halftone, as shown in FIG. 43, when the level of a potential supplied to the data signal line during the previous horizontal scanning period corresponds to a white tone (grayscale potential V255=7.5V), a reached potential of the current horizontal scanning period exceeds a set grayscale potential, whereas when the level corresponds to a black tone (grayscale potential V0=0V), the reached potential of the current horizontal scanning period is lower than the set grayscale potential.

Figure 44:
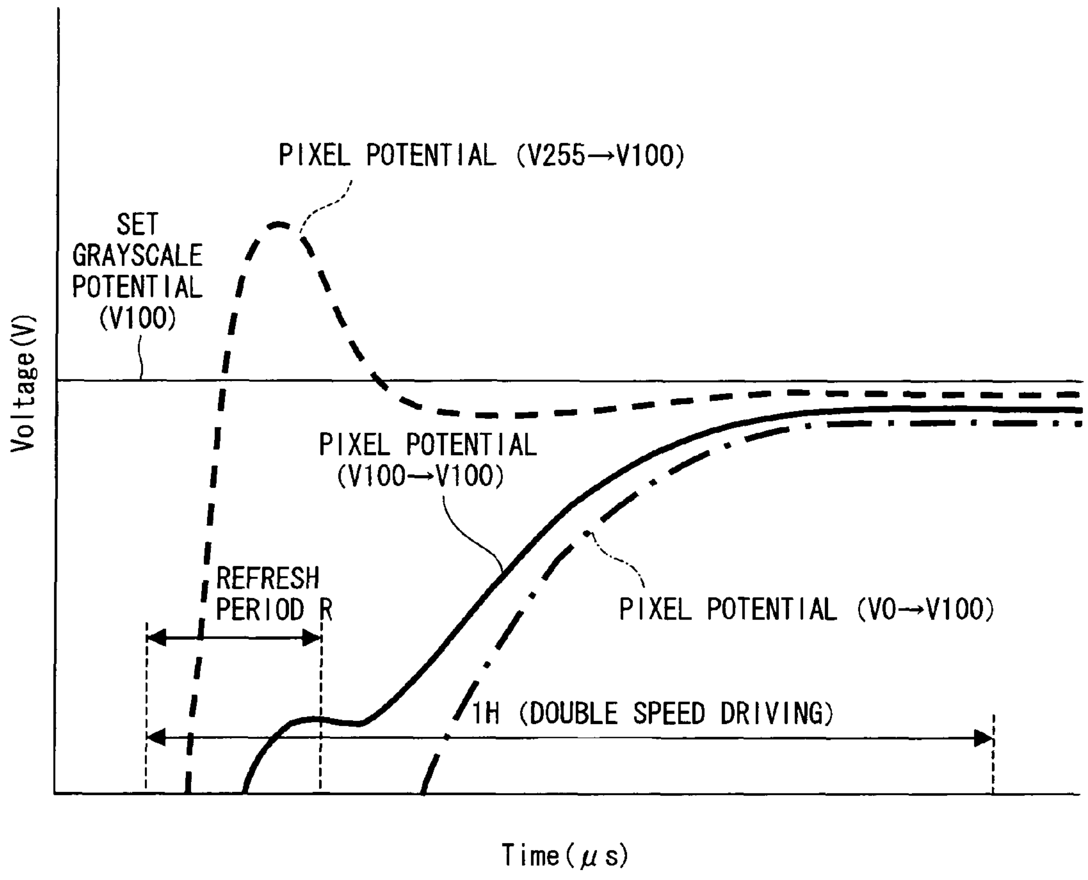
FIG. 44 is a waveform chart showing variation in reached potential during a current horizontal scanning period due to the level of a potential supplied during the previous horizontal scanning period in a case where the polarity of a signal potential supplied to a data signal line is inverted with respect to each vertical scanning period and a refresh potential is supplied to a data signal line at the beginning of a horizontal scanning period.

If the double speed driving is performed while supplying a refresh potential (Vcom) during a refresh period R at the beginning of each horizontal scanning period as shown in (*a*) of FIG. 2, it is possible to drop the reached potential at a time when the level of a signal potential supplied to the data signal line during the previous horizontal scanning period corresponds to a white tone as shown in FIG. 44. This allows the reached potential at a time when the level of the signal potential supplied to the data signal line during the previous horizontal scanning period corresponds to a white tone and the reached potential at a time when the level corresponds to a black tone to be closer to each other. It should be noted that FIGS. 43 and 44 relate to the cases of double speed driving as explained above and one horizontal scanning period (1H) is 14.82 [μs] and the refresh period R is 3 [μs]. Further, when the double speed driving is performed in the configuration of (*a*) of FIG. 2, 1H and the refresh period R are specifically as above.

FIG. 59 shows sensory evaluations of modes A-F (evaluations regarding the effects of subduing variations in reached potential) and power consumption and heat generation of the modes A-F. In the sensory evaluations, the effects of subduing variations in reached potential are higher in the order of double circle, circle, and triangle. If the evaluation indicates circle or double circle, the effect of subduing variations is considered to reach the required level. Here, the mode A is a mode in which the polarity of a signal potential supplied to a data signal line is inverted with respect to each vertical scanning period and a refresh potential is supplied during each horizontal scanning period. The mode B is a mode in which the polarity of a signal potential supplied to a data signal line is inverted with respect to each horizontal scanning period and a refresh potential is not supplied during each horizontal scanning period. The mode C is a mode in which the polarity of a signal potential supplied to a data signal line is inverted with respect to each horizontal scanning period and a refresh potential is supplied during each horizontal scanning period. The mode D is a mode in which the polarity of a signal potential supplied to a data signal line is inverted with respect to every plurality of horizontal scanning periods (e.g. 2H) and a refresh potential is not supplied during each horizontal scanning period. The mode E is a mode in which the polarity of a signal potential supplied to a data signal line is inverted with respect to every plurality of horizontal scanning periods (e.g. 2H) and a refresh potential is supplied during each horizontal scanning period. The mode F is a mode in which the polarity of a signal potential supplied to a data signal line is inverted with respect to one vertical scanning period and a refresh potential is not supplied during each horizontal scanning period. The mode G is a mode in which the polarity of a signal potential supplied to a data signal line is inverted with respect to each vertical scanning period and a refresh potential which is set based on both a signal potential during the previous 1H (horizontal scanning period) and a signal potential during a current horizontal scanning period is supplied during each horizontal scanning period. It is found from FIG. 59 that the configuration of (*a*) of FIG. 2 which corresponds to the mode A is superior to the mode F in terms of the sensory evaluation (as described above), and therefore reaches the required level.

As described above, with the configuration of FIG. 1 and (*a*) of FIG. 2, the display quality of a liquid crystal display in which a larger size, higher definition, or higher-speed driving etc. makes full charging of pixels difficult even when simultaneous scanning of two lines is performed may be arranged so as to subdue variations in reached potential (charge ratio) during a current horizontal scanning period due to a difference in levels of signal potentials supplied to the same data signal line during the previous horizontal scanning period. Therefore, the liquid crystal display of the present embodiment may be preferably used for a digital-cinema-standard liquid crystal display having 2160 scanning signal lines and a super-high-vision-standard liquid crystal display having 4320 scanning signal lines.

In (*a*) of FIG. 2, the present invention may also adopt such a structure that each scanning signal line (G1, G2, . . . ) is selected plural times (e.g. three times) with timing when approximately ⅔ frame period has passed from last scanning and in synchronization with the refresh period R, and the refresh potential (e.g. Vcom) is written in a pixel connected with each scanning signal line during this intermediate selection period (see (*b*) of FIG. 2). The intermediate selection period is shorter than one horizontal scanning period. However, by setting a plurality of intermediate selection periods with one horizontal scanning period therebetween and thus performing impulse driving, it is possible to write black (insert black) in individual pixels. Consequently, a pixel displays input video image (data signal) during ⅔ frame period out of one frame period and displays black display or grayscale display close to the black display during ⅓ frame period out of the one frame period. This reduces tailing etc. when displaying a moving image, thereby improving the quality of the displayed moving image.

Figure 3:
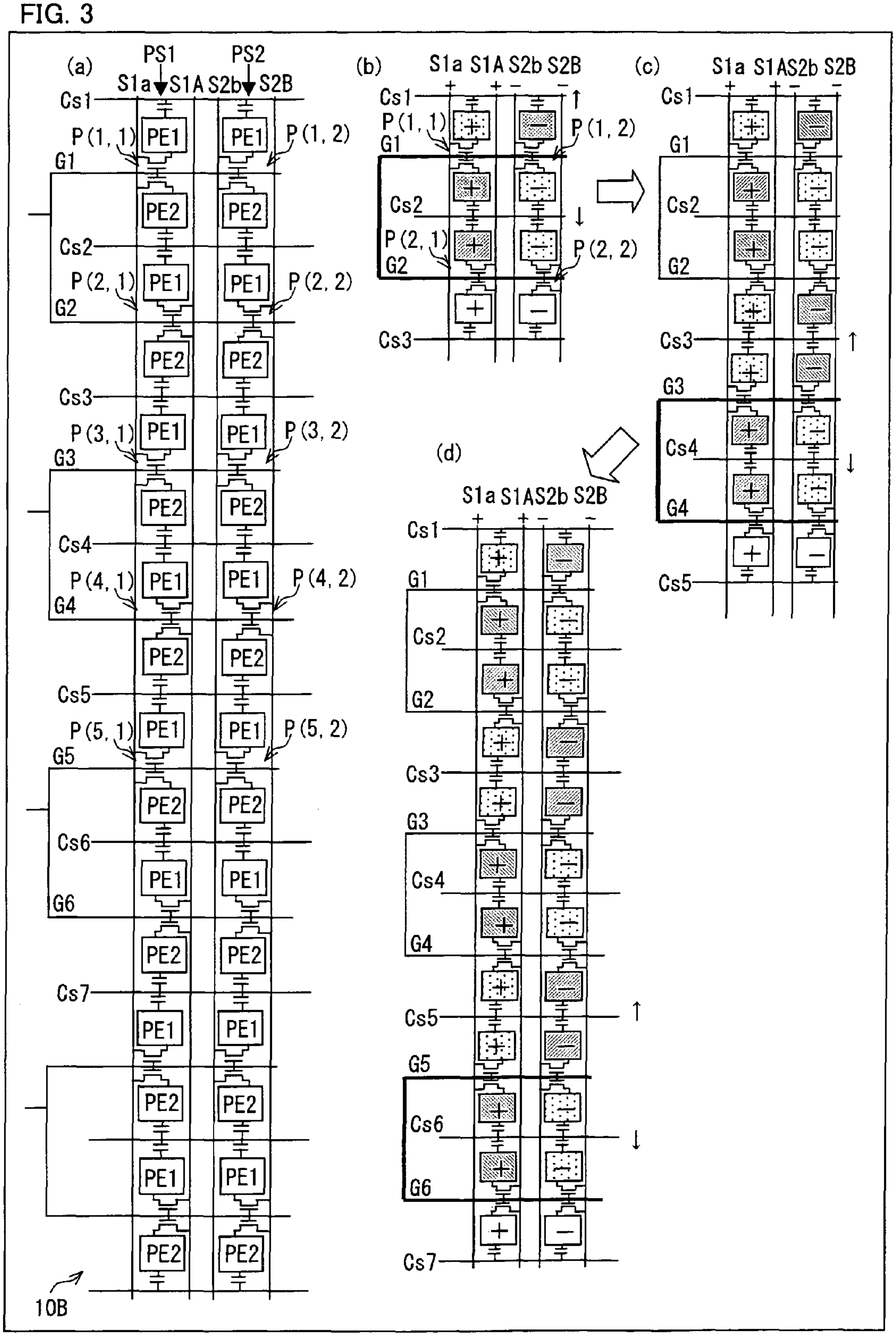
FIG. 3 (*a*) of FIG. 3 is a drawing schematically showing a display section of another liquid crystal display in accordance with Embodiment 1. (*b*) to (*d*) of FIG. 3 are drawings showing a method for driving the display section.

The display section 10A in (*a*) of FIG. 1 may be configured to have a pixel-division system (multi-pixel configuration) as shown in (*a*) of FIG. 3. In the display section 10B of (*a*) of FIG. 3, a scanning signal line for a pixel is provided in such a manner that the scanning signal line intersects the pixel, and a plurality of retention capacitance lines are provided in such a manner as to be parallel to the scanning signal line. Each pixel is configured such that a first transistor and a first pixel electrode PE1 are provided at one side of a scanning signal line intersecting the pixel, a second transistor and a second pixel electrode PE2 are provided at the other side of the scanning signal line, the first pixel electrode PE1 and the second pixel electrode PE2 are connected with the same data signal line via the first transistor and the second transistor, respectively, the first transistor and the second transistor are connected with the same scanning signal line, and the first pixel electrode PE1 and the second pixel electrode PE2 form retention capacitances with different retention capacitance lines, respectively. Further, a retention capacitance line is provided for two pixels adjacent in a column direction (two pixel columns), and a first or second pixel electrode provided in one of the two pixels and a first or second pixel electrode provided in the other of the two pixels form retention capacitance with the retention capacitance line. It should be noted that connections between individual pixels (first and second pixel electrodes PE1 and PE2 and first and second transistors that are included in each of the pixels) and a data signal line and a scanning signal line are designed to be the same as those of the display section 10A of (*a*) of FIG. 1.

For example, a scanning signal line G1 is provided in such a manner as to intersect a pixel P(1,1), and a plurality of retention capacitance lines (Cs1-Cs7) are provided in such a manner as to be parallel to scanning signal lines (G1-G6). The pixel P(1,1) is configured such that a first transistor and a first pixel electrode PE1 are provided at one side of the scanning signal line G1, and a second transistor and a second pixel electrode PE2 are provided at the other side of the scanning signal line G1, the first pixel electrode PE1 is connected with a first data signal line S1*a* via the first transistor and the second pixel electrode PE2 is connected with the first data signal line S1*a* via the second transistor, the first transistor and the second transistor are connected with the scanning signal line G1, the first pixel electrode PE1 forms retention capacitance with the retention capacitance line Cs1 and the second pixel electrode PE2 forms retention capacitance with the retention capacitance line Cs2. Further, a pixel P(2,1) is configured such that a first pixel electrode PE1 is connected with a second data signal line S1A via a first transistor and a second pixel electrode PE2 is connected with a second data signal line S1A via a second transistor, the first transistor and the second transistor are connected with a scanning signal line G2, the first pixel electrode PE1 forms retention capacitance with a retention capacitance line Cs2 and the second pixel electrode PE2 forms retention capacitance with a retention capacitance line Cs3. Further, a pixel P(1,2) is configured such that a first pixel electrode PE1 is connected with a first data signal line S2*b* via a first transistor and a second pixel electrode PE2 is connected with a first data signal line S2*b* via a second transistor, the first transistor and the second transistor are connected with the scanning signal line G1, the first pixel electrode PE1 forms retention capacitance with a retention capacitance line Cs1 and the second pixel electrode PE2 forms retention capacitance with a retention capacitance line Cs2. Further, a pixel P(2,2) is configured such that a first pixel electrode PE1 is connected with a second data signal line S2B via a second transistor and a second pixel electrode PE2 is connected with a second data signal line S2B via a second transistor, the first transistor and the second transistor are connected with a scanning signal line G2, the first pixel electrode PE1 forms retention capacitance with a retention capacitance line Cs2 and the second pixel electrode PE2 forms retention capacitance with a retention capacitance line Cs3. In this manner, two pixels adjacent to each other in a column direction (P(1,1) and P(2,1) or P(1,2) and P(2,2)) share the retention capacitance line Cs2.

Figure 4:
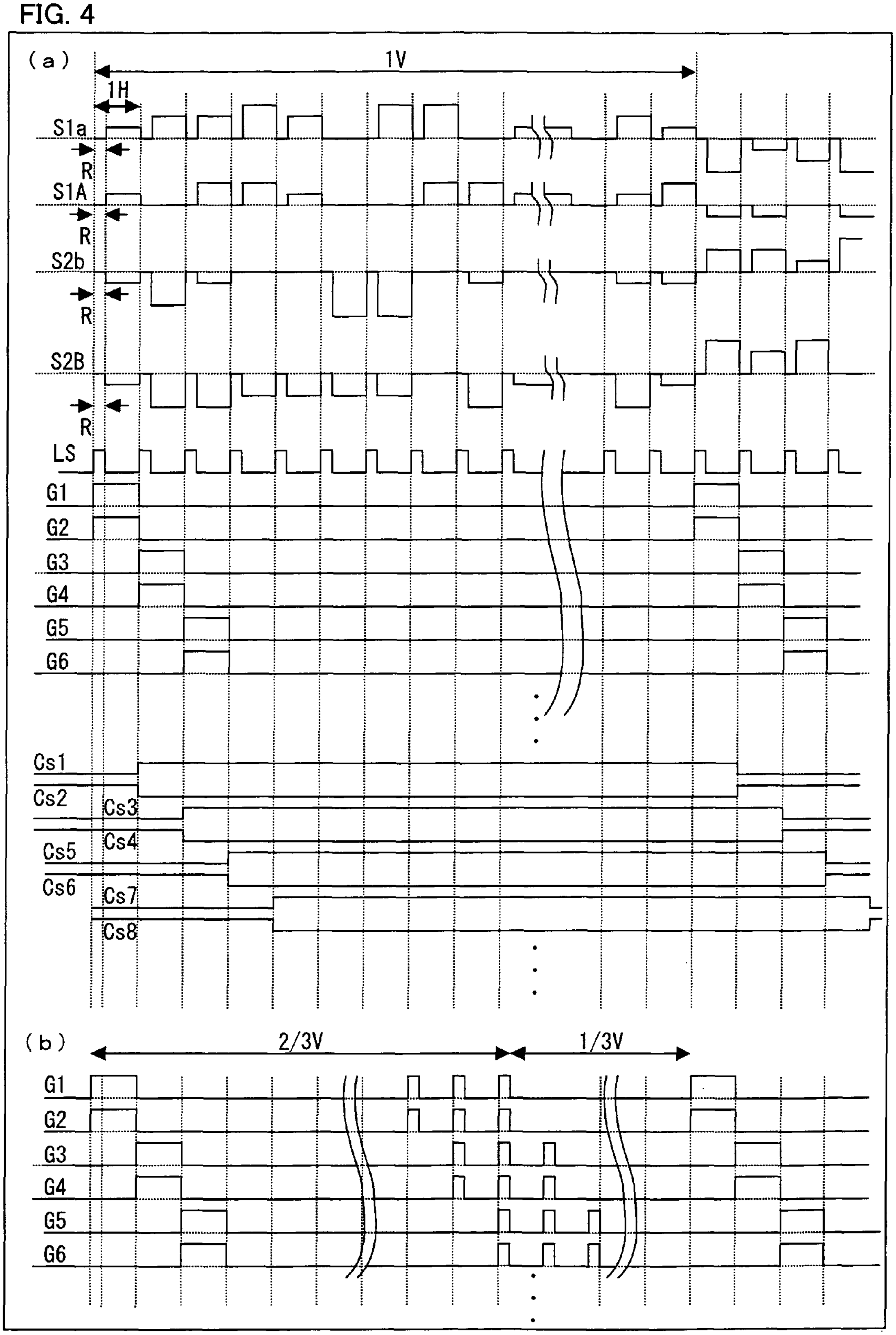
FIG. 4 (*a*) of FIG. 4 is a timing chart showing a method for driving the display section shown in (*a*) of FIG. 3. (*b*) of FIG. 4 is a timing chart showing a modification example of the method.

(*a*) of FIG. 4 is a timing chart showing a method for driving data signal lines, scanning signal lines, and retention capacitance lines of the display section 10B. As shown in (*a*) of FIG. 4, data signal lines and scanning signal lines are driven similarly with the configuration of (*a*) of FIG. 2, and retention capacitance lines are driven in such a manner that in synchronization with putting a scanning signal line connected with a certain pixel in an OFF state, or after putting the scanning signal line in an OFF state, potentials of two retention capacitance lines that form retention capacitances with a first pixel electrode PE1 and a second pixel electrode PE2 of the pixel, respectively, are caused to shift in opposite directions (rising and falling directions). For example, in synchronization with putting the scanning signal lines G1 and G2 in an OFF state, a potential of the retention capacitance line Cs1 is caused to shift in a rising direction and a potential of the retention capacitance line Cs2 is caused to shift in a falling direction, and in synchronization with putting the scanning signal lines G3 and G4 in an OFF state, a potential of the retention capacitance line Cs3 is caused to shift in a rising direction and a potential of the retention capacitance line Cs4 is caused to shift in a falling direction.

To be more specific, the retention capacitance lines of the display section 10B are configured and subjected to potential-control as follows: retention capacitance lines that form retention capacitances with pixel electrodes PE1 and PE2 of a pixel on a first row (e.g. P(1,1)) are first and second retention capacitance lines Cs1 and Cs2. The second retention capacitance line Cs2 also forms retention capacitance with a pixel electrode PE2 of a pixel on a second row (e.g. P(2,1)). At the time of completion of simultaneous writing of the pixels on the first and second rows or after the completion, potentials of the first and second retention capacitance lines Cs1 and Cs2 shift simultaneously and in an opposite direction. Between two successive odd-number-positioned retention capacitance lines (e.g. Cs1 and Cs3), shift of the potential of the former of the two successive odd-number-positioned retention capacitance lines (e.g. Cs1) is followed after 1 horizontal scanning period by shift of the potential of the latter of the two successive odd-number-positioned retention capacitance lines (e.g. Cs3) in the same direction. Between two successive even-number-positioned retention capacitance lines (e.g. Cs2 and Cs4), shift of the potential of the former of the two successive even-number-positioned retention capacitance lines (e.g. Cs2) is followed after 1 horizontal scanning period by shift of the potential of the latter of the two successive even-number-positioned retention capacitance lines (e.g. Cs4) in the same direction. The cycle of shift of the potential of each retention capacitance line is 1 vertical scanning period (1 frame period).

As shown in (*b*) of FIG. 3, in the display section 10B, during a first horizontal scanning period, scanning signal lines G1 and G2 are simultaneously made ON (put in a selected state), writing of a refresh potential and a same signal potential having a plus polarity from the first data signal line S1*a* to the first and second pixel electrodes PE1 and PE2 of the pixel P(1,1) and writing of a refresh potential and a same signal potential having a plus polarity from the second data signal line S1A to the first and second pixel electrodes PE1 and PE2 of the pixel P(2,1) are carried out simultaneously, and writing of a refresh potential and a same signal potential having a minus polarity from the first data signal line S2*b* to the first and second pixel electrodes PE1 and PE2 of the pixel P(1,2) and writing of a refresh potential and a same signal potential having a minus polarity from the second data signal line S2B to the first and second pixel electrodes PE1 and PE2 of the pixel P(2,2) are carried out simultaneously.

In synchronization with making the scanning signal lines G1 and G2 OFF simultaneously, the retention capacitance line Cs1 is caused to rise and the retention capacitance line Cs2 is caused to fall. Consequently, a portion of the pixel P(1,1) which includes the first pixel electrode PE1 serves as a bright sub-pixel, a portion of the pixel P(1,1) which includes the second pixel electrode PE2 serves as a dark sub-pixel, a portion of the pixel P(2,1) which includes the first pixel electrode PE1 serves as a dark sub-pixel, a portion of the pixel P(1,2) which includes the first pixel electrode PE1 serves as a dark sub-pixel, a portion of the pixel P(1,2) which includes the second pixel electrode PE2 serves as a bright sub-pixel, and a portion of the pixel P(2,2) which includes the second pixel electrode PE1 serves as a bright sub-pixel. Control in the next horizontal scanning period is performed as shown in FIG. 3(*c*), and control in the further next horizontal scanning period is performed as shown in FIG. 3(*d*).

As describe above, the configuration of FIG. 3 and (*a*) of FIG. 4 allows not only the effects yielded by the configuration of FIG. 1 and (*a*) of FIG. 2 but also improvement of a viewing angle characteristic by multi-pixel driving (suppression of excess brightness seen in halftone display which is obtained by displaying a halftone based on pixels each including a bright sub-pixel and a dark sub-pixel).

The configuration of (*a*) of FIG. 4 may be arranged such that each scanning signal line (G1, G2, . . . ) is selected plural times (e.g. three times) with timing when approximately ⅔ frame period has passed from the previous scanning and in synchronization with the refresh period R, and the refresh potential (e.g. Vcom) is written in a pixel connected with the scanning signal line during this intermediate selection period (see (*b*) of FIG. 4). Consequently, a pixel displays input video image (data signal) during ⅔ frame period out of one frame period and displays black display or grayscale display close to the black display during ⅓ frame period out of the one frame period. This reduces tailing etc. when displaying a moving image, thereby improving the quality of the displayed moving image.

Embodiment 2

Figure 5:
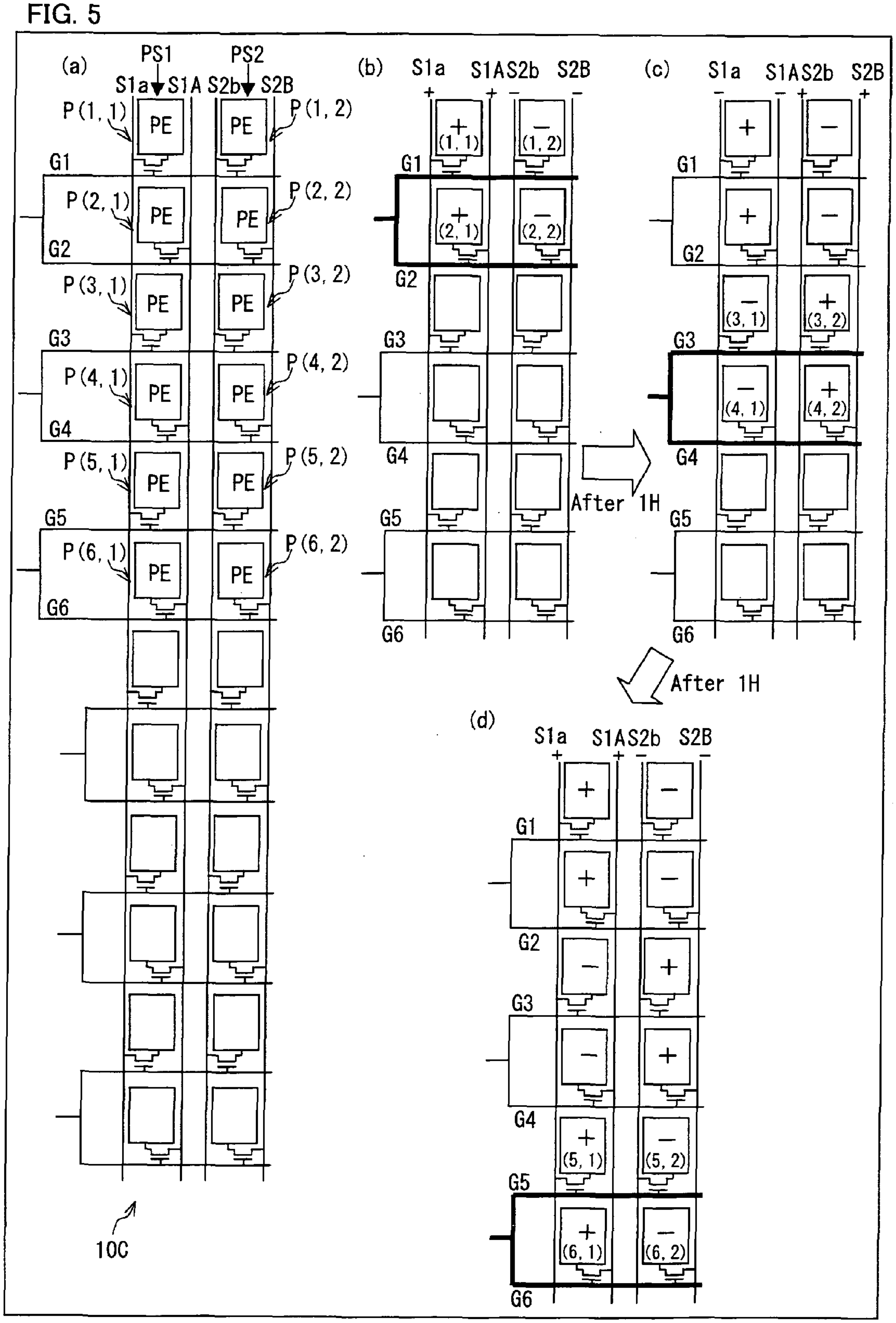
FIG. 5 (*a*) of FIG. 5 is a drawing schematically showing a display section of a liquid crystal display in accordance with Embodiment 2. (*b*) to (*d*) of FIG. 5 are drawings showing a method for driving the display section.
Figure 6:
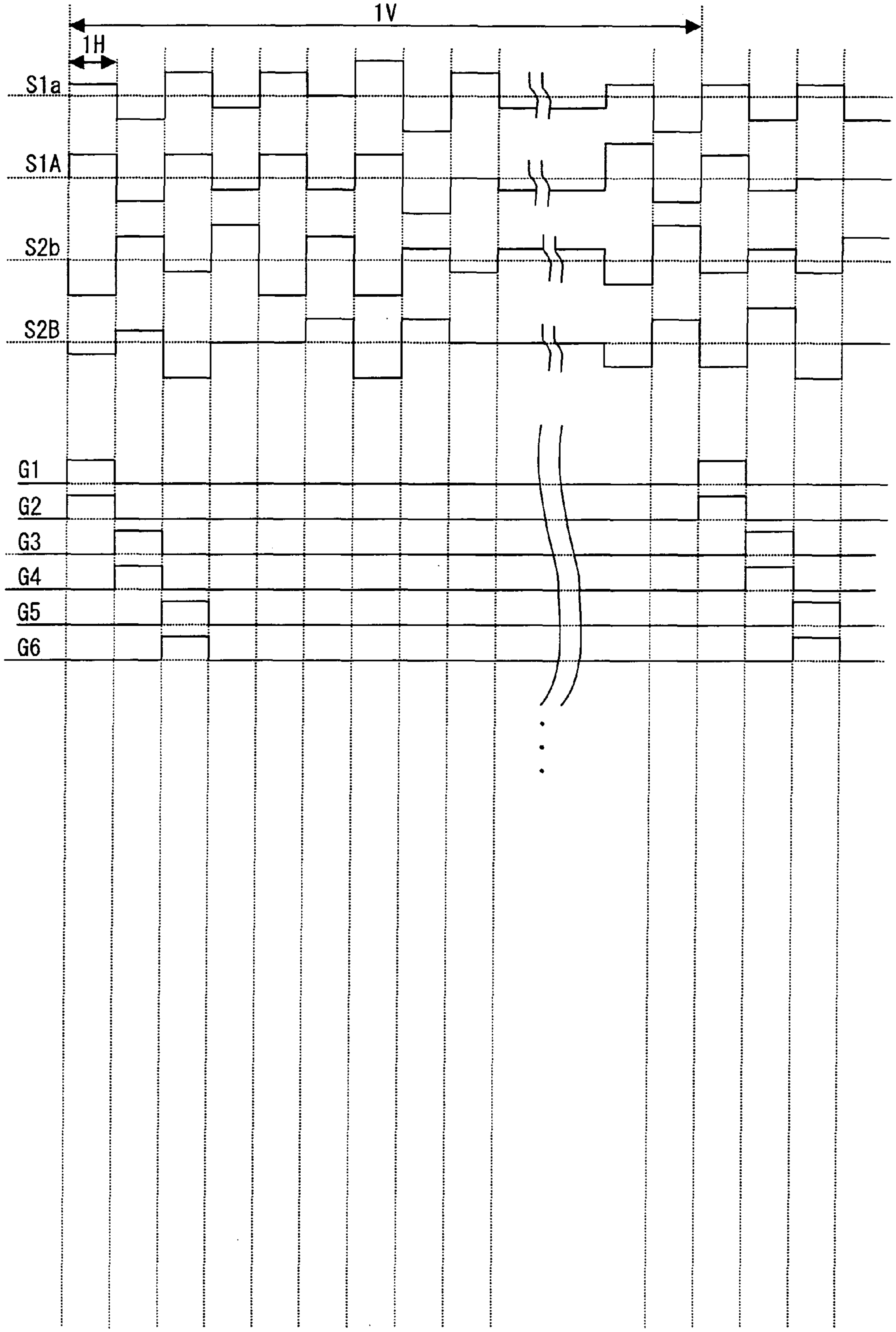
FIG. 6 is a timing chart showing a method for driving the display section shown in (*a*) of FIG. 5.

(*a*) of FIG. 5 is a drawing schematically showing an example of a structure of a display section of a liquid crystal display of the present invention. (*b*)-(*d*) of FIG. 5 are drawings schematically showing a method for driving the display section, and FIG. 6 is a timing chart for the method. Connections between individual pixels (pixel electrodes PE and transistors included therein) in the display section 10C in (*a*) of FIG. 5 and data signal lines and scanning signal lines are the same as those in the display section 10A of (*a*) of FIG. 1, and a method for driving scanning signal lines in FIG. 6 is the same as that of (*a*) of FIG. 2.

In the present embodiment, as shown in FIGS. 5 and 6, a first data signal line and a second data signal line are supplied with signal potentials with the same polarity, and the polarities of the supplied signal potentials are inverted with respect to each horizontal scanning period (1H), and two data signal lines for one of adjacent two pixel columns and two data signal lines for the other of the adjacent two pixel columns are supplied with signal potentials with opposite polarities.

Consequently, in the display section 10C, during a first horizontal scanning period, writing of a signal potential having a plus polarity from the first data signal line S1*a* to the pixel electrode of the pixel P(1,1) and writing of a potential having a plus polarity from the second data signal line S1A to the pixel P(2,1) are carried out simultaneously, and writing of a signal potential having a minus polarity from the first data signal line S2*b* to the pixel electrode of the pixel P(1,2) and writing of a signal potential having a minus polarity from the second data signal line S2B to the pixel P(2,2) are carried out simultaneously (see (*b*) of FIG. 5 and FIG. 6). Further, during a next horizontal scanning period, writing of a signal potential having a minus polarity from the first data signal line S1*a* to the pixel electrode of the pixel P(3,1) and writing of a signal potential having a minus polarity from the second data signal line S1A to the pixel electrode of the pixel P(4,1) are carried out simultaneously, and writing of a signal potential having a plus polarity from the first data signal line S2*b* to the pixel electrode of the pixel P(3,2) and writing of a signal potential having a plus polarity from the second data signal line S2B to the pixel P(4,2) are carried out simultaneously (see (*c*) of FIG. 5 and FIG. 6). During a further next horizontal scanning period, writing of a signal potential having a plus polarity from the first data signal line S1*a* to the pixel electrode of the pixel P(5,1) and writing of a signal potential having a minus polarity from the second data signal line S1A to the pixel P(6,1) are carried out simultaneously, and writing of a signal potential having a minus polarity from the first data signal line S2*b* to the pixel electrode of the pixel P(5,2) and writing of a potential having a minus polarity from the second data signal line S2B to the pixel electrode of the pixel P(6,2) are carried out simultaneously (see (*d*) of FIG. 5 and FIG. 6). In the display section 10C, as shown in (*d*) of FIG. 5, polarity distribution of potentials written in individual pixels exhibits 2H/1V inversion (polarity is inverted with respect to every two pixels in a column direction and inverted with respect to each pixel in a row direction).

In the configuration of FIGS. 5 and 6, the polarity of a signal potential supplied to a data signal line is inverted with respect to each horizontal scanning period. This allows substantially uniforming charging waveforms of a pixel regardless of the level of signal potentials supplied to the same data signal line during the previous horizontal scanning period, in a case where simultaneous scanning of two lines does not secure sufficient full charging.

Figure 46:
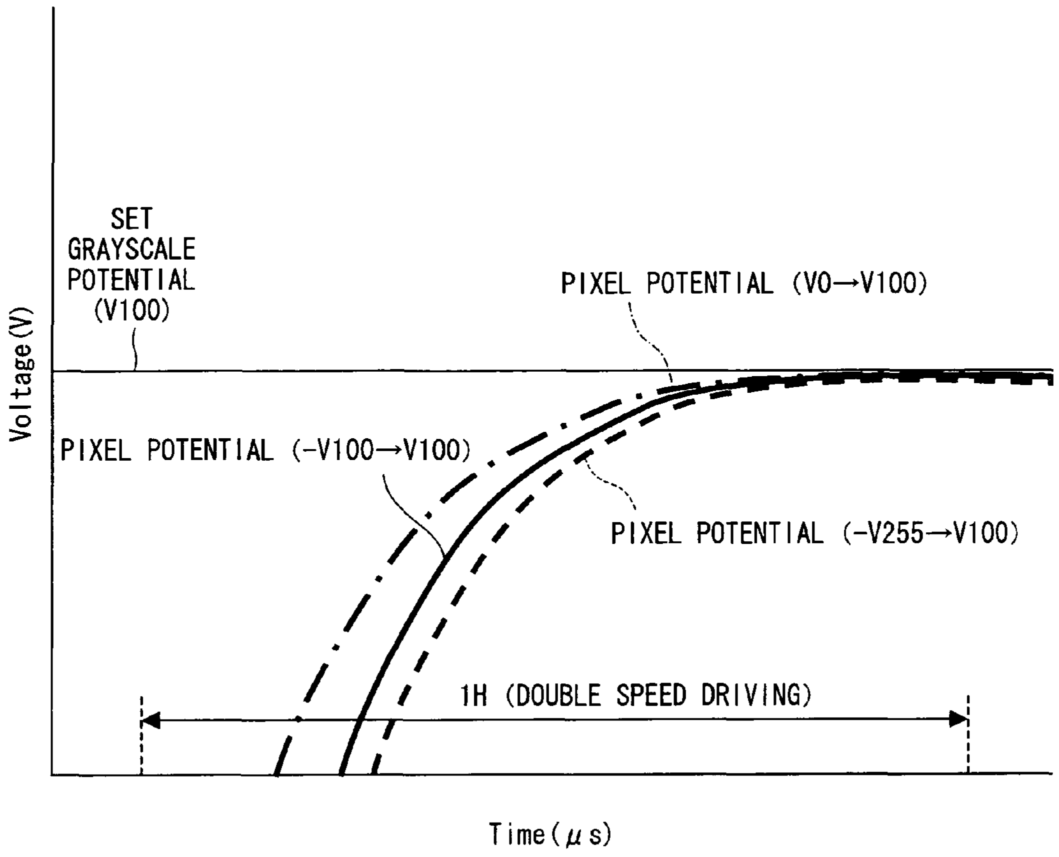
FIG. 46 is a waveform chart showing variation in reached potential during a current horizontal scanning period due to the level of a potential supplied during the previous horizontal scanning period in a case where the polarity of a signal potential supplied to a data signal line is inverted with respect to each horizontal scanning period.

That is, in double speed driving, when the polarity of a signal potential supplied to a data signal line is plus during one frame and the grayscale in a current horizontal scanning period is a halftone, the reached potential varies due to a difference in the levels of potentials supplied during last horizontal scanning period, as described above (see FIG. 43). However, by performing double speed driving while causing the polarity of a signal potential supplied to a data signal line to be inverted with respect to each horizontal scanning period as shown in FIG. 6, it is possible to cause (i) the waveform of a pixel potential at the time when the level of a potential supplied during the previous horizontal scanning period corresponds to a white tone (grayscale potential V255=−7.5V (potential when common potential is potential 0)), (ii) the waveform of a pixel potential at the time when the level corresponds to a black tone (grayscale potential V0=0V), and (iii) the waveform of a pixel potential at the time when the level corresponds to a halftone to be uniform with one another as shown in FIG. 46, thereby causing reached potentials of individual cases to be substantially the same with one another. Note that FIG. 46 relates to double speed driving as described above, and one horizontal scanning period (1H) is 14.82 [μs].

Further, when the double speed driving is performed in the configuration of FIG. 6, 1H is specifically as above. It is found from FIG. 59 that the configuration of FIG. 6 corresponding to the mode B is most superior in terms of the sensory evaluations.

As described above, with the display section 10C, a liquid crystal display in which a larger size, higher definition, or higher-speed driving etc. makes full charging of pixels difficult even when simultaneous scanning of two lines is performed may be arranged so as to greatly subdue variations in reached potential (charge ratio) during a current horizontal scanning period due to a difference in levels of signal potentials supplied to the same data signal line during the previous horizontal scanning period. Therefore, the display section 10C may be preferably used for a digital-cinema-standard liquid crystal display having 2160 scanning signal lines and a super-high-vision-standard liquid crystal display having 4320 scanning signal lines. The configuration of FIG. 6 may be arranged such that a refresh period R is provided at the beginning of each horizontal scanning period and a refresh potential (e.g. Vcom) is supplied to individual data signal lines during the refresh period R (see (*a*) of FIG. 7). This arrangement allows charging waveforms of a pixel to be substantially uniform with each other regardless of the levels of signal potentials supplied to the same data signal line during last horizontal scanning period in a case where even simultaneous scanning of two lines does not secure sufficient full charging.

Figure 45:
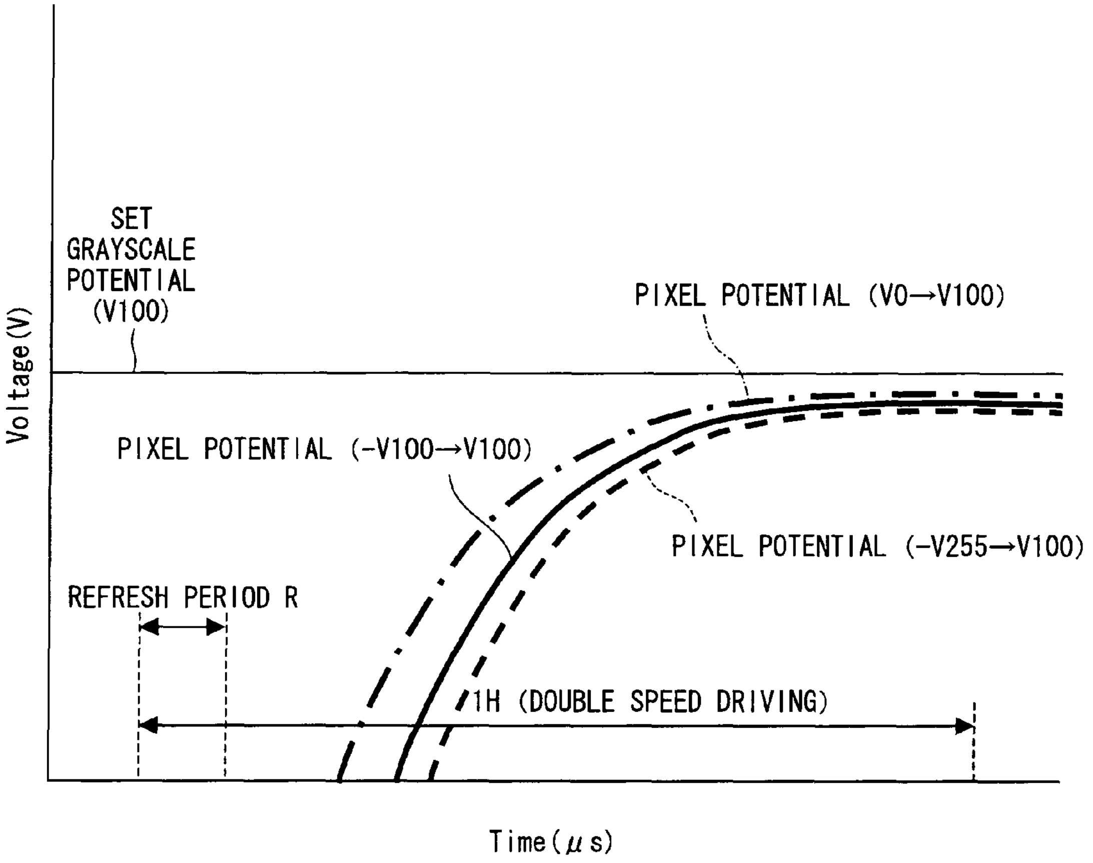
FIG. 45 is a waveform chart showing variation in reached potential during a current horizontal scanning period due to the level of a potential supplied during the previous horizontal scanning period in a case where the polarity of a signal potential supplied to a data signal line is inverted with respect to each horizontal scanning period and a refresh potential is supplied to a data signal line at the beginning of a horizontal scanning period.

That is, in double speed driving, when the polarity of a signal potential supplied to a data signal line is plus during one frame and the grayscale in a current horizontal scanning period is a halftone, the reached potential varies due to a difference in the levels of potentials supplied during the previous horizontal scanning period (see FIG. 43). However, by supplying the data signal line with a refresh potential (e.g. Vcom) during each horizontal scanning period (the polarity of a signal potential is inverted with respect to each horizontal scanning period), it is possible to cause (i) the waveform of a pixel potential at the time when the level of a signal potential supplied during the previous horizontal scanning period corresponds to a white tone (grayscale potential V255=−7.5V (potential when common potential is potential 0)), (ii) the waveform of a pixel potential at the time when the level corresponds to a black tone (grayscale potential V0=0V), and (iii) the waveform of a pixel potential at the time when the level corresponds to a halftone to be substantially uniform with one another as shown in FIG. 45, thereby causing reached potentials of individual cases to be substantially the same with one another. Note that FIG. 45 relates to double speed driving as described above, and one horizontal scanning period (1H) is 14.82 [μs] and the refresh period R is 1.5 [μs]. Further, when the double speed driving is performed in the configuration of (*a*) of FIG. 7, 1H and the refresh period R are specifically as above. It is found from FIG. 59 that although the configuration of (*a*) of FIG. 7 corresponding to the mode C is a bit inferior to the mode B (FIG. 6) in terms of the sensory evaluations, the configuration of (*a*) of FIG. 7 meets the required level, and besides, has less power consumption and less generation of heat of a source driver compared with the mode B since a refresh potential is supplied during each horizontal scanning period in the configuration of (*a*) of FIG. 7.

Figure 7:
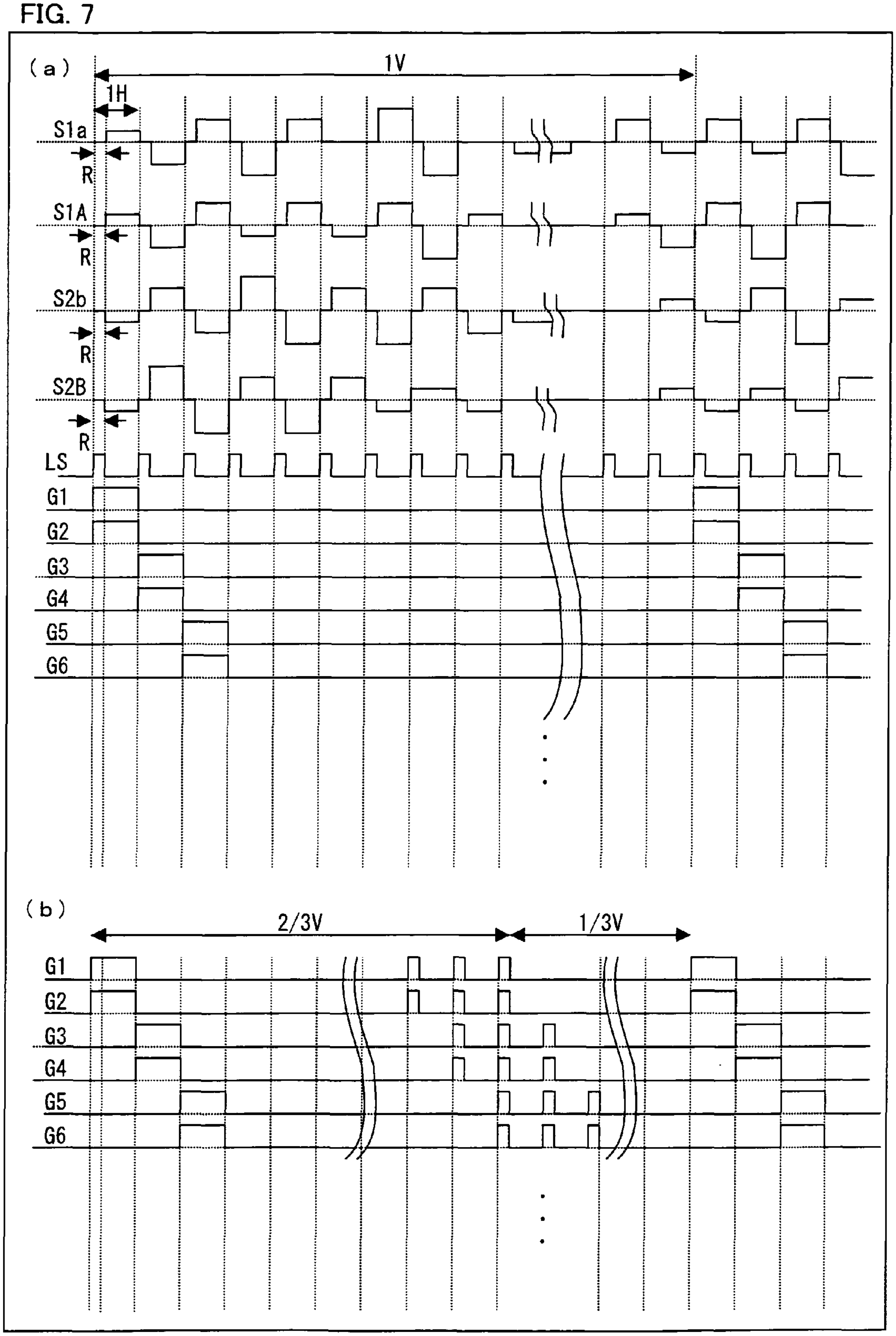
FIG. 7 (*a*) of FIG. 7 is a drawing schematically showing another method for driving a display section shown in (*a*) of FIG. 5. (*b*) is a timing chart showing a modification example of the method.

Further, as shown in (*b*) of FIG. 7, each scanning signal line is selected plural times (e.g. three times) with timing when approximately ⅔ frame period has passed from previous scanning and in synchronization with the refresh period R, and the refresh potential (e.g. Vcom) is written in a pixel connected with the scanning signal line during this intermediate selection period. This reduces tailing etc. when displaying a moving image, thereby improving the quality of the displayed moving image.

Figure 8:
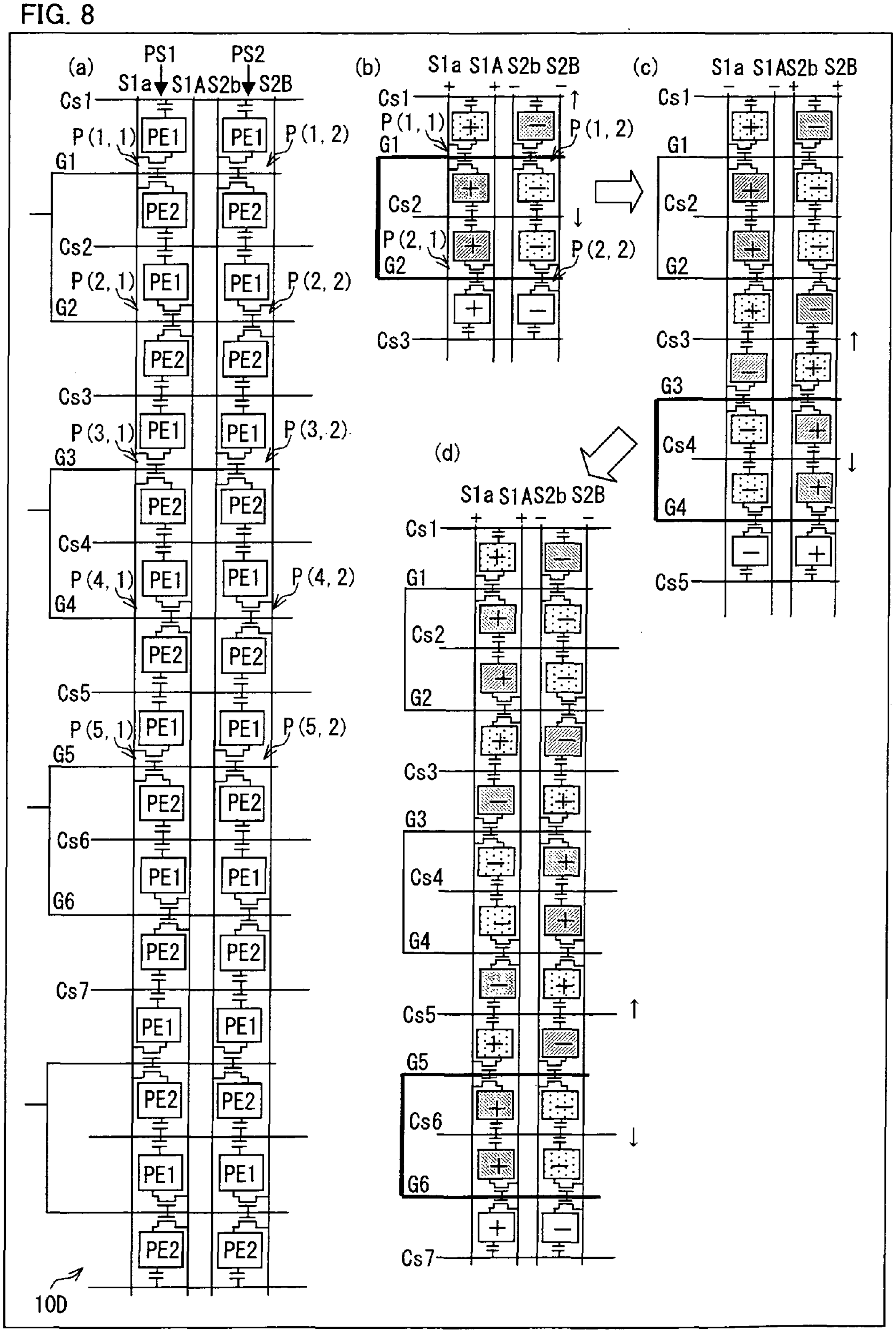
FIG. 8 (*a*) of FIG. 8 is a drawing schematically showing a display section of another liquid crystal display in accordance with Embodiment 2. (*b*)-(*d*) of FIG. 8 are drawings showing a method for driving the display section.
Figure 9:
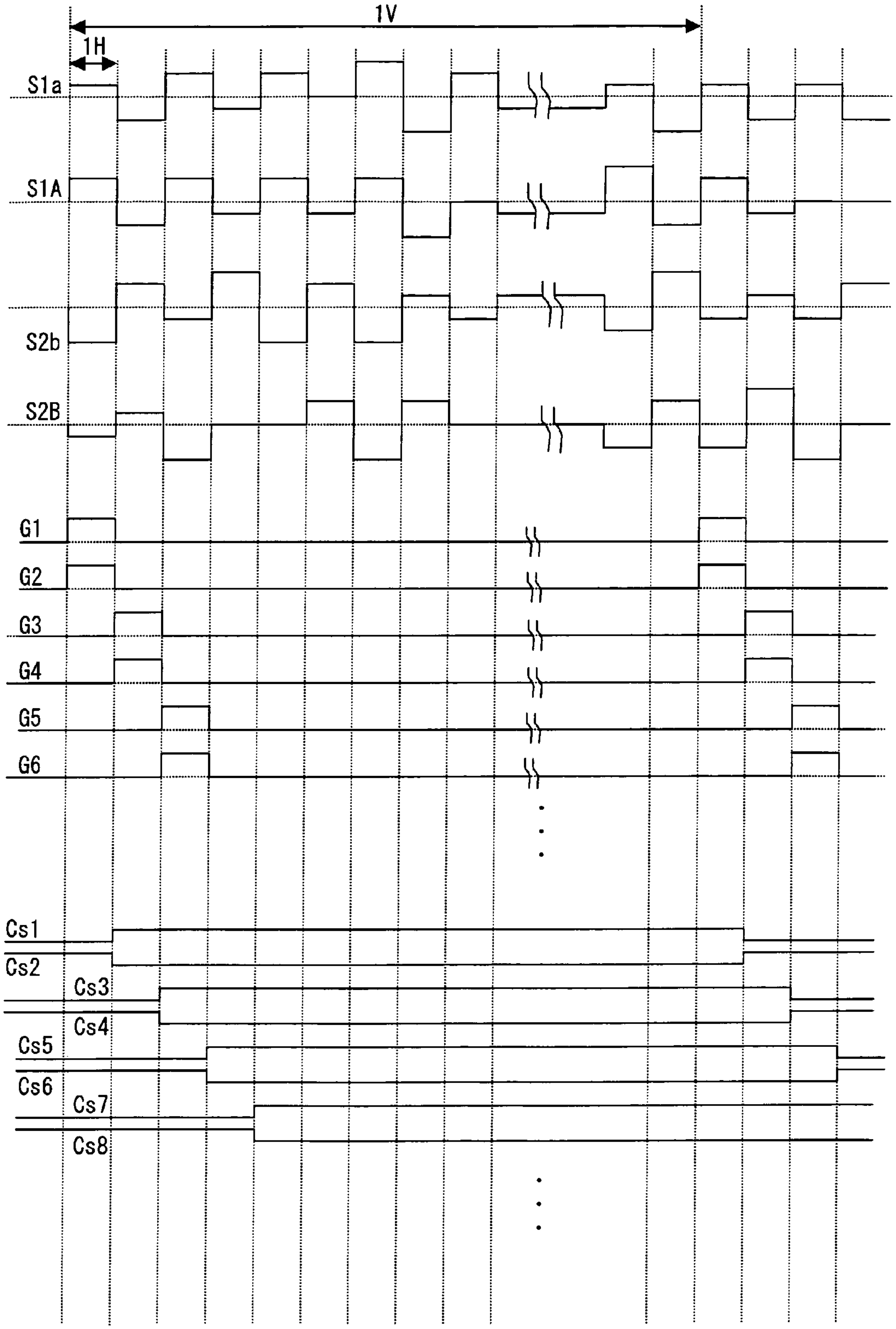
FIG. 9 is a timing chart showing a method for driving the display section shown in (*a*) of FIG. 8.

The display section 10C shown in (*a*) of FIG. 5 may be arranged to be a display section 10D shown in (*a*) of FIG. 8 based on a pixel division system (multi-pixel structure). (*b*)-(*d*) of FIG. 8 are drawings schematically showing a method for driving the display section 10D. FIG. 9 is a timing chart showing the method. Connections between each pixel of the display section 10D (first and second pixels PE1 and PE2 and first and second transistors included in the pixel) and a data signal line and a scanning signal line are the same as those of the display section 10C shown in (*a*) of FIG. 5, and the method for driving scanning signal lines shown in FIG. 9 is the same as that for the configuration of FIG. 6.

As shown in (*b*) of FIG. 8, in the display section 10D, during a first horizontal scanning period, scanning signal lines G1 and G2 are simultaneously made ON (put in a selected state), writing of a same signal potential having a plus polarity from the first data signal line S1*a* to the first and second pixel electrodes PE1 and PE2 of the pixel P(1,1) and writing of a same signal potential having a plus polarity from the second data signal line S1A to the first and second pixel electrodes PE1 and PE2 of the pixel P(2,1) are carried out simultaneously, and writing of a same signal potential having a minus polarity from the first data signal line S2*b* to the first and second pixel electrodes PE1 and PE2 of the pixel P(1,2) and writing of a same signal potential having a minus polarity from the second data signal line S2B to the first and second pixel electrodes PE1 and PE2 of the pixel P(2,2) are carried out simultaneously.

In synchronization with making the scanning signal lines G1 and G2 OFF simultaneously, the retention capacitance line Cs1 is caused to rise and the retention capacitance line Cs2 is caused to fall. Consequently, a portion of the pixel P(1,1) which includes the first pixel electrode PE1 serves as a bright sub-pixel, a portion of the pixel P(1,1) which includes the second pixel electrode PE2 serves as a dark sub-pixel, a portion of the pixel P(2,1) which includes the first pixel electrode PE1 serves as a dark sub-pixel, a portion of the pixel P(1,2) which includes the first pixel electrode PE1 serves as a dark sub-pixel, a portion of the pixel P(1,2) which includes the second pixel electrode PE2 serves as a bright sub-pixel, and a portion of the pixel P(2,2) which includes the second pixel electrode PE1 serves as a bright sub-pixel. Control in the next horizontal scanning period is performed as shown in FIG. 8(*c*), and control in the further next horizontal scanning period is performed as shown in FIG. 8(*d*).

Figure 10:
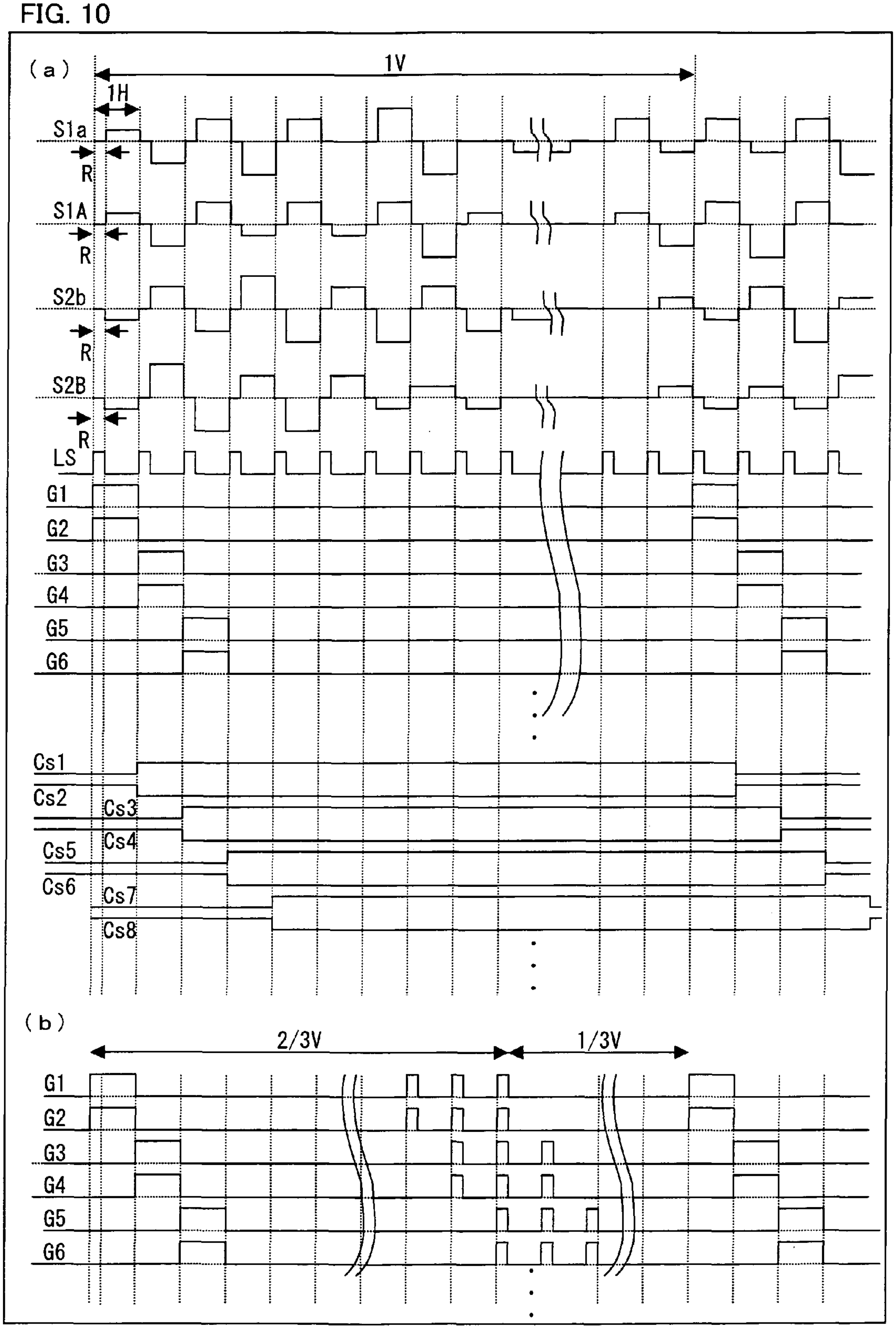
FIG. 10 (*a*) of FIG. 10 is a timing chart showing another method for driving the display section shown in (*a*) of FIG. 8. (*b*) of FIG. 10 is a timing chart showing a modification example of the method.

As describe above, the configuration of FIGS. 8 and 9 allows not only the effects yielded by the configuration of FIGS. 5 and 6 but also improvement of a viewing angle characteristic by multi-pixel driving. The configuration of FIG. 9 may be arranged such that a refresh period R is provided at the beginning of each horizontal scanning period and a refresh potential (e.g. Vcom) is supplied to individual data signal lines during the refresh period R ((*a*) of FIG. 10). In this case, the configuration of FIG. 9 allows not only the effects yielded by the configuration of (*a*) of FIG. 7 but also improvement of a viewing angle characteristic by multi-pixel driving. Further, as shown in (*b*) of FIG. 10, each scanning signal line is selected plural times (e.g. three times) with timing when approximately ⅔ frame period has passed from last scanning and in synchronization with the refresh period R, and the refresh potential (e.g. Vcom) is written in a pixel connected with the scanning signal line during this intermediate selection period. This reduces tailing etc. when displaying a moving image, thereby improving the quality of the displayed moving image.

Embodiment 3

Figure 11:
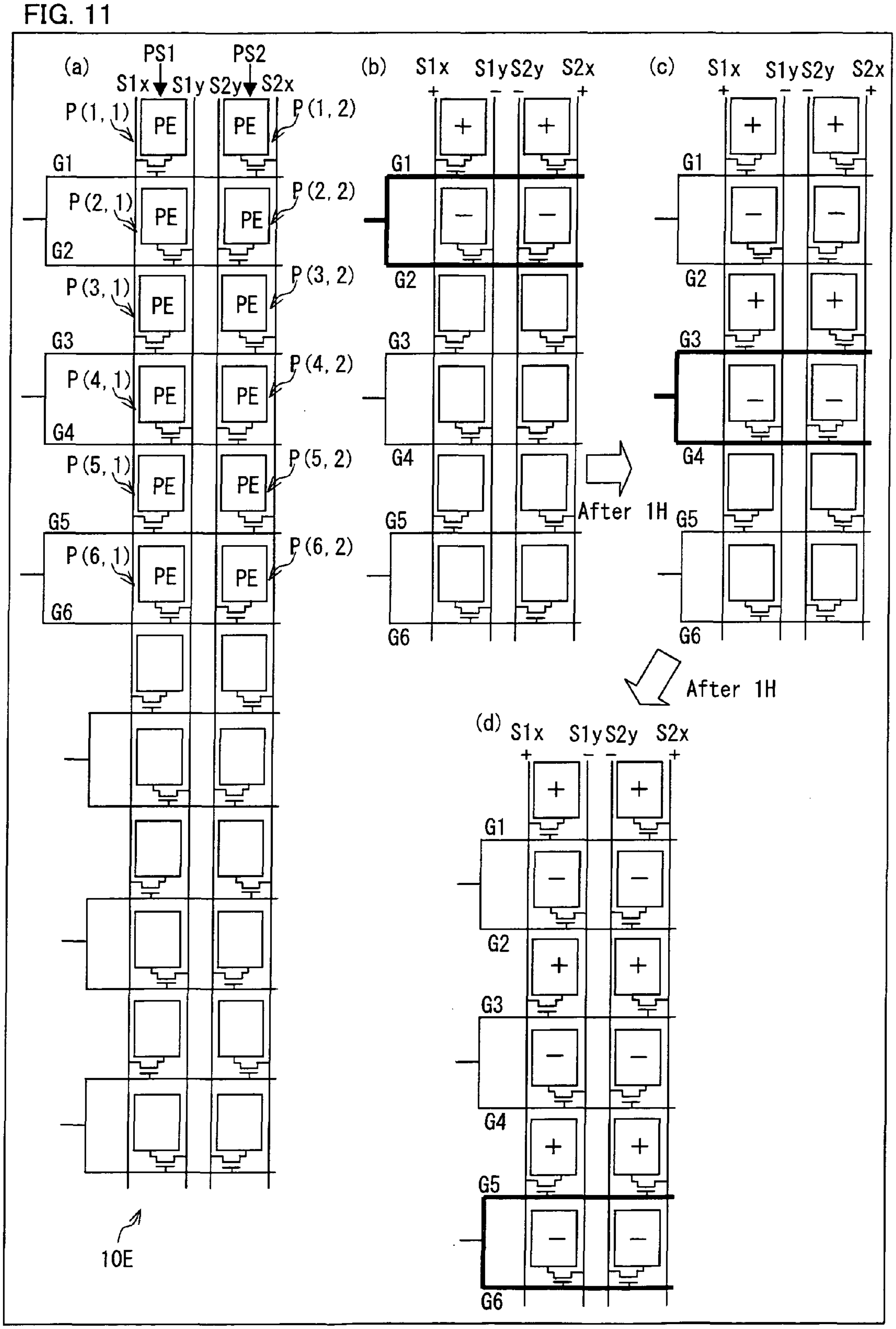
FIG. 11 (*a*) of FIG. 11 is a drawing schematically showing a display section of a liquid crystal display in accordance with Embodiment 3. (*b*)-(*d*) of FIG. 11 are drawings schematically showing a method for driving the display section.
Figure 12:
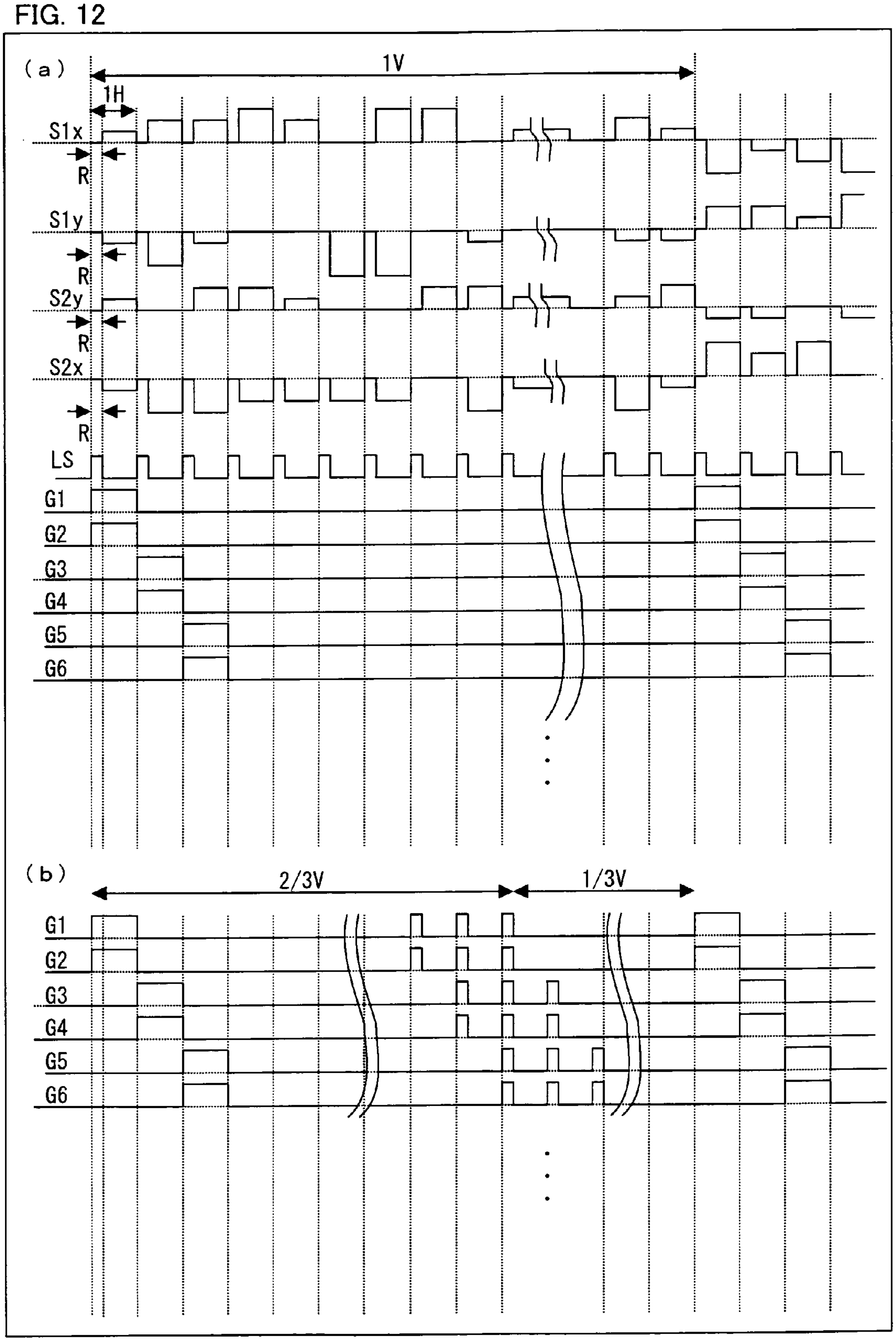
FIG. 12 (*a*) of FIG. 12 is a timing chart showing a method for driving the display section shown in (*a*) of FIG. 11. (*b*) of FIG. 12 is a timing chart showing a modification example of the method.

(*a*) of FIG. 11 is a drawing schematically showing one example of a configuration of a display section of the liquid crystal display of the present invention. (*b*)-(*d*) of FIG. 11 show a driving method of the display section. (*a*) of FIG. 12 is a timing chart showing the driving method. As shown in (*a*) of FIG. 11, a display section 10E includes a first data signal line and a second data signal line (S1*x* and S1*y*) which are provided with respect to each pixel column (e.g. PS1) and which are positioned at both sides of the pixel column, and one pixel (e.g. P (1, 1)) included in the pixel column is connected with one scanning signal line G1 and is connected with one of the first and second data signal lines (S1*x* and S1*y*). Specifically, assume that pixels on each pixel column are sequentially made pairs from a pixel on a first row on the column in such a manner that two pixels adjacent in a column direction are made a pair. In this case, two pixels in each pair are connected with different data signal lines. For example, in one pixel column, each of pixels on second row and thereafter is connected with a data signal line which is different from a data signal line with which a pixel on an upstream adjacent row is connected. Pixels on one pixel row are connected with the same scanning signal line, and in each pixel, a pixel electrode PE is connected with one data signal line via a transistor (TFT) and the gate terminal of the transistor is connected with one scanning signal line.

Simultaneous selection of two scanning signal lines respectively connected with two pixels in a pair is sequentially carried out in a scanning direction. That is, scanning signal lines are sequentially selected with starting from a scanning signal line connected with a pixel on a first row in such a manner that adjacent two scanning signal lines are selected simultaneously.

In the present embodiment, as shown in FIG. 11 and (*a*) of FIG. 12, during each horizontal scanning period, first and second data signal lines are initially supplied with refresh potentials (preliminary potentials) and then supplied with signal potentials (potentials corresponding to data signals). Specifically, a refresh period R is provided at the beginning of each horizontal scanning period (1H), and a refresh potential is supplied to each data signal line during the refresh period R.

Further, the first and second data signal lines (e.g. S1*x* and S1*y*) are supplied with signal potentials with opposite polarities, and the polarity of a signal potential supplied to individual data signal lines is inverted with respect to one vertical scanning period (one frame). Further, a first data signal line (e.g. S1*x*) for one of adjacent two pixel columns and a first data signal line (e.g. S2*x*) for the other of the adjacent two pixel columns are supplied with signal potentials with the same polarity, and connections with the first and second data signal lines are the same between pixels adjacent in a row direction. A second data signal line (S1*y*) for one of adjacent two pixel columns (e.g. PS1 and PS2) and a second data signal line (S2*y*) for the other of the adjacent two pixel columns are adjacent to each other without a pixel column therebetween. Alternatively, a first data signal line for one of adjacent two pixel columns and a first data signal line for the other of the adjacent two pixel columns may be adjacent to each other without a pixel column therebetween.

Simultaneous selection of scanning signal lines connected with two pixels in a pair, respectively, is sequentially carried out in a scanning direction. That is, scanning signal lines are sequentially selected with starting from a scanning signal line connected with a pixel on a first row in such a manner that adjacent two scanning signal lines are simultaneously selected.

Consequently, in the display section 10E, during a first horizontal scanning period, sequential writing of a refresh potential and a signal potential with a plus polarity from the first data signal line S1*x* to the pixel electrode of the pixel P(1,1) and sequential writing of a refresh potential and a signal potential with a minus polarity from the second data signal line S1*y* to the pixel electrode of the pixel P(2,1) are carried out simultaneously. Sequential writing of a refresh potential and a signal potential with a plus polarity from the first data signal line S2*x* to the pixel electrode of the pixel P(1,2) and sequential writing of a refresh potential and a signal potential with a minus polarity from the second data signal line S2*y* to the pixel electrode of the pixel P(2,2) are carried out simultaneously (see (*b*) of FIG. 11 and (*a*) of FIG. 12). During a next horizontal scanning period, writing is performed as shown in (*c*) of FIG. 11. During a further next horizontal scanning period, writing is performed as shown in (*d*) of FIG. 11. Consequently, in the display section 10E, polarity distribution of potentials written into pixels exhibits H-line inversion as shown in (*d*) of FIG. 11.

As described above, with the configuration of FIG. 11 and (*a*) of FIG. 12, it is possible to subdue variations in reached potential in a liquid crystal display in which a larger size, higher definition, or higher-speed driving etc. makes full charging of pixels difficult even when simultaneous scanning of two lines is performed. Further, signal potentials supplied to two data signal lines (e.g. S1*y* and S2*y*) adjacent to each other (close to each other) without a pixel column therebetween always have the same polarity, and therefore it is possible to reduce power consumption due to parasitic capacitance between the two data signal lines, thereby reducing a load on a source driver. Further, the configuration of (*a*) of FIG. 12 may be configured such that each scanning signal line (G1, G2, . . . ) is selected plural times with timing when approximately ⅔ frame period has passed from the previous scanning and in synchronization with the refresh period R, and the refresh potential is written in a pixel connected with the scanning signal line during this intermediate selection period (see (*b*) of FIG. 12). This reduces tailing etc. when displaying a moving image, thereby improving the quality of the displayed moving image.

Embodiment 4

Figure 13:
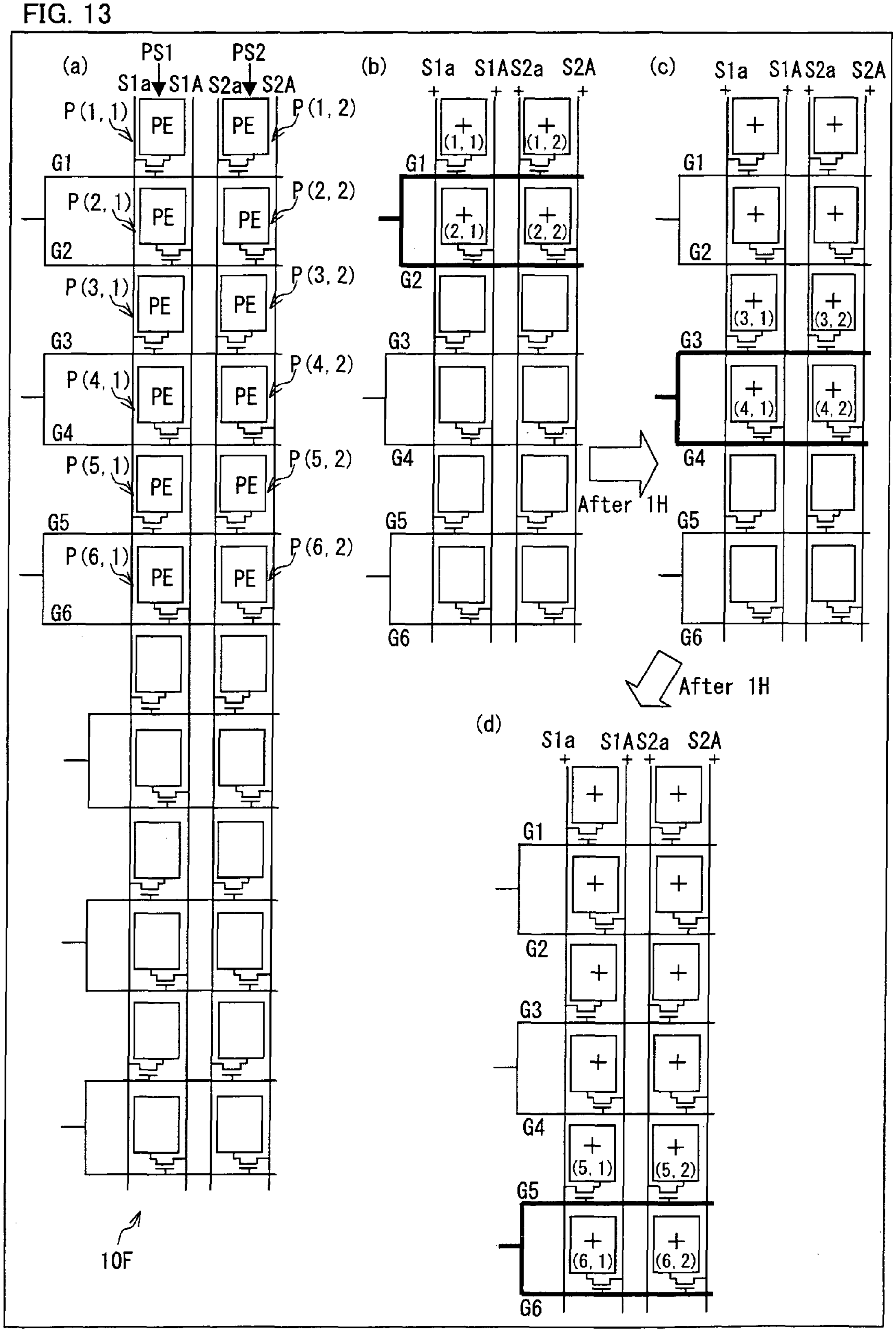
FIG. 13 (*a*) of FIG. 13 is a drawing schematically showing a display section of a liquid crystal display in accordance with Embodiment 4. (*b*)-(*d*) of FIG. 13 are drawings schematically showing a method for driving the display section.
Figure 14:
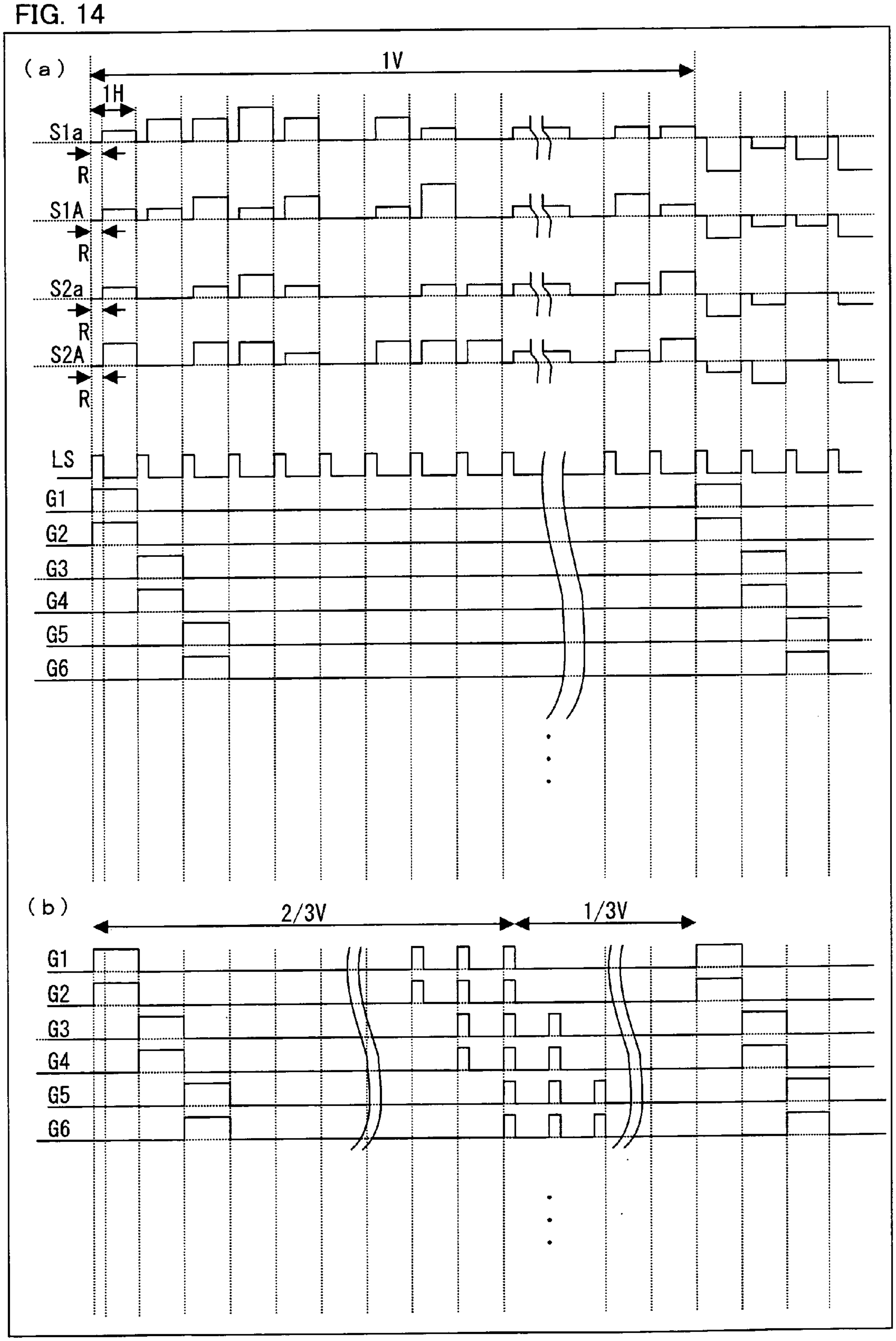
FIG. 14 (*a*) of FIG. 14 is a timing chart showing a method for driving the display section shown in (*a*) of FIG. 13. (*b*) of FIG. 14 is a timing chart showing a modification example of the method.

(*a*) of FIG. 13 is a drawing schematically showing one example of a configuration of a display section of the liquid crystal display of the present invention. (*b*)-(*d*) of FIG. 13 show a driving method of the display section. (*a*) of FIG. 14 is a timing chart showing the driving method. Connections between each pixel (pixel electrode PE and transistor included in the pixel) and a data signal line and a scanning signal line in a display section 10F shown in (*a*) of FIG. 13 are the same as those of the display section 10A shown in (*a*) of FIG. 1, and a method for driving scanning signal lines shown in (*a*) of FIG. 14 is the same as that of the configuration of (*a*) of FIG. 2.

In the present embodiment, as shown in FIG. 13 and (*a*) of FIG. 14, during each horizontal scanning period, first and second data signal lines are initially supplied with refresh potentials (preliminary potentials) and then supplied with signal potentials (potentials corresponding to data signals). Specifically, a refresh period R is provided at the beginning of each horizontal scanning period (1H), and a refresh potential is supplied to each data signal line during the refresh period R.

Further, the first and second data signal lines are supplied with signal potentials with the same polarity, and the polarity of a signal potential supplied to individual data signal lines is inverted with respect to one vertical scanning period (one frame). Further, two data signal lines for one of adjacent two pixel columns and two data signal lines for the other of the adjacent two pixel columns are supplied with signal potentials with the same polarity.

Consequently, in the display section 10F, during a first horizontal scanning period, sequential writing of a refresh potential and a signal potential with a plus polarity from the first data signal line S1*x* to the pixel electrode of the pixel P(1,1) and sequential writing of a refresh potential and a signal potential with a plus polarity from the second data signal line S1*y* to the pixel electrode of the pixel P(2,1) are carried out simultaneously. Sequential writing of a refresh potential and a signal potential with a plus polarity from the first data signal line S2*x* to the pixel electrode of the pixel P(1,2) and sequential writing of a refresh potential and a signal potential with a plus polarity from the second data signal line S2*y* to the pixel electrode of the pixel P(2,2) are carried out simultaneously (see (*b*) of FIG. 13 and (*a*) of FIG. 14). During a next horizontal scanning period, writing is performed as shown in (*c*) of FIG. 13. During a further next horizontal scanning period, writing is performed as shown in (*d*) of FIG. 13. Consequently, in the display section 10F, polarity distribution of potentials written into pixels exhibits frame inversion (all pixels exhibit the same polarity in one frame) as shown in (*d*) of FIG. 13.

As described above, with the configuration of FIG. 13 and (*a*) of FIG. 14, it is possible to subdue variations in reached potential in a liquid crystal display in which full charging of pixels is difficult even when simultaneous scanning of two lines is performed. Further, signal potentials supplied to two data signal lines adjacent to each other without a pixel column therebetween always have the same polarity, and therefore it is possible to reduce power consumption due to parasitic capacitance between the two data signal lines, thereby reducing a load on a source driver. Further, the configuration of (*a*) of FIG. 14 may be arranged such that each scanning signal line (G1, G2, . . . ) is selected plural times with timing when approximately ⅔ frame period has passed from the previous scanning and in synchronization with the refresh period R, and the refresh potential is written in a pixel connected with the scanning signal line during this intermediate selection period (see (*b*) of FIG. 14). This reduces tailing etc. when displaying a moving image, thereby improving the quality of the displayed moving image.

Embodiment 5

Figure 15:
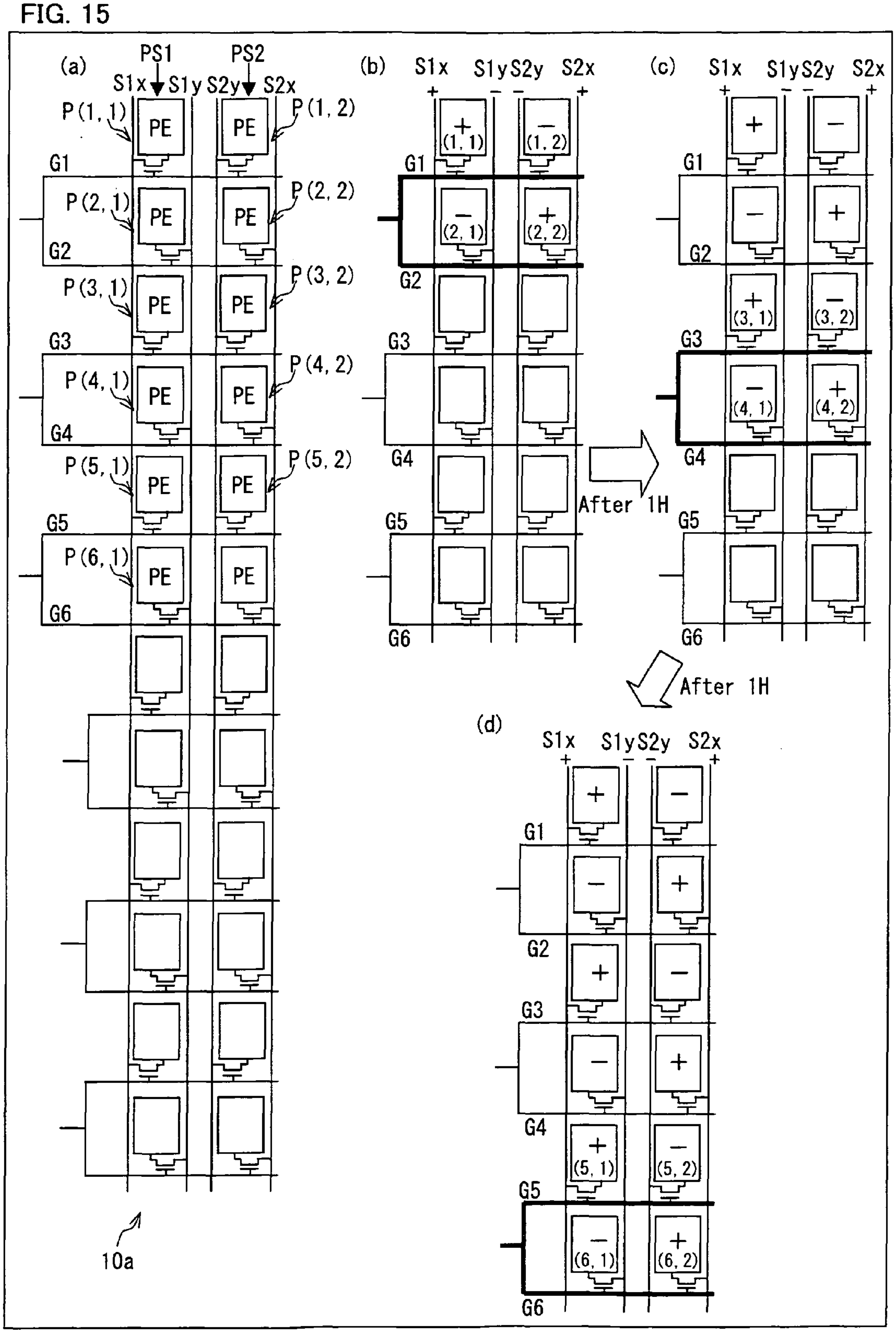
FIG. 15 (*a*) of FIG. 15 is a drawing schematically showing a display section of a liquid crystal display in accordance with Embodiment 5. (*b*)-(*d*) of FIG. 15 are drawings schematically showing a method for driving the display section.
Figure 16:
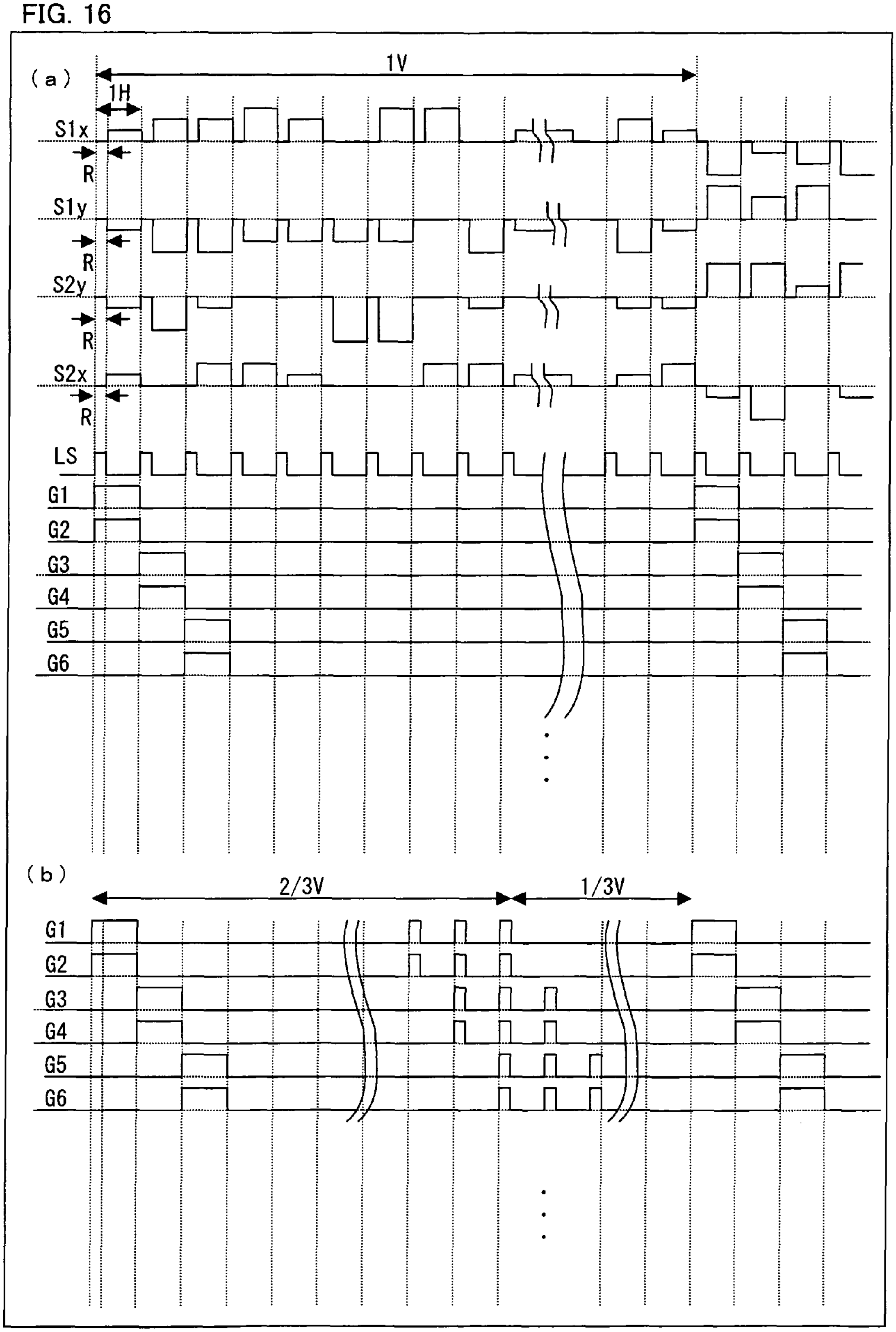
FIG. 16 (*a*) of FIG. 16 is a timing chart showing a method for driving the display section shown in (*a*) of FIG. 15. (*b*) of FIG. 16 is a timing chart showing a modification example of the method.

FIG. 15(*a*) is a drawing schematically showing one example of a configuration of a display section of the liquid crystal display of the present invention. (*b*)-(*d*) of FIG. 15 show a driving method of the display section. (*a*) of FIG. 16 is a timing chart showing the driving method. As shown in (*a*) of FIG. 15, a display section 10*a* includes a first data signal line and a second data signal line (e.g. S1*x* and S1*y*) which are provided with respect to each pixel column (e.g. PS1) and which are positioned at both sides of the pixel column, and one pixel (e.g. P (1, 1)) included in the pixel column is connected with one scanning signal line G1 and is connected with one of the first and second data signal lines (S1*x* and S1*y*). Specifically, assume that pixels on each pixel column are sequentially made pairs from a pixel on a first row on the column in such a manner that two pixels adjacent in a column direction are made a pair, and pairs thus made are given count numbers sequentially. In this case, two pixels in each pair are connected with different data signal lines, and two pairs that are given successive count numbers are designed such that an odd-number-positioned pixel in one of the two pairs and an odd-number-positioned pixel in the other of the two pairs are connected with the same data signal line. For example, in one pixel column, each of pixels on second row and thereafter is connected with a data signal line which is different from a data signal line with which a pixel in its upstream-adjacent row is connected. Pixels in one pixel row are connected with the same scanning signal line, and in each pixel, a pixel electrode PE is connected with one data signal line via a transistor (TFT) and the gate terminal of the transistor is connected with one scanning signal line.

Simultaneous selection of two scanning signal lines respectively connected with two pixels in a pair is sequentially carried out in a scanning direction (according to the count number mentioned above). That is, scanning signal lines are sequentially selected with starting from a scanning signal line connected with a pixel on a first row in such a manner that adjacent two scanning signal lines are selected simultaneously.

In the present embodiment, as shown in FIG. 15 and (*a*) of FIG. 16, during each horizontal scanning period, first and second data signal lines are initially supplied with refresh potentials (preliminary potentials) and then supplied with signal potentials (potentials corresponding to data signals). Specifically, a refresh period R is provided at the beginning of each horizontal scanning period (1H), and a refresh potential is supplied to each data signal line during the refresh period R.

Further, the first and second data signal lines (e.g. S1*x* and S1*y*) are supplied with signal potentials with opposite polarities, and the polarity of a signal potential supplied to individual data signal lines is inverted with respect to one vertical scanning period (one frame). Further, a first data signal line (e.g. S1*x*) for one of adjacent two pixel columns and a first data signal line (S2*x*) for the other of the adjacent two pixel columns are supplied with signal potentials with the same polarity, and connections with the first and second data signal lines are oppositely between pixels adjacent in a row direction. A second data signal line (S1*y*) for one of adjacent two pixel columns (e.g. PS1 and PS2) and a second data signal line (S2*y*) for the other of the adjacent two pixel columns are adjacent to each other without a pixel column therebetween. Alternatively, a first data signal line for one of adjacent two pixel columns and a first data signal line for the other of the adjacent two pixel columns may be adjacent to each other without a pixel column therebetween.

Consequently, in the display section 10*a*, during a first horizontal scanning period, sequential writing of a refresh potential and a signal potential with a plus polarity from the first data signal line S1*x* to the pixel electrode of the pixel P(1,1) and sequential writing of a refresh potential and a signal potential with a minus polarity from the second data signal line S1*y* to the pixel electrode of the pixel P(2,1) are carried out simultaneously. Sequential writing of a refresh potential and a signal potential with a minus polarity from the second data signal line S2*y* to the pixel electrode of the pixel P(1,2) and sequential writing of a refresh potential and a signal potential with a plus polarity from the first data signal line S2*x* to the pixel electrode of the pixel P(2,2) are carried out simultaneously (see (*b*) of FIG. 15 and (*a*) of FIG. 16). During a next horizontal scanning period, writing is performed as shown in (*c*) of FIG. 15. During a further next horizontal scanning period, writing is performed as shown in (*d*) of FIG. 15. Consequently, in the display section 10*a*, polarity distribution of potentials written into pixels exhibits dot inversion (1H/1V inversion) as shown in (*d*) of FIG. 15.

As described above, with the configuration of FIG. 15 and (*a*) of FIG. 16, it is possible not only to subdue variations in reached potential in a liquid crystal display in which full charging of pixels is difficult even when simultaneous scanning of two lines is performed, but also to subdue flickers by dot-inverting individual pixels. Further, signal potentials supplied to two data signal lines adjacent to each other without a pixel column therebetween always have the same polarity, and therefore it is possible to reduce power consumption due to parasitic capacitance between the two data signal lines, thereby reducing a load on a source driver. Further, the configuration of (*a*) of FIG. 16 may be arranged such that each scanning signal line (G1, G2, . . . ) is selected plural times with timing when approximately ⅔ frame period has passed from the previous scanning and in synchronization with the refresh period R, and the refresh potential is written in a pixel connected with the scanning signal line during this intermediate selection period (see (*b*) of FIG. 16). This reduces tailing etc. when displaying a moving image, thereby improving the quality of the displayed moving image.

Figure 17:
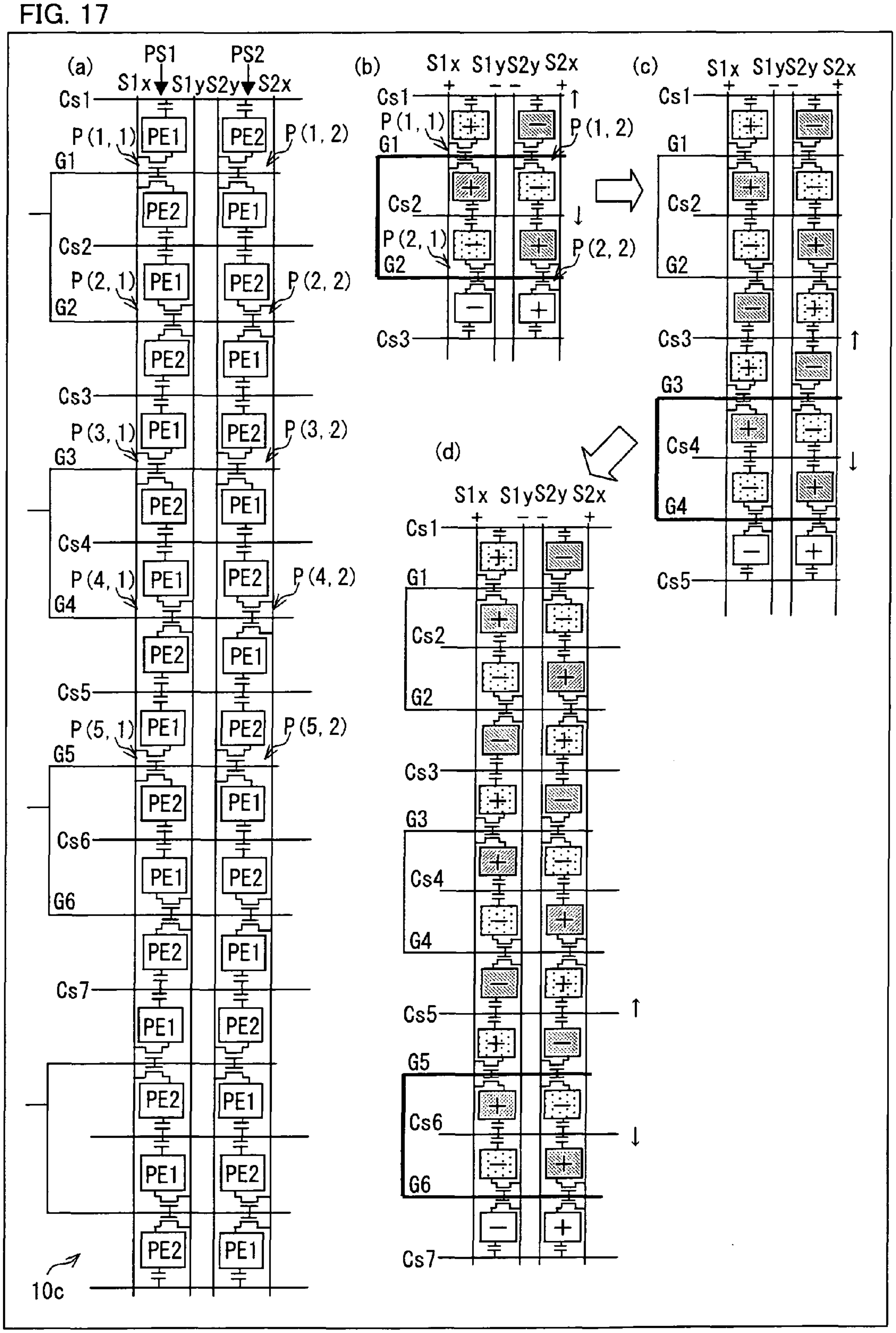
FIG. 17 (*a*) of FIG. 17 is a drawing schematically showing a display section of another liquid crystal display in accordance with Embodiment 5. (*b*)-(*d*) of FIG. 17 are drawings schematically showing a method for driving the display section.
Figure 18:
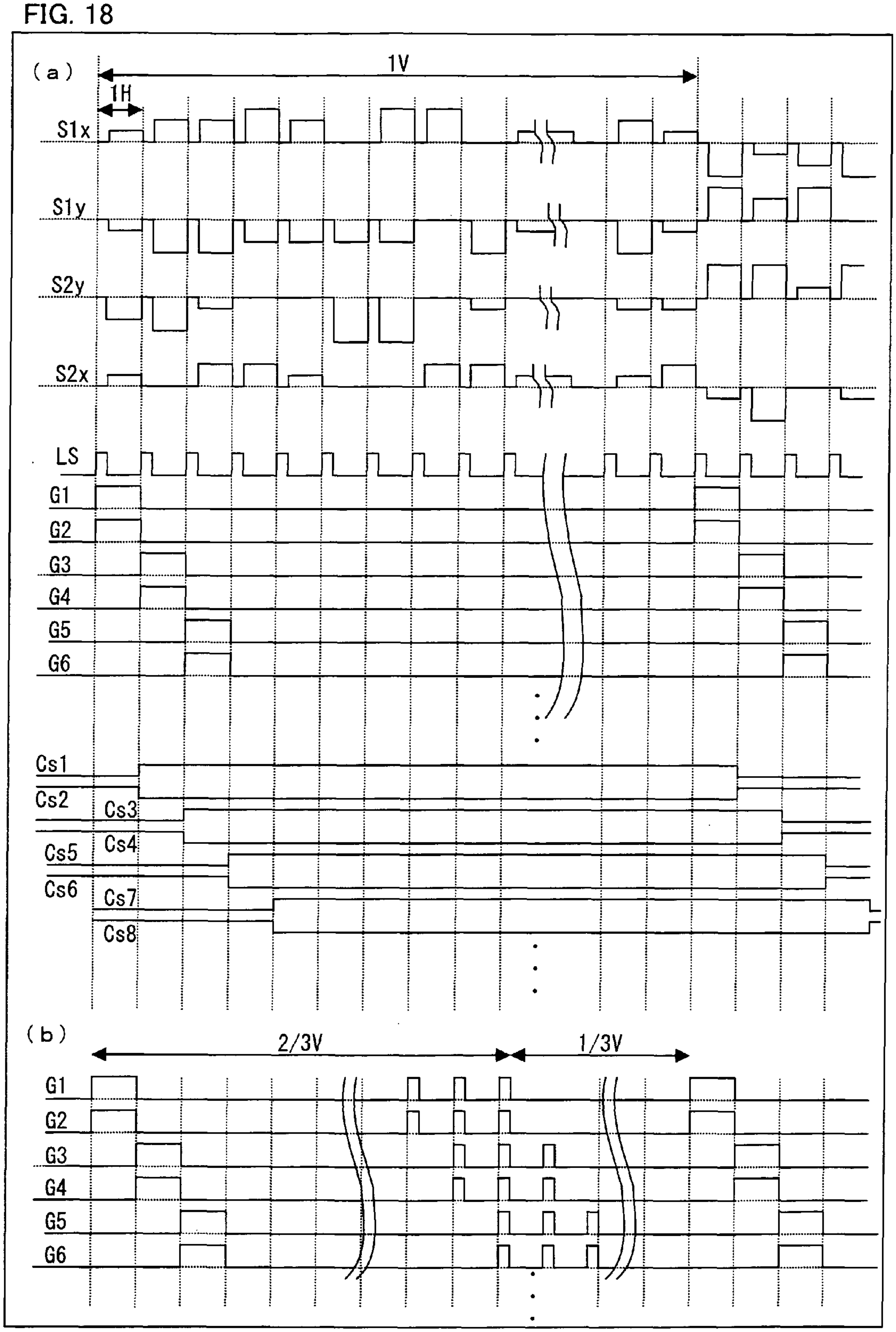
FIG. 18 (*a*) of FIG. 18 is a timing chart showing a method for driving the display section shown in (*a*) of FIG. 17. (*b*) of FIG. 18 is a timing chart showing a modification example of the method.

The display section 10*a* shown in (*a*) of FIG. 15 may be arranged to be a display section 10*c* shown in (*a*) of FIG. 17 based on a pixel division system (multi-pixel structure). (*b*)-(*d*) of FIG. 17 are drawings schematically showing a method for driving the display section 10*c*. (*a*) of FIG. 18 is a timing chart showing the method. Connections between each pixel of the display section 10*c* (first and second pixels PE1 and PE2 and first and second transistors included in the pixel) and a data signal line and a scanning signal line are the same as those of the display section 10*a* shown in (*a*) of FIG. 15, and the method for driving scanning signal lines shown in (*a*) of FIG. 18 is the same as that for the configuration of (*a*) of FIG. 16.

As shown in (*b*) of FIG. 17 and (*a*) of FIG. 18, in the display section 10*c*, during a first horizontal scanning period, scanning signal lines G1 and G2 are simultaneously made ON (put in a selected state), writing of a refresh potential and a same signal potential having a plus polarity from the first data signal line S1*x* to the first and second pixel electrodes PE1 and PE2 of the pixel P(1,1) and writing of a refresh potential and a same signal potential having a minus polarity from the second data signal line S1*y* to the first and second pixel electrodes PE1 and PE2 of the pixel P(2,1) are carried out simultaneously, and writing of a refresh potential and a same signal potential having a minus polarity from the second data signal line S2*y* to the first and second pixel electrodes PE1 and PE2 of the pixel P(1,2) and writing of a refresh potential and a same signal potential having a plus polarity from the first data signal line S2*x* to the first and second pixel electrodes PE1 and PE2 of the pixel P(2,2) are carried out simultaneously.

In synchronization with making the scanning signal lines G1 and G2 OFF simultaneously, the retention capacitance line Cs1 is caused to rise and the retention capacitance line Cs2 is caused to fall. Consequently, a portion of the pixel P(1,1) which includes the first pixel electrode PE1 serves as a bright sub-pixel, a portion of the pixel P(1,1) which includes the second pixel electrode PE2 serves as a dark sub-pixel, a portion of the pixel P(2,1) which includes the first pixel electrode PE1 serves as a bright sub-pixel, a portion of the pixel P(1,2) which includes the second pixel electrode PE2 serves as a dark sub-pixel, a portion of the pixel P(1,2) which includes the first pixel electrode PE1 serves as a bright sub-pixel, and a portion of the pixel P(2,2) which includes the second pixel electrode PE2 serves as a dark sub-pixel. Control in the next horizontal scanning period is performed as shown in FIG. 17(*c*), and control in the further next horizontal scanning period is performed as shown in FIG. 17(*d*).

As describe above, the configuration of FIG. 17 and (*a*) of FIG. 18 allows not only the effects yielded by the configuration of FIG. 15 and (*a*) of FIG. 16 but also improvement of a viewing angle characteristic by multi-pixel driving. In this regard, since bright sub-pixels and dark sub-pixels are provided in a checkered pattern, it is also possible to subdue jaggyness.

Further, the configuration of (*a*) of FIG. 18 may be arranged such that each scanning signal line (G1, G2, . . . ) is selected plural times with timing when approximately ⅔ frame period has passed from the previous scanning and in synchronization with the refresh period R, and the refresh potential (e.g. Vcom) is written in a pixel connected with the scanning signal line during this intermediate selection period (see (*b*) of FIG. 18). This reduces tailing etc. when displaying a moving image, thereby improving the quality of the displayed moving image.

Figure 19:
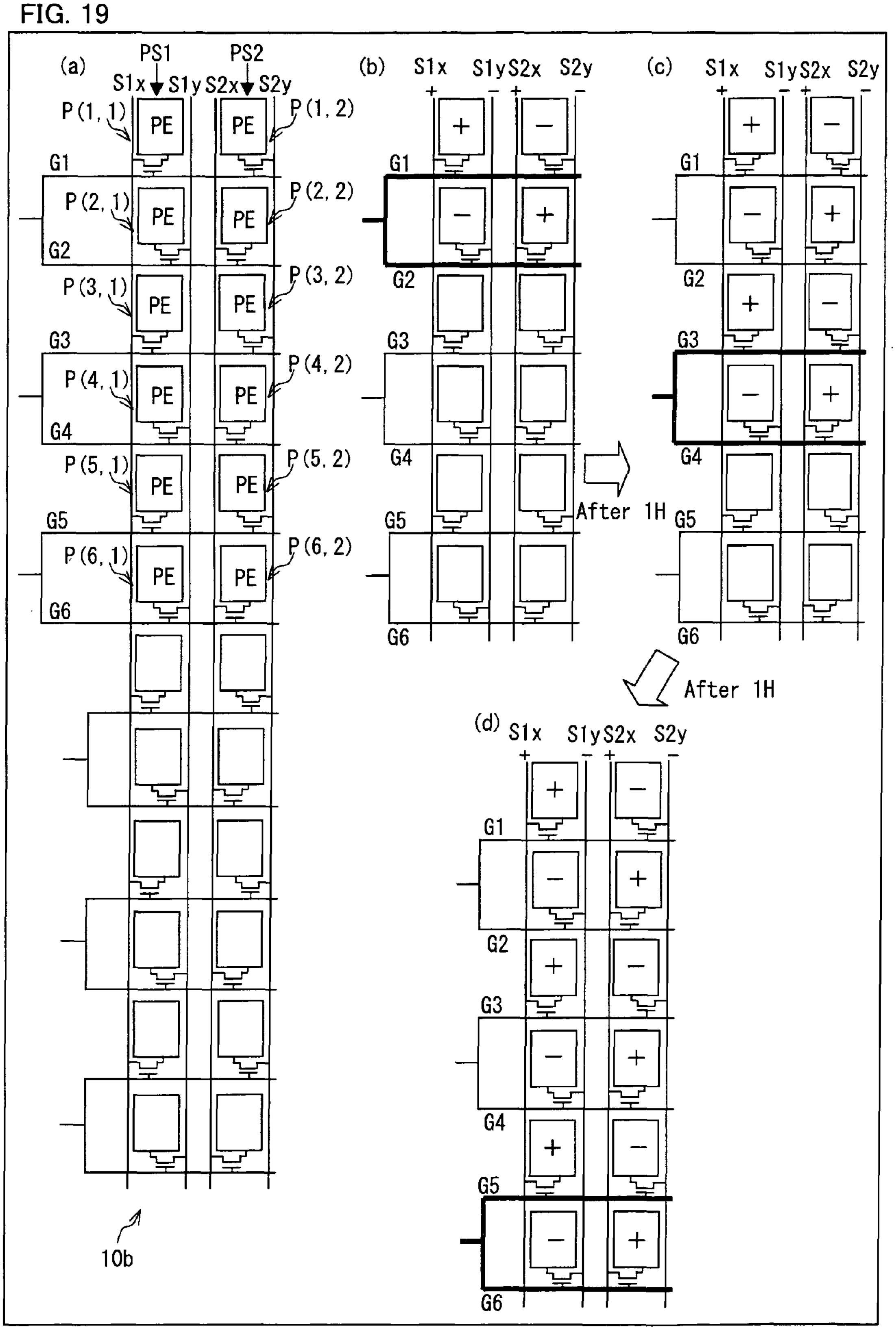
FIG. 19 (*a*) of FIG. 19 is a drawing schematically showing a display section of still another liquid crystal display in accordance with Embodiment 5. (*b*)-(*d*) of FIG. 19 are drawings schematically showing a method for driving the display section.

The display section of the liquid crystal display of the present invention may be arranged as shown in (*a*) of FIG. 19. A display section 10*b* of (*a*) of FIG. 19 is different from the display section 10*a* of (*a*) of FIG. 15 in that a second data signal line for one of adjacent two pixel columns and a first data signal line for the other of the adjacent two pixel columns are adjacent to each other without a pixel column therebetween, or a first data signal line for one of adjacent two pixel columns and a second data signal line for the other of the adjacent two pixel columns are adjacent to each other without a pixel column therebetween. For example, a first data signal line S1*x* and a second data signal line S1*y* are provided at both sides of a pixel column PS1, a first data signal line S2*x* and a second data signal line S2*y* are provided at both sides of a pixel column PS2, and the second data signal line S1*y* for the pixel column PS1 and the first data signal line S2*x* for the pixel column PS2 are adjacent to each other. (*b*)-(*d*) of FIG. 19 show a method for driving the display section 10*b* and (*a*) of FIG. 20 shows a timing chart of the method.

Figure 20:
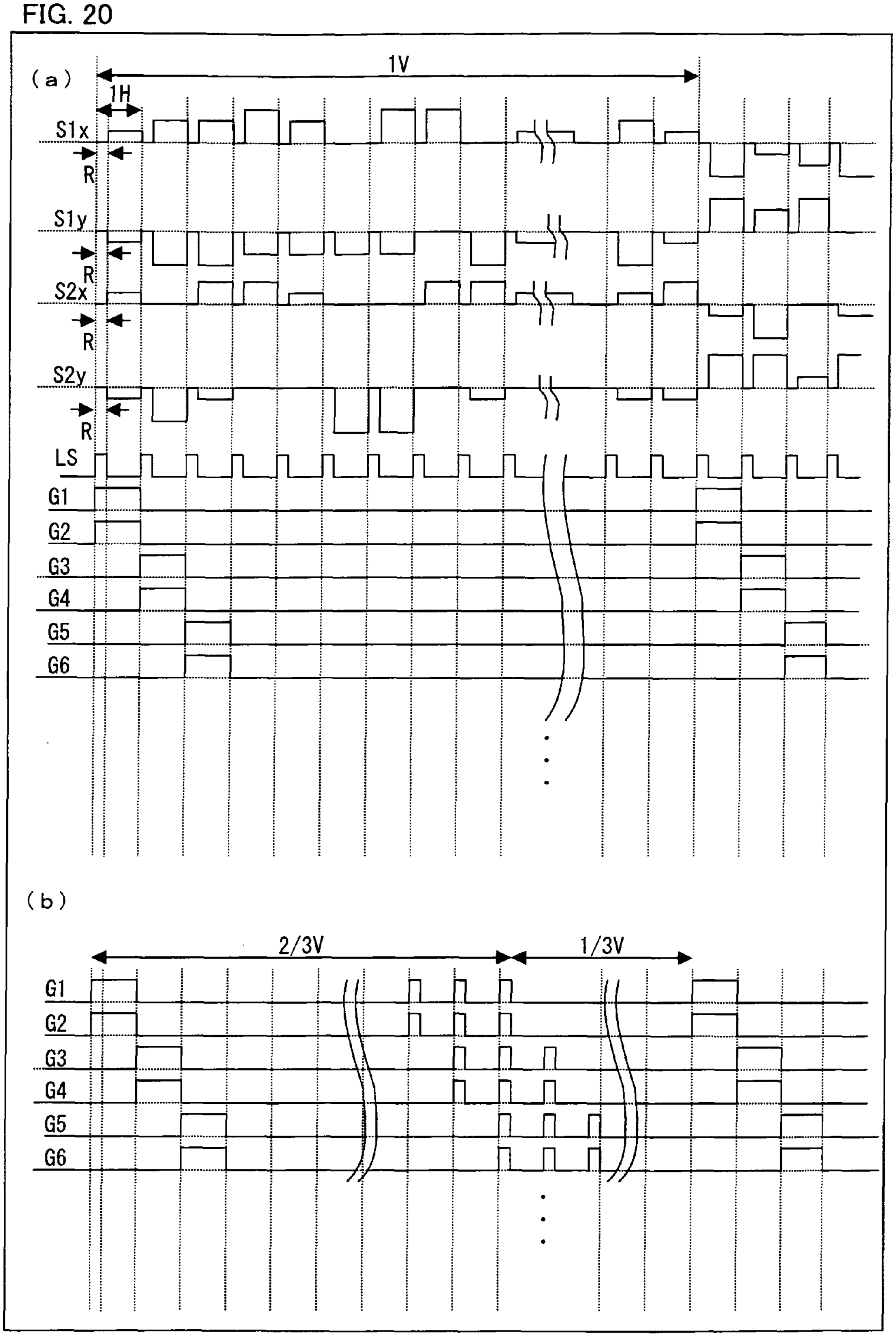
FIG. 20 (*a*) of FIG. 20 is a timing chart showing a method for driving the display section shown in (*a*) of FIG. 19. (*b*) of FIG. 20 is a timing chart showing a modification example of the method.

As shown in the drawings, with the configuration of FIG. 19 and (*a*) of FIG. 20, it is possible not only to subdue variations in reached potential in a liquid crystal display in which full charging of pixels is difficult, but also to subdue flickers by dot-inverting individual pixels. Further, the configuration of (*a*) of FIG. 20 may be arranged such that each scanning signal line (G1, G2, . . . ) is selected plural times with timing when approximately ⅔ frame period has passed from the previous scanning and in synchronization with the refresh period R, and the refresh potential is written in a pixel connected with the scanning signal line during this intermediate selection period (see (*b*) of FIG. 20). This reduces tailing etc. when displaying a moving image, thereby improving the quality of the displayed moving image.

Figure 21:
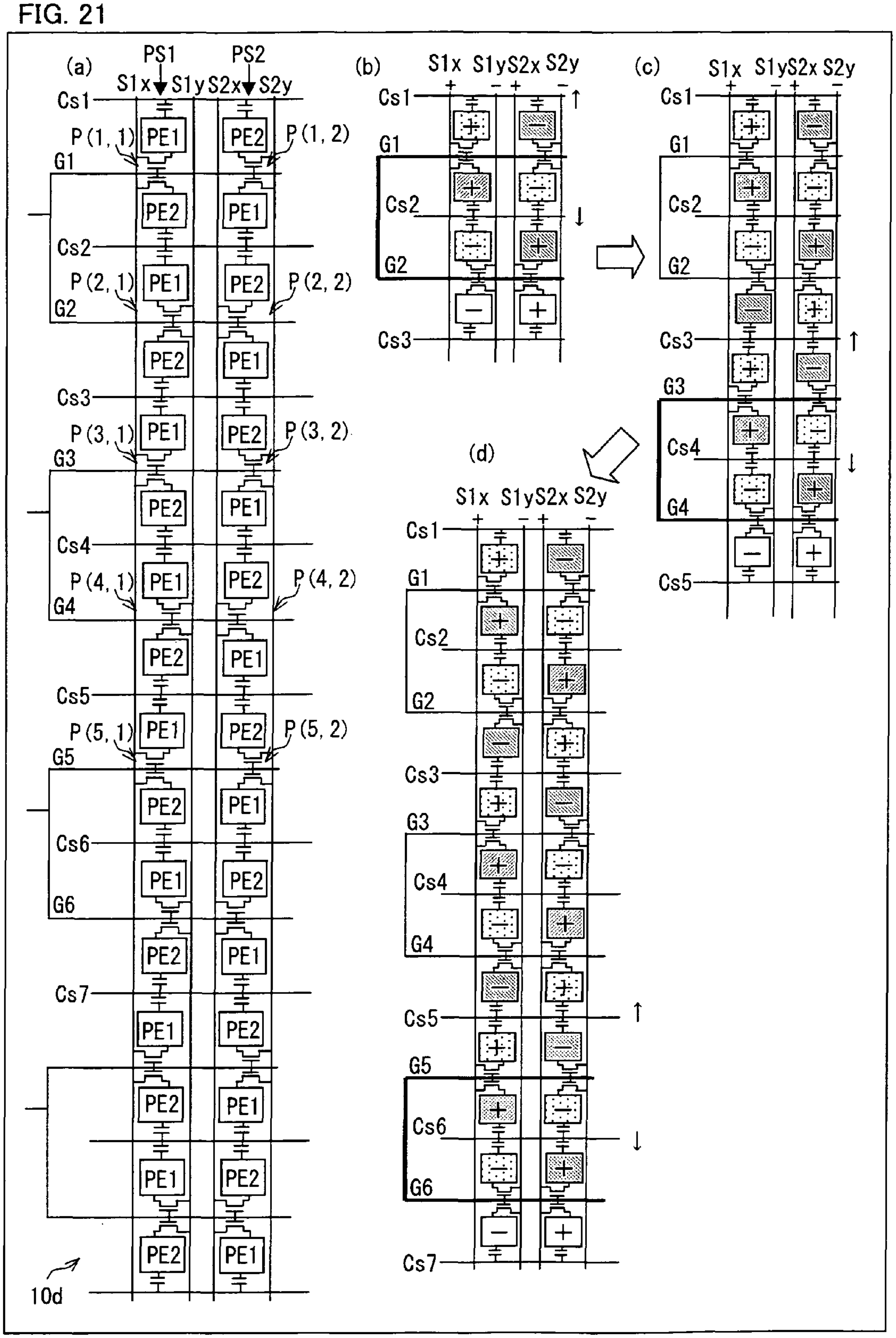
FIG. 21 (*a*) of FIG. 21 is a drawing schematically showing a display section of still another liquid crystal display in accordance with Embodiment 5. (*b*)-(*d*) of FIG. 21 are drawings schematically showing a method for driving the display section.
Figure 22:
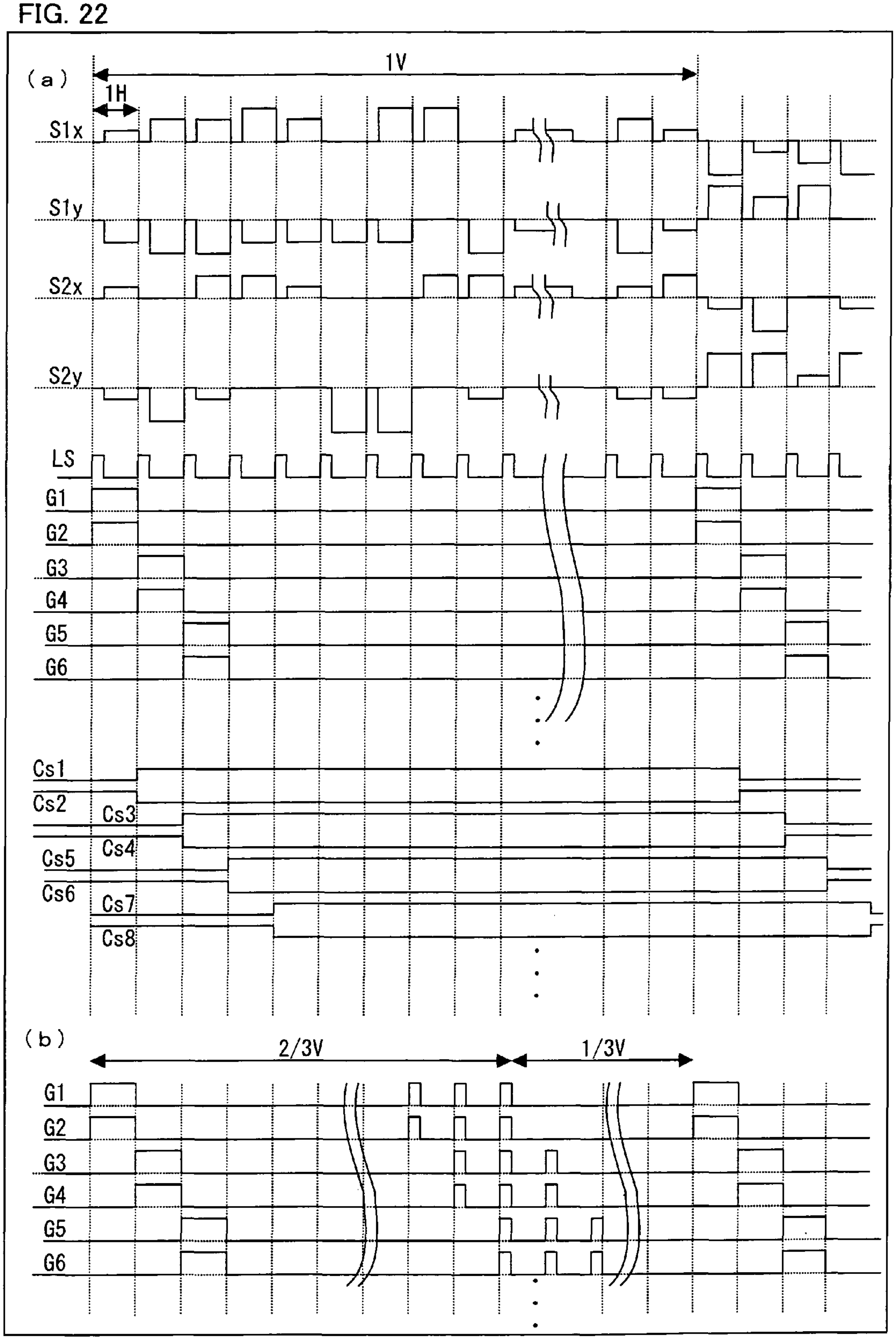
FIG. 22 (*a*) of FIG. 22 is a timing chart showing a method for driving the display section shown in (*a*) of FIG. 21. (*b*) of FIG. 22 is a timing chart showing a modification example of the method.

The display section 10*b* shown in (*a*) of FIG. 19 may be arranged to be a display section 10*d* shown in (*a*) of FIG. 21 based on a pixel division system (multi-pixel structure). (*b*)-(*d*) of FIG. 21 are drawings schematically showing a method for driving the display section 10*d*. (*a*) of FIG. 22 is a timing chart showing the method. Connections between each pixel of the display section 10*d* (first and second pixels PE1 and PE2 and first and second transistors included in the pixel) and a data signal line and a scanning signal line are the same as those of the display section 10*b* shown in (*a*) of FIG. 19, and the method for driving scanning signal lines shown in (*a*) of FIG. 22 is the same as that for the configuration of (*a*) of FIG. 20.

The configuration of FIG. 21 and (*a*) of FIG. 22 allows not only the effects yielded by the configuration of FIG. 19 and (*a*) of FIG. 20 but also improvement of a viewing angle characteristic by multi-pixel driving. In this regard, since bright sub-pixels and dark sub-pixels are provided in a checkered pattern, it is also possible to subdue jaggyness.

Further, the configuration of (*a*) of FIG. 22 may be arranged such that each scanning signal line (G1, G2, . . . ) is selected plural times with timing when approximately ⅔ frame period has passed from the previous scanning and in synchronization with the refresh period R, and the refresh potential (e.g. Vcom) is written in a pixel connected with the scanning signal line during this intermediate selection period (see (*b*) of FIG. 22). This reduces tailing etc. when displaying a moving image, thereby improving the quality of the displayed moving image.

Embodiment 6

Figure 23:
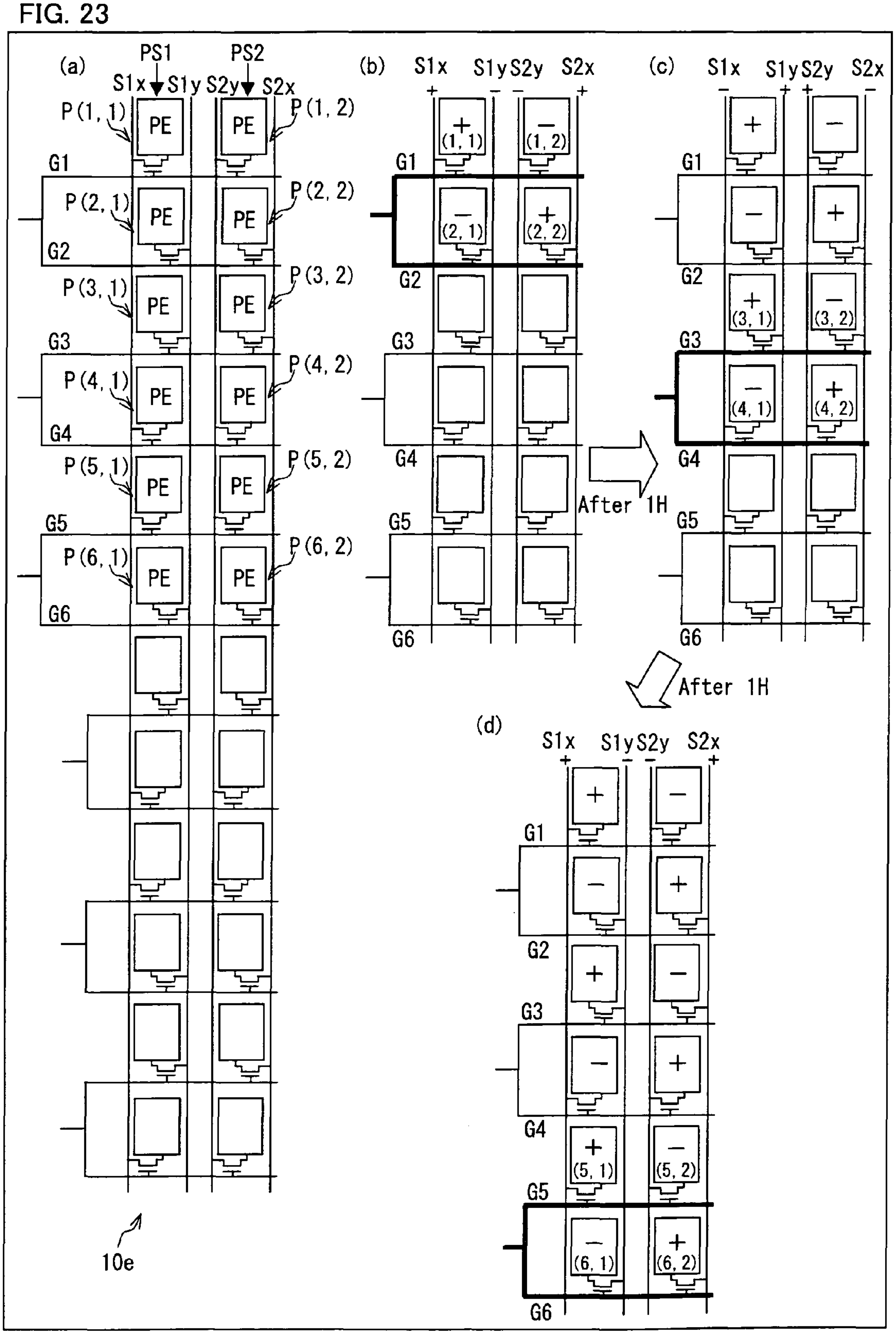
FIG. 23 (*a*) of FIG. 23 is a drawing schematically showing a display section of a liquid crystal display in accordance with Embodiment 6. (*b*)-(*d*) of FIG. 23 are drawings schematically showing a method for driving the display section.
Figure 24:
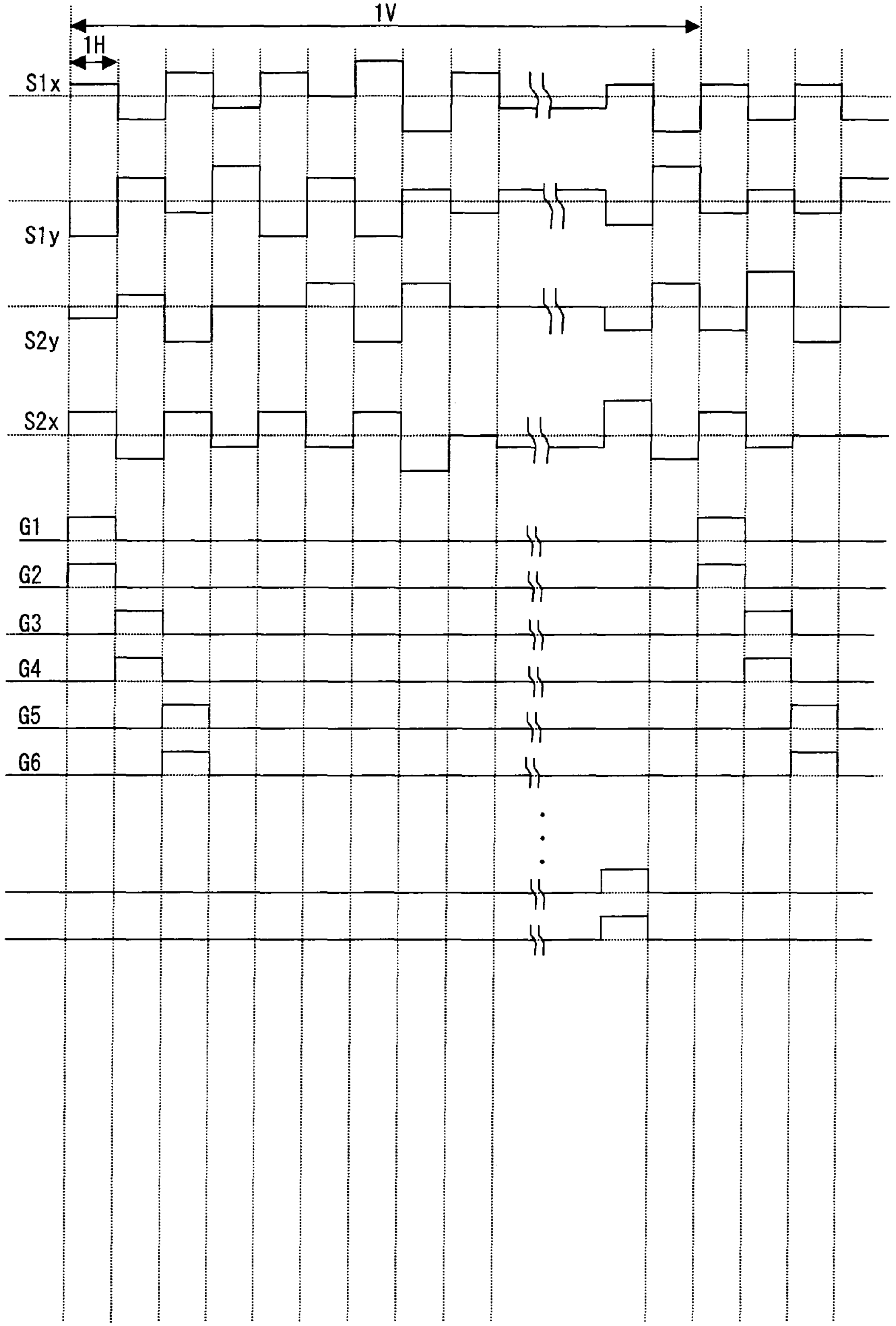
FIG. 24 is a timing chart showing a method for driving the display section shown in (*a*) of FIG. 23.

(*a*) of FIG. 23 is a drawing schematically showing one example of a configuration of a display section of the liquid crystal display of the present invention. (*b*)-(*d*) of FIG. 23 show a driving method of the display section. FIG. 24 is a timing chart showing the driving method. As shown in (*a*) of FIG. 23, a display section 10*e* includes first and second data signal lines (e.g. S1*x* and S1*y*) which are provided with respect to each pixel column (e.g. PS1) and which are positioned at both sides of the pixel column, and one pixel (e.g. P(1, 1)) included in the pixel column is connected with one scanning signal line G1 and is connected with one of the first and second data signal lines (S1*x* and S1*y*). Specifically, assume that pixels are sequentially made pairs and pairs thus made are given count numbers sequentially. In this case, two pixels in each pair are connected with different data signal lines, and two pairs that are given successive count numbers are designed such that an odd-number-positioned pixel in one of the two pairs and an odd-number-positioned pixel in the other of the two pairs are connected with different data signal lines. That is, pixels are connected with data signal lines in such a manner that when a pixel on a first row is regarded as a first pixel, each pixel other than $2\times1\times i+1^{st}$ (i is a natural number) pixel counted in a scanning direction and an upstream adjacent pixel of the pixel are connected with different data signal lines and the $2\times1\times i+1^{st}$ pixel and its upstream adjacent pixel are connected with the same data signal line. Pixels included in one pixel row are connected with the same scanning signal line, and in each pixel, a pixel electrode PE is connected with one data signal line via a transistor (TFT) and the gate terminal of the transistor is connected with one scanning signal line.

In the present embodiment, as shown in FIGS. 23 and 24, first and second data signal lines are supplied with signal potentials with opposite polarities, respectively, and the polarity of a signal potential supplied to each data signal line is inverted with respect to one horizontal scanning period (1H). Further, a first data signal line (e.g. S1*x*) for one of two adjacent pixel columns and a first data signal line (S2*x*) for the other of the two adjacent pixel columns are supplied with signal potentials having the same polarity, and connections with the first and second data signal lines are made oppositely between pixels adjacent in a row direction. A second data signal line (S1*y*) for one of adjacent two pixel columns (e.g. PS1 and PS2) and a second data signal line (S2*y*) for the other of the adjacent two pixel columns are adjacent to each other without a pixel column therebetween, or a first data signal line for one of adjacent two pixel columns and a first data signal line for the other of the adjacent two pixel columns are adjacent to each other without a pixel column therebetween.

Simultaneous selection of scanning signal lines connected with two pixels in a pair, respectively, is sequentially carried out in a scanning direction (according to count numbers mentioned above). That is, scanning signal lines are sequentially selected with starting from a scanning signal line connected with a pixel on a first row in such a manner that adjacent two scanning signal lines are simultaneously selected.

For example, in a case of the pixel column PS1, the first data signal line S1*x* and the second data signal line S1*y* are provided at both sides of the pixel column PS1, respectively, a first-positioned pixel P(1,1) and a second-positioned pixel P(2,1) are regarded as a pair, the pixel P(1,1) is connected with the scanning signal line G1 and the first data signal line S1*x*, and the pixel P(2,1) is connected with a scanning signal line G2 and the second data signal line S1*y*. Similarly, a third-positioned pixel P(3,1) and a fourth-positioned pixel P(4,1) are regarded as a pair, the pixel P(3, 1) is connected with the scanning signal line G3 and the second data signal line S1*y*, and the pixel P(4,1) is connected with a scanning signal line G4 and the first data signal line S1*x*. Similarly, a fifth-positioned pixel P(5,1) and a sixth-positioned pixel P(6, 1) are regarded as a pair, the pixel P(5,1) is connected with the scanning signal line G5 and the first data signal line S1*x*, and the pixel P(6,1) is connected with a scanning signal line G6 and the second data signal line S1*y*.

Further, in a case of a pixel column PS2, a first data signal line S2*x* and a second data signal line S2*y* are provided at both sides of a pixel column PS2, respectively, a first-positioned pixel P(1,2) and a second-positioned pixel P(2,2) are regarded as a pair, the pixel P(1,2) is connected with the scanning signal line G1 and a second data signal line S2*y*, and the pixel (2,2) is connected with a scanning signal line G2 and the first data signal line S2*x*. Similarly, a third-positioned pixel P(3,2) and a fourth-positioned pixel P(4,2) are regarded as a pair, the pixel P(3,2) is connected with the scanning signal line G3 and the first data signal line S2*x*, and the pixel P(4,2) is connected with a scanning signal line G4 and the second data signal line S2*y*. Similarly, a fifth-positioned pixel P(5,2) and a sixth-positioned pixel P(6,2) are regarded as a pair, the pixel P(5,2) is connected with the scanning signal line G5 and the second data signal line S2*y*, and the pixel P(6,2) is connected with a scanning signal line G6 and the first data signal line S2*x*.

As shown in (*b*)-(*d*) of FIG. 23 and FIG. 24, initially, the scanning signal line G1 connected with the pixels P(1,1) and P(1,2) and the scanning signal line G2 connected with the pixels P(2, 1) and P(2,2) are selected simultaneously. Then, the scanning signal line G3 connected with the pixels P(3,1) and P(3,2) and the scanning signal line G4 connected with the pixels P(4,1) and P(4,2) are selected simultaneously. Then, the scanning signal line G5 connected with the pixels P(5,1) and P(5,2) and the scanning signal line G6 connected with the pixels P(6, 1) and P(6,2) are selected simultaneously.

Consequently, in the display section 10*e*, during a first horizontal scanning period, writing of a signal potential having a plus polarity from the first data signal line S1*x* to the pixel electrode of the pixel P(1,1) and writing of a signal potential having a minus polarity from the second data signal line S1*y* to the pixel electrode of the pixel P(2,1) are carried out simultaneously, and writing of a signal potential having a minus polarity from the second data signal line S2*y* to the pixel electrode of the pixel P(1,2) and writing of a signal potential having a plus polarity from the first data signal line S2*x* to the pixel electrode of the pixel P(2,2) are carried out simultaneously (see (*b*) of FIG. 23 and FIG. 24). During a next horizontal scanning period, writing of a signal potential is performed as shown in (*c*) of FIG. 23. During a further next horizontal scanning period, writing of a signal potential is performed as shown in (*d*) of FIG. 23. Consequently, in the display section 10*e*, polarity distribution of potentials written into individual pixels exhibits dot inversion (1H/1V inversion) as shown in (*d*) of FIG. 23.

As described above, with the configuration of FIGS. 23 and 24, it is possible not only to subdue variations in reached potential in a liquid crystal display in which full charging of pixels is difficult even when simultaneous scanning of two lines is performed, but also to subdue flickers by dot-inverting individual pixels. Further, signal potentials supplied to two data signal lines adjacent to each other without a pixel column therebetween always have the same polarity, and therefore it is possible to reduce power consumption due to parasitic capacitance between the two data signal lines, thereby reducing a load on a source driver. Further, the configuration of FIG. 24 may be arranged such that a refresh period R is provided at the beginning of each horizontal scanning period, and a refresh potential (e.g. Vcom) is supplied to individual data signal lines during the refresh period R (see (*a*) of FIG. 25). This arrangement allows charging waveforms of a pixel to be substantially uniform with each other regardless of the level of signal potentials supplied to the data signal lines during the previous horizontal scanning period, in a case where even simultaneous scanning of two lines does not secure full charging. It is found from FIG. 59 that although the configuration of (*a*) of FIG. 25 corresponding to the mode C is a bit inferior to the mode B (FIG. 24) in terms of the sensory evaluations, the configuration of (*a*) of FIG. 25 meets the required level, and besides, has less power consumption and less generation of heat of a source driver compared with the mode B since a refresh potential is supplied during each horizontal scanning period in the configuration of (*a*) of FIG. 25.

Figure 25:
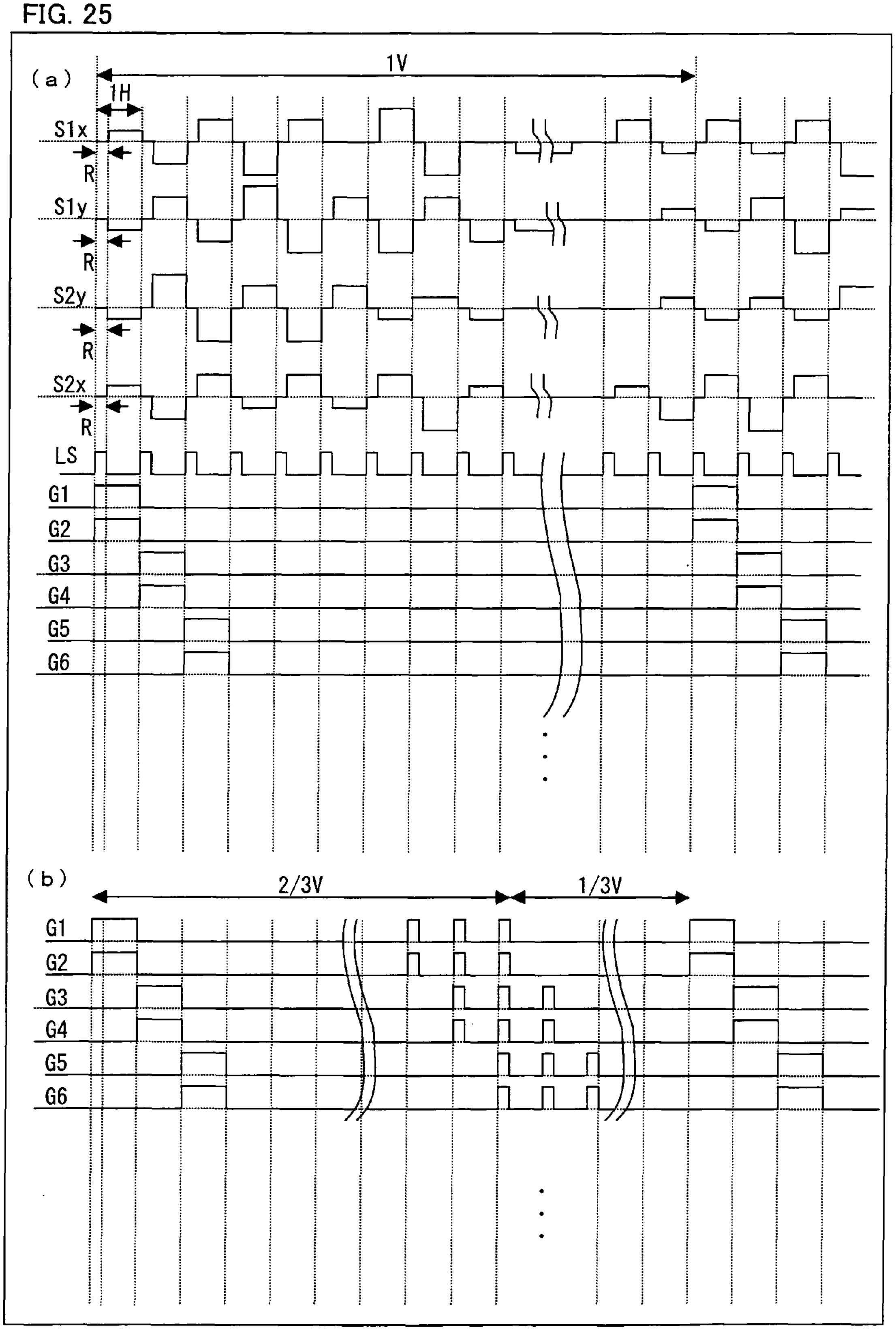
FIG. 25 (*a*) of FIG. 25 is a timing chart showing another method for driving the display section shown in (*a*) of FIG. 23. (*b*) of FIG. 25 is a timing chart showing a modification example of the method.

Further, as shown in (*b*) of FIG. 25, each scanning signal line is selected plural times with timing when approximately ⅔ frame period has passed from last scanning and in synchronization with the refresh period R, and the refresh potential (e.g. Vcom) is written in a pixel connected with the scanning signal line during this intermediate selection period. This reduces tailing etc. when displaying a moving image, thereby improving the quality of the displayed moving image.

Figure 26:
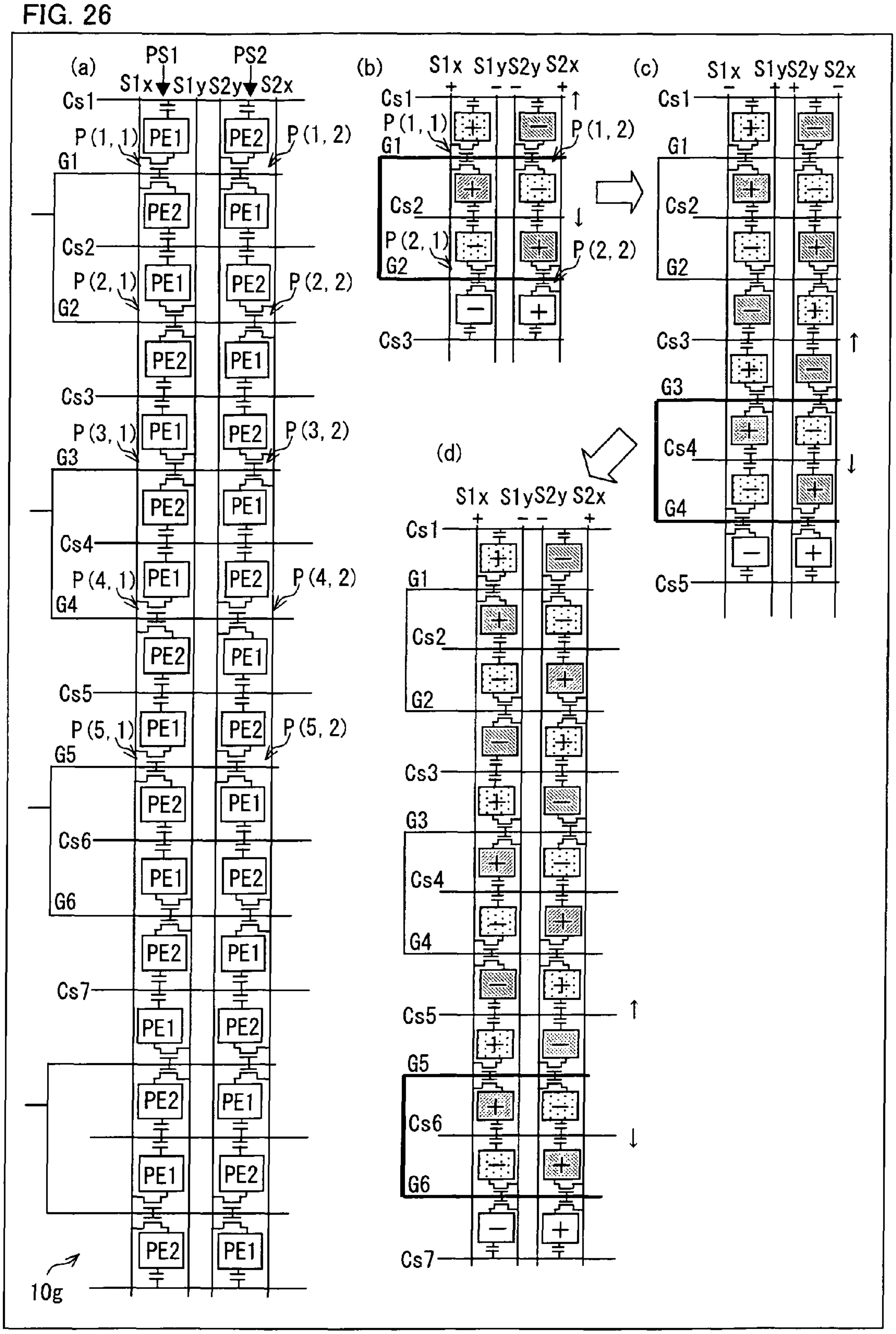
FIG. 26 (*a*) of FIG. 26 is a drawing schematically showing a display section of another liquid crystal display in accordance with Embodiment 6. (*b*)-(*d*) of FIG. 26 are drawings schematically showing a method for driving the display section.
Figure 27:
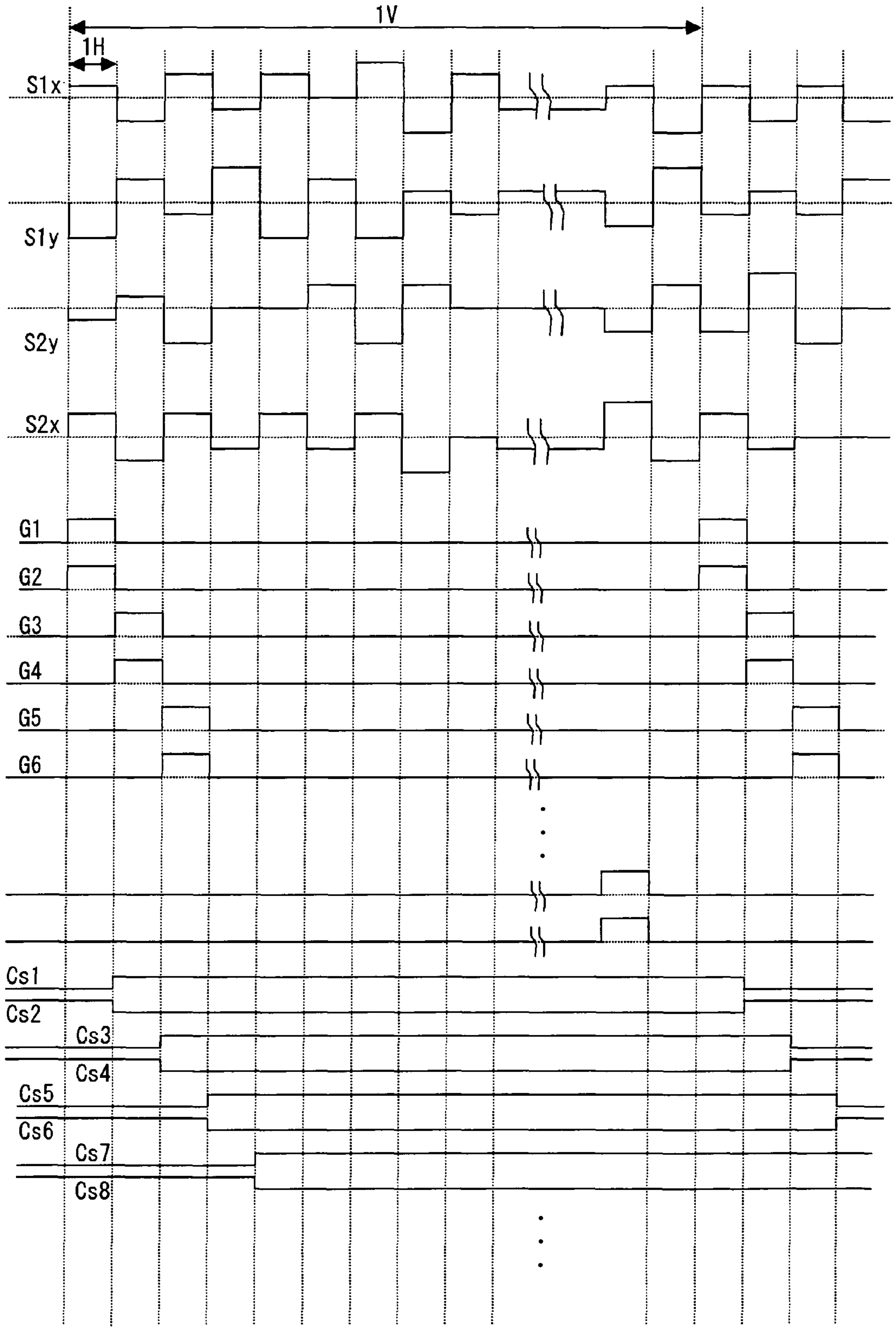
FIG. 27 is a timing chart showing a method for driving the display section shown in (*a*) of FIG. 26.

The display section 10*e* shown in (*a*) of FIG. 23 may be arranged to be a display section 10*g* shown in (*a*) of FIG. 26 based on a pixel division system (multi-pixel structure). (*b*)-(*d*) of FIG. 26 are drawings schematically showing a method for driving the display section 10*g*. FIG. 27 is a timing chart showing the method. Connections between each pixel of the display section 10*g* (first and second pixels PE1 and PE2 and first and second transistors included in the pixel) and a data signal line and a scanning signal line are the same as those of the display section 10*e* shown in (*a*) of FIG. 23, and the method for driving scanning signal lines shown in FIG. 27 is the same as that for the configuration of FIG. 24.

As shown in (*b*) of FIG. 26 and FIG. 27, in the display section 10*g*, during a first horizontal scanning period, scanning signal lines G1 and G2 are simultaneously made ON (put in a selected state), writing of a same signal potential having a plus polarity from the first data signal line S1*x* to the first and second pixel electrodes PE1 and PE2 of the pixel P(1,1) and writing of a same signal potential having a minus polarity from the second data signal line S1*y* to the first and second pixel electrodes PE1 and PE2 of the pixel P(2,1) are carried out simultaneously, and writing of a same signal potential having a minus polarity from the second data signal line S2*y* to the first and second pixel electrodes PE1 and PE2 of the pixel P(1,2) and writing of a same signal potential having a plus polarity from the first data signal line S2*x* to the first and second pixel electrodes PE1 and PE2 of the pixel P(2,2) are carried out simultaneously.

In synchronization with making the scanning signal lines G1 and G2 OFF simultaneously, the retention capacitance line Cs1 is caused to rise and the retention capacitance line Cs2 is caused to fall. Consequently, a portion of the pixel P(1,1) which includes the first pixel electrode PE1 serves as a bright sub-pixel, a portion of the pixel P(1,1) which includes the second pixel electrode PE2 serves as a dark sub-pixel, a portion of the pixel P(2,1) which includes the first pixel electrode PE1 serves as a bright sub-pixel, a portion of the pixel P(1,2) which includes the second pixel electrode PE2 serves as a dark sub-pixel, a portion of the pixel P(1,2) which includes the first pixel electrode PE1 serves as a bright sub-pixel, and a portion of the pixel P(2,2) which includes the second pixel electrode PE2 serves as a dark sub-pixel. Control in the next horizontal scanning period is performed as shown in FIG. 26(*c*), and control in the further next horizontal scanning period is performed as shown in FIG. 26(*d*).

As describe above, the configuration of FIGS. 26 and 27 allows not only the effects yielded by the configuration of FIGS. 23 and 24 but also improvement of a viewing angle characteristic by multi-pixel driving. In this regard, since bright sub-pixels and dark sub-pixels are positioned in a checkered pattern, it is also possible to subdue jaggyness. The configuration of FIG. 27 may be arranged such that a refresh period R is provided at the beginning of each horizontal scanning period and a refresh potential (e.g. Vcom) is supplied to individual data signal lines during the refresh period R (see (*a*) of FIG. 28). This arrangement allows charging waveforms of a pixel to be substantially uniform with each other regardless of the levels of signal potentials supplied to the same data signal line during the previous horizontal scanning period in a case where even simultaneous scanning of two lines does not secure sufficient full charging. It is found from FIG. 59 that although the configuration of (*a*) of FIG. 28 corresponding to the mode C is a bit inferior to the mode B (FIG. 27) in terms of the sensory evaluations, the configuration of (*a*) of FIG. 28 meets the required level, and besides, has less power consumption and less generation of heat of a source driver compared with the mode B since a refresh potential is supplied during each horizontal scanning period in the configuration of (*a*) of FIG. 28.

Figure 28:
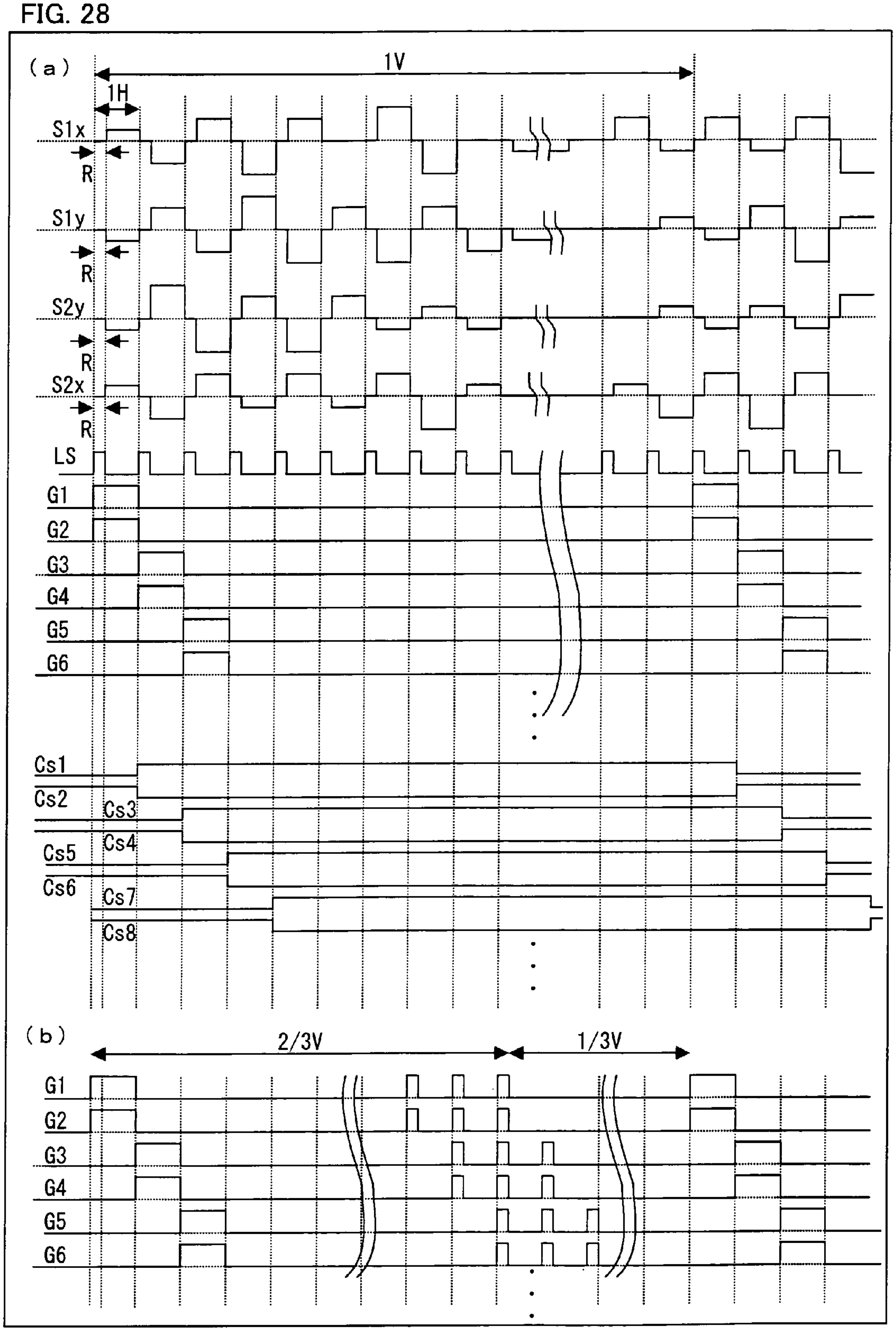
FIG. 28 (*a*) of FIG. 28 is a timing chart showing another method for driving the display section shown in (*a*) of FIG. 26. (*b*) of FIG. 28 is a timing chart showing a modification example of the method.

Further, as shown in (*b*) of FIG. 28, each scanning signal line is selected plural times with timing when approximately ⅔ frame period has passed from previous scanning and in synchronization with the refresh period R, and the refresh potential (e.g. Vcom) is written in a pixel connected with each scanning signal line during this intermediate selection period. This reduces tailing etc. when displaying a moving image, thereby improving the quality of the displayed moving image.

Figure 29:
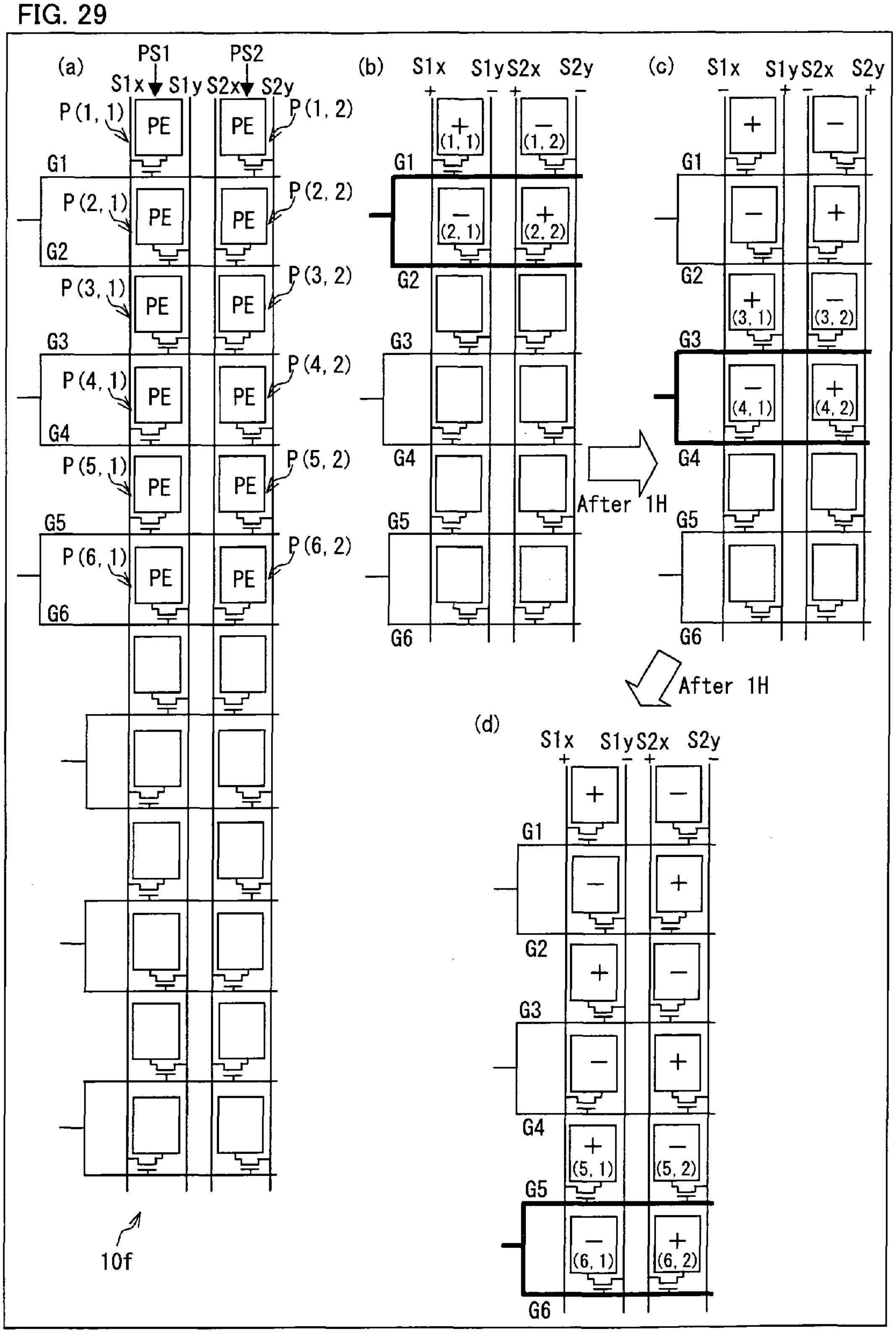
FIG. 29 (*a*) of FIG. 29 is a drawing schematically showing a display section of still another liquid crystal display in accordance with Embodiment 6. (*b*)-(*d*) of FIG. 29 are drawings schematically showing a method for driving the display section.

The display section of the liquid crystal display of the present invention may be arranged as shown in (*a*) of FIG. 29. A display section 10*f* of (*a*) of FIG. 29 is different from the display section 10*e* of (*a*) of FIG. 23 in that a second data signal line for one of adjacent two pixel columns and a first data signal line for the other of the adjacent two pixel columns are adjacent to each other without a pixel column therebetween, or a first data signal line for one of adjacent two pixel columns and a second data signal line for the other of the adjacent two pixel columns are adjacent to each other without a pixel column therebetween. For example, a first data signal line S1*x* and a second data signal line S1*y* are provided at both sides of a pixel column PS1, a first data signal line S2*x* and a second data signal line S2*y* are provided at both sides of a pixel column PS2, and the second data signal line S1*y* for the pixel column PS1 and the first data signal line S2*x* for the pixel column PS2 are adjacent to each other. (*b*)-(*d*) of FIG. 29 show a method for driving the display section 10*f* and FIG. 30 shows a timing chart of the method.

Figure 30:
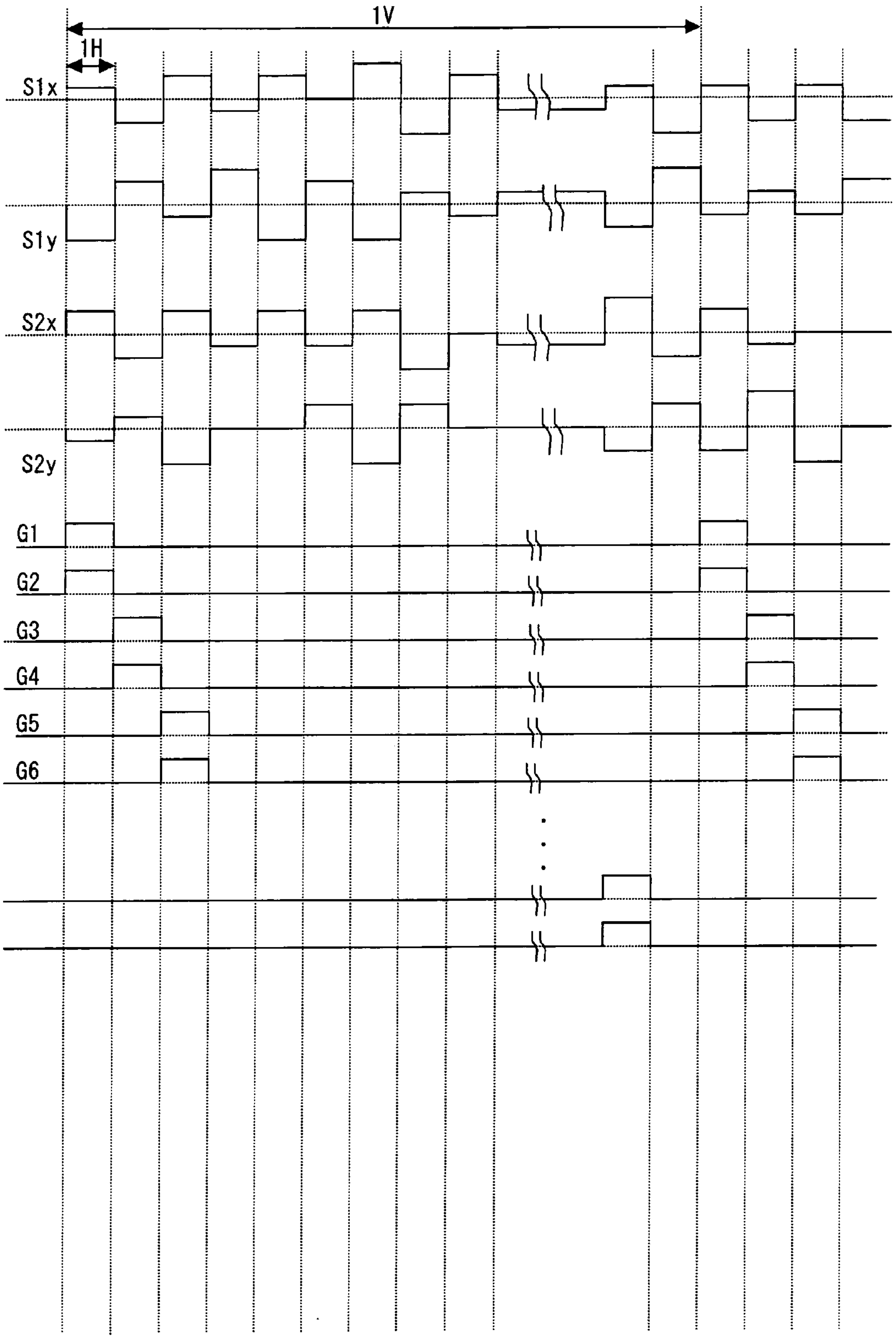
FIG. 30 is a timing chart showing a method for driving the display section shown in (*a*) of FIG. 29.

As shown in the drawings, with the configuration of FIGS. 29 and 30, it is possible not only to subdue variations in charging ratio in a liquid crystal display in which full charging of pixels is difficult even when simultaneous scanning of two lines is performed, but also to subdue flickers by dot-inverting individual pixels.

Figure 31:
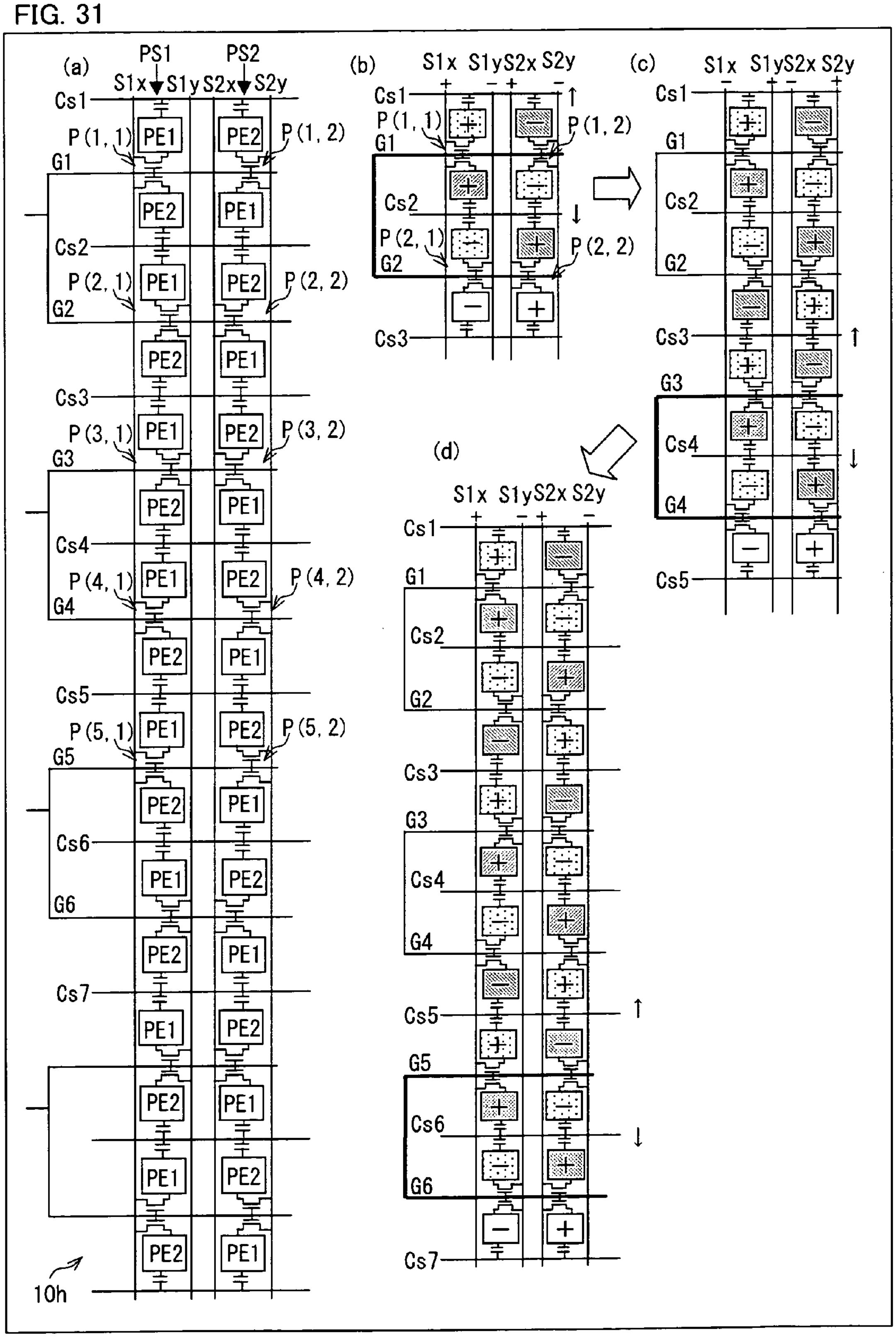
FIG. 31 (*a*) of FIG. 31 is a drawing schematically showing still another display section of a liquid crystal display in accordance with Embodiment 6. (*b*)-(*d*) of FIG. 31 are drawings schematically showing a method for driving the display section.
Figure 32:
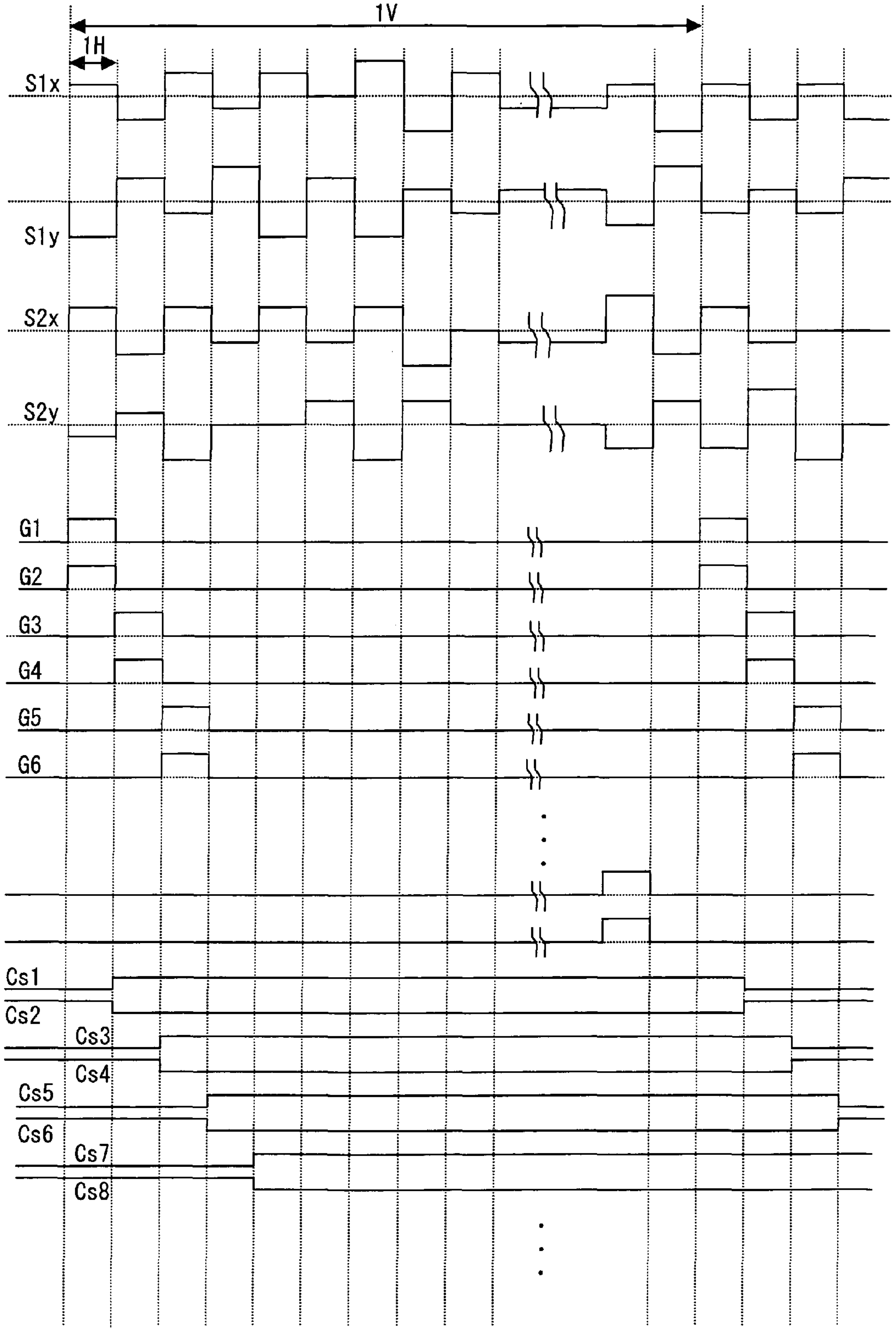
FIG. 32 is a timing chart showing a method for driving the display section shown in (*a*) of FIG. 31.

The display section 10*f* shown in (*a*) of FIG. 29 may be arranged to be a display section 10*h* shown in (*a*) of FIG. 31 based on a pixel division system (multi-pixel structure). (*b*)-(*d*) of FIG. 31 are drawings schematically showing a method for driving the display section 10*h*. FIG. 32 is a timing chart showing the method. Connections between each pixel of the display section 10*h* (first and second pixels PE1 and PE2 and first and second transistors included in the pixel) and a data signal line and a scanning signal line are the same as those of the display section 10*f* shown in (*a*) of FIG. 29, and the method for driving scanning signal lines shown in FIG. 32 is the same as that for the configuration of FIG. 30. The configuration of FIGS. 31 and 32 allow not only the effects yielded by the configuration of FIG. 29 and but also improvement of a viewing angle characteristic by multi-pixel driving. In this regard, since bright sub-pixels and dark sub-pixels are provided in a checkered pattern, it is also possible to subdue jaggyness.

Embodiment 7

Figure 33:
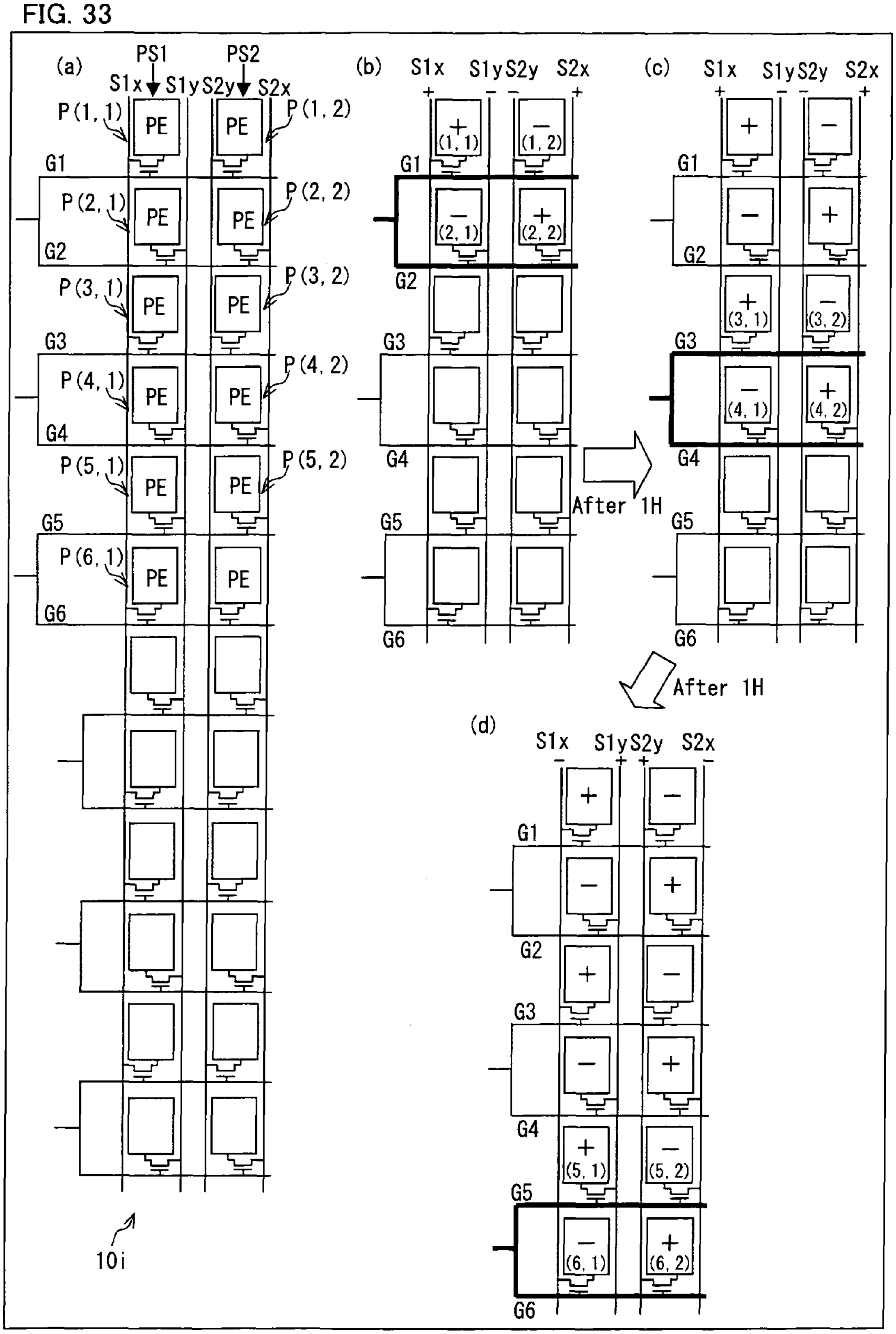
FIG. 33 (*a*) of FIG. 33 is a drawing schematically showing a display section of another liquid crystal display in accordance with Embodiment 7. (*b*)-(*d*) of FIG. 33 are drawings schematically showing a method for driving the display section.
Figure 34:
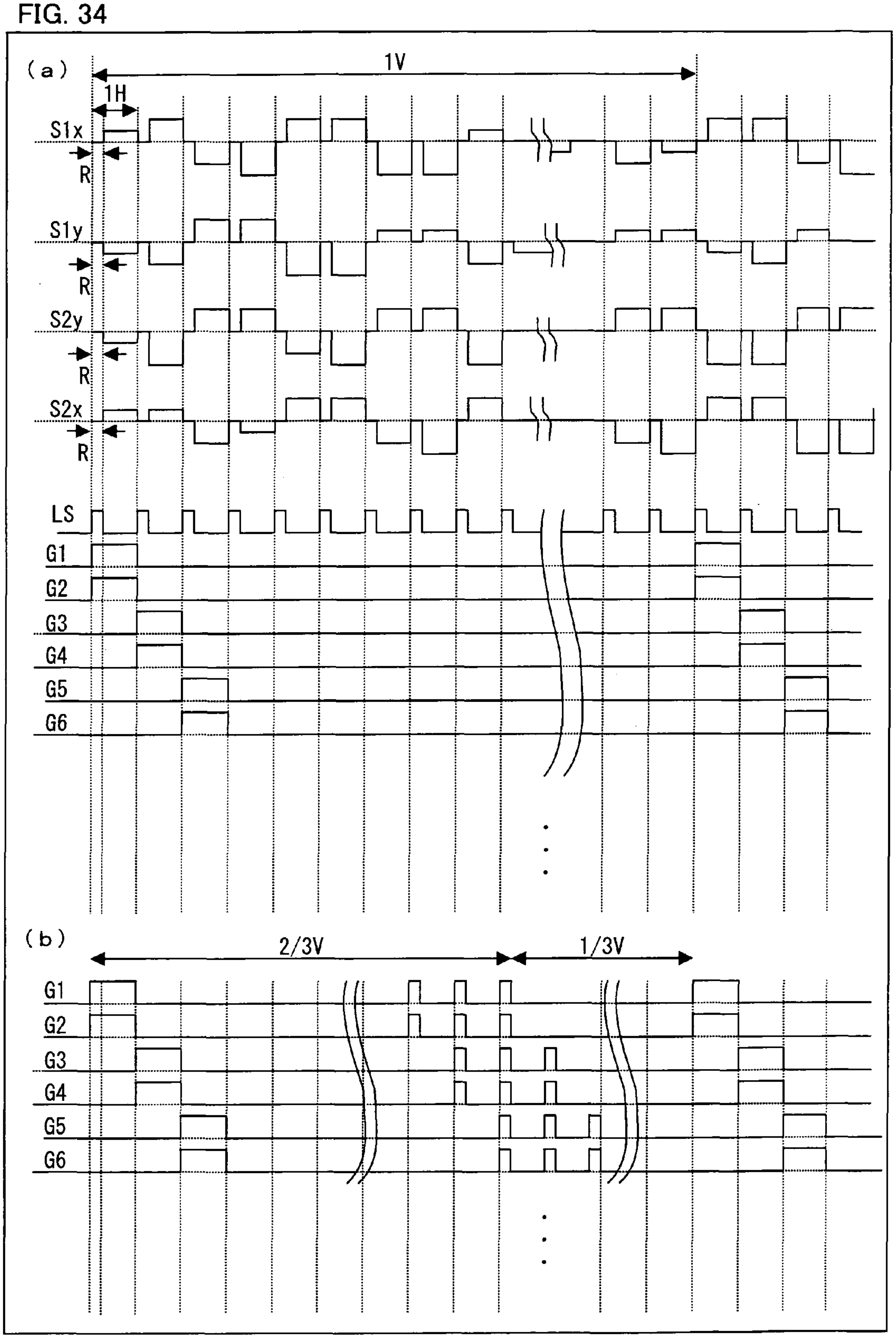
FIG. 34 (*a*) of FIG. 34 is a timing chart showing another method for driving the display section shown in (*a*) of FIG. 33. (*b*) of FIG. 34 is a timing chart showing a modification example of the method.

(*a*) of FIG. 33 is a drawing schematically showing one example of a configuration of a display section of the liquid crystal display of the present invention. (*b*)-(*d*) of FIG. 33 are drawings schematically showing a driving method of the display section. (*a*) of FIG. 34 is a timing chart showing the driving method. As shown in (*a*) of FIG. 33, a display section 10*i* includes first and second data signal lines (S1*x* and S1*y*) which are provided with respect to each pixel column (e.g. PS1) and which are positioned at both sides of the pixel column, and one pixel (e.g. P(1, 1)) included in the pixel column is connected with one scanning signal line G1 and is connected with one of the first and second data signal lines (S1*x* and S1*y*). Specifically, assume that pixels on each pixel column are sequentially paired and grouped from a pixel on a first row in such a manner that two pixels adjacent in a column direction are made a pair, adjacent two pairs are grouped sequentially, and groups thus made are given count numbers sequentially. In this case, two pixels in each pair in one group are connected with different data signal lines, odd-number-positioned pixels are connected with the same data signal line, and two groups that are given successive count numbers are designed such that an odd-number-positioned pixel in one of the two groups and an odd-number-positioned pixel in the other of the two groups are connected with different data signal lines. For example, pixels are connected with data signal lines in such a manner that when a pixel on a first row is regarded as a $1^{st}$ pixel, each pixel other than $2\times2\times i+1^{st}$ (i is a natural number) pixel counted in a scanning direction and its upstream-adjacent pixel of the pixel are connected with different data signal lines and the $2\times2\times i+1^{st}$ pixel and its upstream-adjacent pixel are connected with the same data signal line. Pixels in one pixel row are connected with the same scanning signal line, and in each pixel, a pixel electrode PE is connected with one data signal line via a transistor (TFT) and the gate terminal of the transistor is connected with one scanning signal line.

A group is selected in a scanning direction (according to the count number mentioned above), and simultaneous selection of two scanning signal lines respectively connected with two pixels in a pair is sequentially carried out in the selected group. That is, scanning signal lines are sequentially selected with starting from a scanning signal line connected with a pixel on a first row in such a manner that adjacent two scanning signal lines are selected simultaneously.

In the present embodiment, as shown in FIG. 33 and (*a*) of FIG. 34, during each horizontal scanning period, first and second data signal lines are initially supplied with refresh potentials (preliminary potentials) and then supplied with signal potentials (potentials corresponding to data signals). Specifically, a refresh period R is provided at the beginning of each horizontal scanning period (1H), and a refresh potential is supplied to each data signal line during the refresh period R.

Further, signal potentials with opposite polarities are supplied to the first and second data signal lines (e.g. S1*x* and S1*y*), respectively, and the polarity of a signal potential supplied to each data signal line is inverted with respect to two horizontal scanning periods (2H). Further, a first data signal line (e.g. S1*x*) for one of two adjacent pixel columns and a first data signal line (e.g. S2*x*) for the other of the two adjacent pixel columns are supplied with signal potentials having the same polarity, and connections with the first and second data signal lines are made oppositely between pixels adjacent in a row direction. A second data signal line (S1*y*) for one of adjacent two pixel columns (e.g. PS1 and PS2) and a second data signal line (S2*y*) for the other of the adjacent two pixel columns are adjacent to each other without a pixel column therebetween, or a first data signal line for one of adjacent two pixel columns and a first data signal line for the other of the adjacent two pixel columns are adjacent to each other without a pixel column therebetween.

Consequently, in the display section 10*i*, during a first horizontal scanning period, sequential writing of a refresh potential and a signal potential with a plus polarity from the first data signal line S1*x* to the pixel electrode of the pixel P(1,1) and sequential writing of a refresh potential and a signal potential with a minus polarity from the second data signal line S1*y* to the pixel electrode of the pixel P(2,1) are carried out simultaneously. Sequential writing of a refresh potential and a signal potential with a minus polarity from the second data signal line S2*y* to the pixel electrode of the pixel P(1,2) and sequential writing of a refresh potential and a signal potential with a plus polarity from the first data signal line S2*x* to the pixel electrode of the pixel P(2,2) are carried out simultaneously (see (*b*) of FIG. 33 and (*a*) of FIG. 34). During a next horizontal scanning period, writing is performed as shown in (*c*) of FIG. 33. During a further next horizontal scanning period, writing is performed as shown in (*d*) of FIG. 33. Consequently, in the display section 10*i*, polarity distribution of potentials written into pixels exhibits dot inversion (1H/1V inversion) as shown in (*d*) of FIG. 33.

As described above, with the configuration of FIG. 33 and (*a*) of FIG. 34, it is possible to cause charging waveforms of pixels to be substantially uniform with each other regardless of the level of signal potentials supplied to the same data signal line during the previous horizontal scanning period in a case where simultaneous scanning of two lines does not secure sufficient full charging. It is found from FIG. 59 that although the configuration of (*a*) of FIG. 34 corresponding to the mode E is a bit inferior to the mode B in terms of the sensory evaluations, the configuration of (*a*) of FIG. 34 is superior to the modes D and F in terms of the sensory evaluations, and meets the required level. In addition, although the configuration of (*a*) of FIG. 34 has larger power consumption and larger generation of heat of a source driver than the modes F and D due to supply of a refresh potential during each horizontal scanning period, the configuration of (*a*) of FIG. 34 has smaller power consumption and smaller generation of heat of a source driver than the mode B. Further, with the configuration of (*a*) of FIG. 34, it is possible to subdue flickers by dot-inverting individual pixels. Further, signal potentials supplied to two data signal lines adjacent to each other without a pixel column therebetween have the same polarity, and therefore it is possible to reduce power consumption due to parasitic capacitance between the two data signal lines, thereby reducing a load on a source driver.

Further, the configuration of (*a*) of FIG. 34 may be arranged such that each scanning signal line (G1, G2, . . . ) is selected plural times with timing when approximately ⅔ frame period has passed from previous scanning and in synchronization with the refresh period R, and the refresh potential is written in a pixel connected with each scanning signal line during this intermediate selection period (see (*b*) of FIG. 34). This reduces tailing etc. when displaying a moving image, thereby improving the quality of the displayed moving image.

Figure 35:
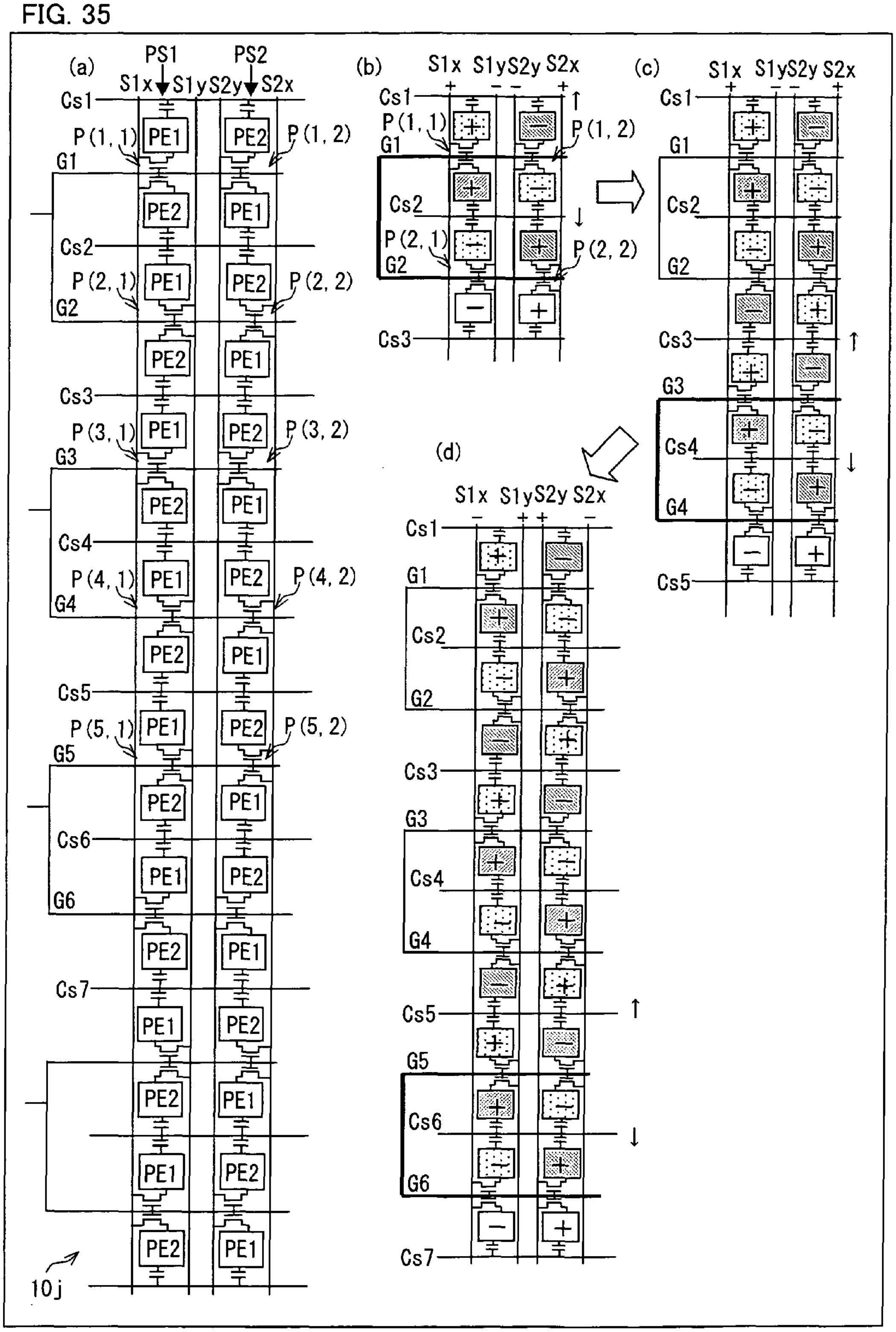
FIG. 35 (*a*) of FIG. 35 is a drawing schematically showing a display section of another liquid crystal display in accordance with Embodiment 7. (*b*)-(*d*) of FIG. 35 are drawings schematically showing a method for driving the display section.
Figure 36:
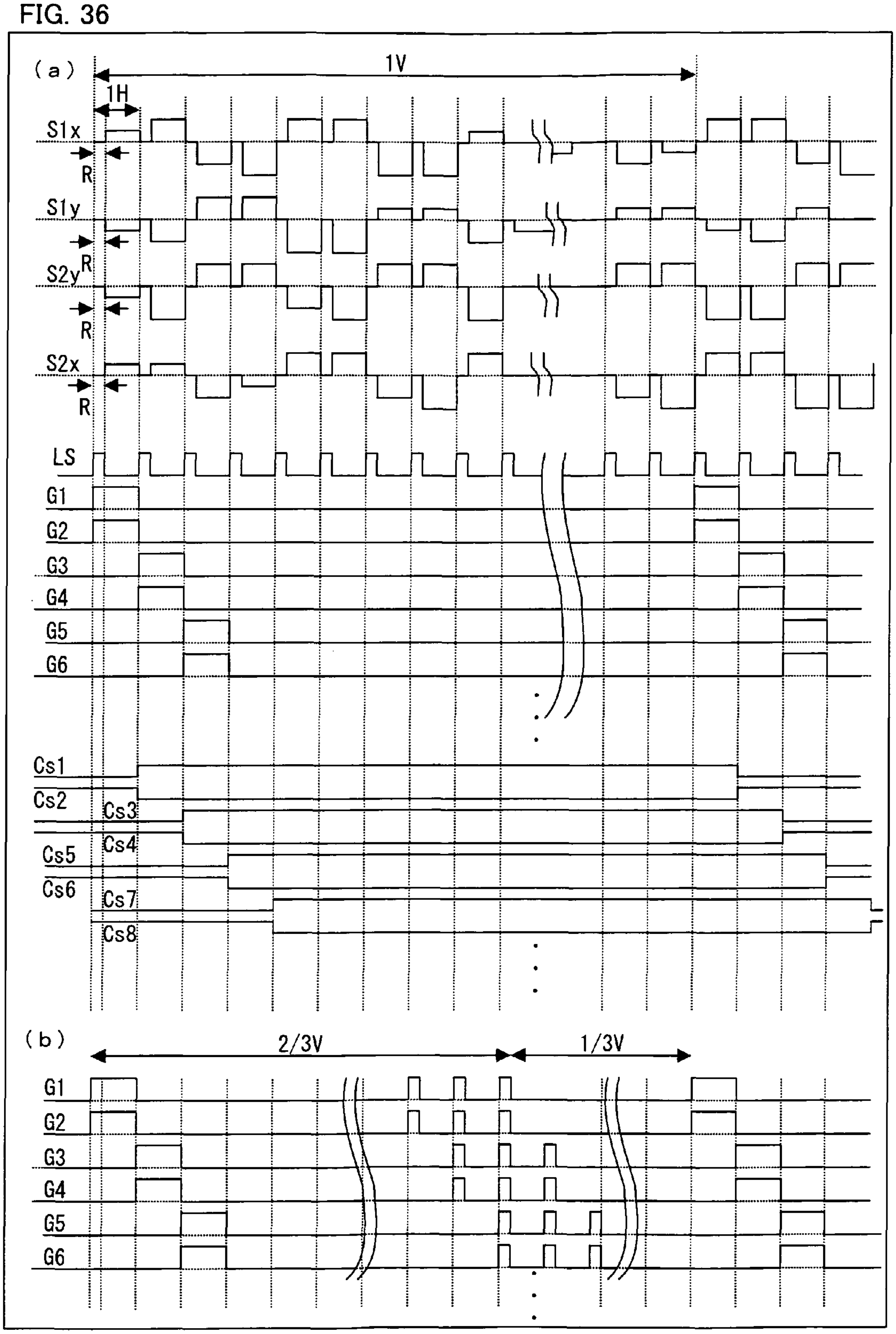
FIG. 36 (*a*) of FIG. 36 is a timing chart showing a method for driving the display section shown in (*a*) of FIG. 35. (*b*) of FIG. 36 is a timing chart showing a modification example of the method.

The display section 10*i* shown in (*a*) of FIG. 33 may be arranged to be a display section 10*j* shown in (*a*) of FIG. 35 based on a pixel division system (multi-pixel structure). (*b*)-(*d*) of FIG. 35 are drawings schematically showing a method for driving the display section 10*j*. (*a*) of FIG. 36 is a timing chart showing the method. Connections between each pixel of the display section 10*j* (first and second pixels PE1 and PE2 and first and second transistors included in the pixel) and a data signal line and a scanning signal line are the same as those of the display section 10*i* shown in (*a*) of FIG. 33, and the method for driving scanning signal lines shown in (*a*) of FIG. 36 is the same as that for the configuration of (*a*) of FIG. 34.

As shown in (*b*) of FIG. 35 and (*a*) of FIG. 36, in the display section 10*j*, during a first horizontal scanning period, scanning signal lines G1 and G2 are simultaneously made ON (put in a selected state), writing of a refresh potential and a same signal potential having a plus polarity from the first data signal line S1*x* to the first and second pixel electrodes PE1 and PE2 of the pixel P(1,1) and writing of a refresh potential and a same signal potential having a minus polarity from the second data signal line S1*y* to the first and second pixel electrodes PE1 and PE2 of the pixel P(2,1) are carried out simultaneously, and writing of a refresh potential and a same signal potential having a minus polarity from the second data signal line S2*y* to the first and second pixel electrodes PE1 and PE2 of the pixel P(1,2) and writing of a refresh potential and a same signal potential having a plus polarity from the first data signal line S2*x* to the first and second pixel electrodes PE1 and PE2 of the pixel P(2,2) are carried out simultaneously.

In synchronization with making the scanning signal lines G1 and G2 OFF simultaneously, the retention capacitance line Cs1 is caused to rise and the retention capacitance line Cs2 is caused to fall. Consequently, a portion of the pixel P(1,1) which includes the first pixel electrode PE1 serves as a bright sub-pixel, a portion of the pixel P(1,1) which includes the second pixel electrode PE2 serves as a dark sub-pixel, a portion of the pixel P(2,1) which includes the first pixel electrode PE1 serves as a bright sub-pixel, a portion of the pixel P(1,2) which includes the second pixel electrode PE2 serves as a dark sub-pixel, a portion of the pixel P(1,2) which includes the first pixel electrode PE1 serves as a bright sub-pixel, and a portion of the pixel P(2,2) which includes the second pixel electrode PE2 serves as a dark sub-pixel. Control in the next horizontal scanning period is performed as shown in FIG. 35(*c*), and control in the further next horizontal scanning period is performed as shown in FIG. 35(*d*).

As describe above, the configuration of FIG. 35 and (*a*) of FIG. 36 allows not only the effects yielded by the configuration of FIG. 33 and (*a*) of FIG. 34 but also improvement of a viewing angle characteristic by multi-pixel driving. In this regard, since bright sub-pixels and dark sub-pixels are provided in a checkered pattern, it is also possible to subdue jaggyness. Further, the configuration of (*a*) of FIG. 36 may be arranged such that each scanning signal line (G1, G2, . . . ) is selected plural times with timing when approximately ⅔ frame period has passed from last scanning and in synchronization with the refresh period R, and the refresh potential (e.g. Vcom) is written in a pixel connected with each scanning signal line during this intermediate selection period (see (*b*) of FIG. 36). This reduces tailing etc. when displaying a moving image, thereby improving the quality of the displayed moving image.

Embodiment 8

Figure 37:
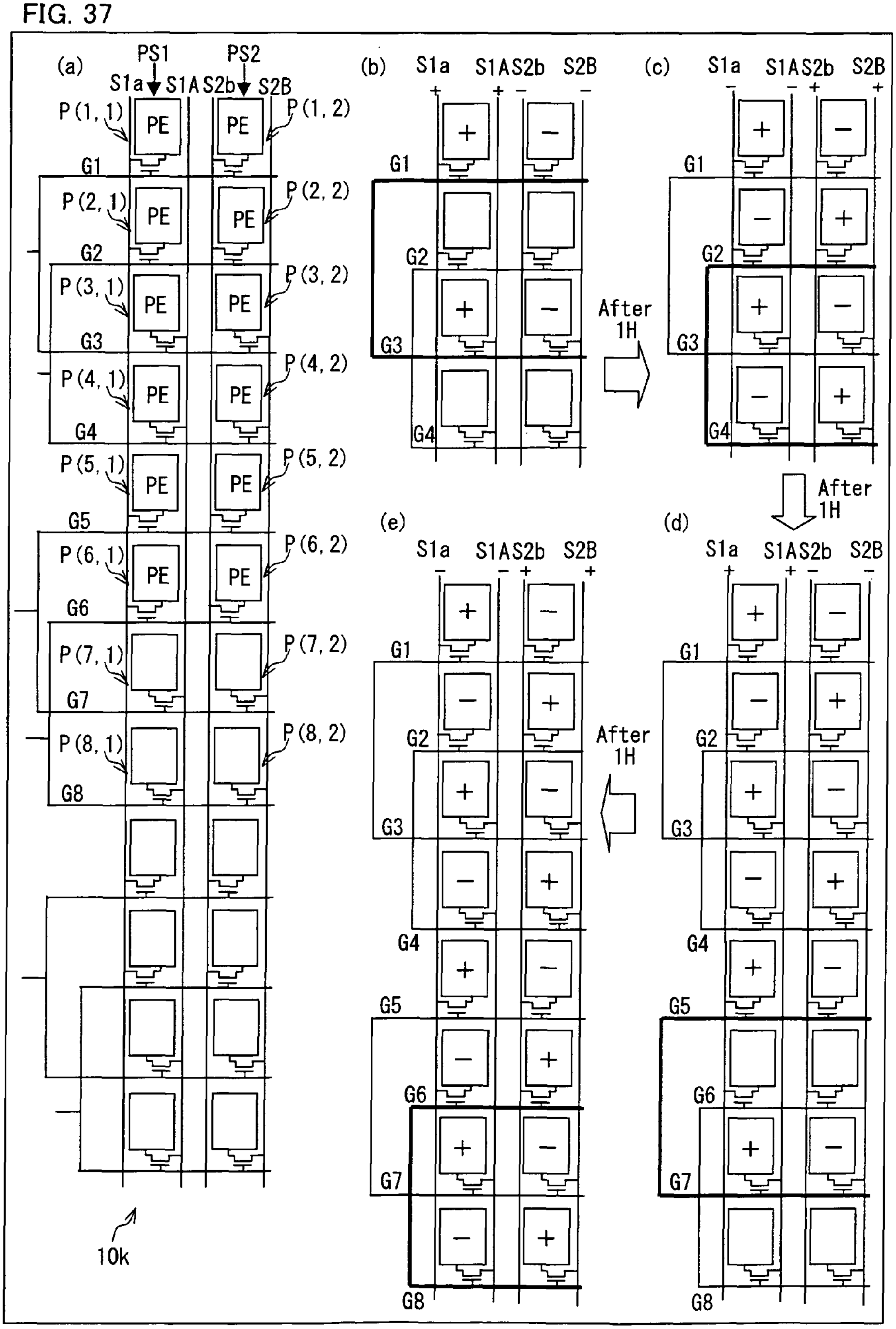
FIG. 37 (*a*) of FIG. 37 is a drawing schematically showing a display section of another liquid crystal display in accordance with Embodiment 8. (*b*)-(*e*) of FIG. 37 are drawings schematically showing a method for driving the display section.
Figure 38:
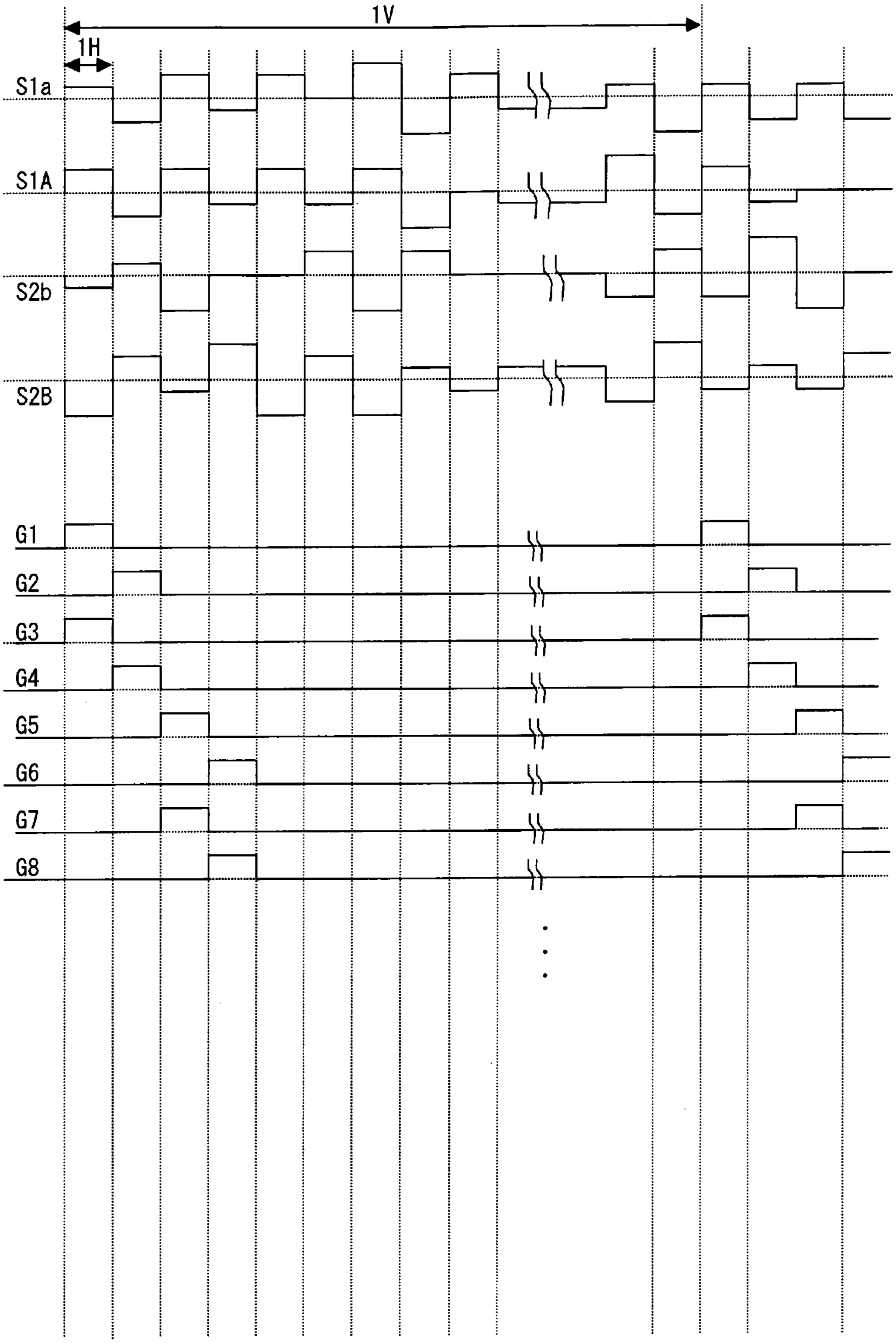
FIG. 38 is a timing chart showing a method for driving the display section shown in (*a*) of FIG. 37.

(*a*) of FIG. 37 is a drawing schematically showing one example of a configuration of a display section of the liquid crystal display of the present invention. (*b*)-(*e*) of FIG. 37 are drawings schematically showing a driving method of the display section. FIG. 38 is a timing chart showing the driving method. As shown in (*a*) of FIG. 37, a display section 10*k* includes first and second data signal lines (e.g. S1*a* and S1A) that correspond to one pixel column (e.g. PS1) and that are provided at both sides of the pixel column, and one pixel (e.g. P(1, 1)) included in the pixel column is connected with one scanning signal line G1 and is connected with one of the first and second data signal lines (e.g. S1*a* and S1A). Specifically, assume that pixels on each pixel column are paired sequentially from a first pixel on the pixel column in such a manner that successive two odd-number-positioned pixels counted in a scanning direction are paired sequentially, successive two even-number-positioned pixels counted in the scanning direction are paired sequentially, and a pair consisting of successive two odd-number-positioned pixels and a pair consisting of successive two even-number-positioned pixels are given count numbers alternately. In this case, two pixels in each pair are connected with different data signal lines. Pixels in one pixel row are connected with the same scanning signal line, and in each pixel, a pixel electrode PE is connected with one data signal line via a transistor (TFT) and the gate terminal of the transistor is connected with one scanning signal line.

In the present embodiment, as shown in FIGS. 37 and 38, the first and second data signal lines are supplied with signal potentials with the same polarity and the polarity of signal potentials supplied to the first and second data signal lines is inverted with respect to each horizontal scanning period (1H), and two data signal lines for one of adjacent two pixel columns and two data signal lines for the other of the adjacent two pixel columns are supplied with signal potentials with opposite polarities.

Simultaneous selection of scanning signal lines respectively connected with two pixels in a pair is carried out in accordance with the count numbers mentioned above (the simultaneous selection of scanning signal lines connected with two odd-number-positioned pixels in a pair and the simultaneous selection of scanning signal lines connected with two even-number-positioned pixels in a pair are carried out alternately in a scanning direction). That is, scanning signal lines are selected sequentially with starting from a first scanning signal line that is connected with a pixel on a first row, in such a manner that simultaneous selection of successive two odd-number-positioned scanning signal lines and simultaneous selection of successive two even-number-positioned scanning signal lines are carried out alternately.

For example, in a case of the pixel column PS1, a first data signal line S1a and a second data signal line S1A are provided at both sides of the pixel column PS1, respectively, a first-positioned pixel P(1,1) and a third-positioned pixel P(3,1) are paired, the pixel P(1,1) is connected with a scanning signal line G1 and the first data signal line S1a, and the pixel P(3,1) is connected with a scanning signal line G3 and the second data signal line S1A. Similarly, a second-positioned pixel P(2,1) and a fourth-positioned pixel P(4,1) are paired, the pixel P(2,1) is connected with a scanning signal line G2 and the first data signal line S1a, and the pixel P(4,1) is connected with a scanning signal line G4 and the second data signal line S1A. Similarly, a fifth-positioned pixel P(5,1) and a seventh pixel P(7,1) are paired, the pixel P(5,1) is connected with a scanning signal line G5 and the first data signal line S1a, and the pixel P(7,1) is connected with a scanning signal line G7 and the second data signal line S1A.

Further, in a case of the pixel column PS2, a first data signal line S2a and a second data signal line S2A are provided at both sides of the pixel column PS2, respectively, a first-positioned pixel P(1,2) and a third-positioned pixel P(3,2) are paired, the pixel P(1,2) is connected with a scanning signal line G1 and the first data signal line S2b, and the pixel P(3,2) is connected with a scanning signal line G3 and the second data signal line S2B. Similarly, a second-positioned pixel P(2,2) and a fourth-positioned pixel P(4,2) are paired, the pixel P(2,2) is connected with a scanning signal line G2 and the first data signal line S2b, and the pixel P(4,2) is connected with a scanning signal line G4 and the second data signal line S2B. Similarly, a fifth-positioned pixel P(5,2) and a seventh pixel P(7,2) are paired, the pixel P(5,2) is connected with a scanning signal line G5 and the first data signal line S2b, and the pixel P(7,2) is connected with a scanning signal line G7 and the second data signal line S2B.

As shown in FIGS. 37 and 38, initially, the scanning signal line G1 connected with the pixels P(1,1) and P(1,2) and the scanning signal line G3 connected with the pixels P(3,1) and P(3,2) are selected simultaneously. Then, the scanning signal line G2 connected with the pixels P(2,1) and P(2,2) and the scanning signal line G4 connected with the pixels P(4,1) and P(4,2) are selected simultaneously. Then, the scanning signal line G5 connected with the pixels P(5,1) and P(5,2) and the scanning signal line G7 connected with the pixels P(7,1) and P(7,2) are selected simultaneously.

Consequently, in the display section 10k, during a first horizontal scanning period, writing of a signal potential having a plus polarity from the first data signal line S1a to the pixel electrode of the pixel P(1,1) and writing of a signal potential having a plus polarity from the second data signal line S1A to the pixel electrode of the pixel P(3,1) are carried out simultaneously, and writing of a signal potential having a minus polarity from the first data signal line S2b to the pixel electrode of the pixel P(1,2) and writing of a signal potential having a minus polarity from the second data signal line S2B to the pixel electrode of the pixel P(3,2) are carried out simultaneously (see (b) of FIG. 37 and FIG. 38). During a next horizontal scanning period, writing of a signal potential is performed as shown in (c) of FIG. 37. During a further next horizontal scanning period, writing of a signal potential is performed as shown in (d) of FIG. 37. Consequently, in the display section 10k, polarity distribution of potentials written into individual pixels exhibits dot inversion (1H/1V inversion) as shown in (e) of FIG. 37.

As described above, with the configuration of FIGS. 37 and 38, it is possible not only to subdue variations in reached potential in a liquid crystal display in which full charging of pixels is difficult even when simultaneous scanning of two lines is performed, but also to subdue flickers by dot-inverting individual pixels. Further, the configuration of FIG. 38 may be arranged such that a refresh period R is provided at the beginning of each horizontal scanning period, and a refresh potential (e.g. Vcom) is supplied to individual data signal lines during the refresh period R (see (a) of FIG. 39). This arrangement allows charging waveforms of a pixel to be substantially uniform with each other regardless of the level of signal potentials supplied to the data signal lines during the previous horizontal scanning period, in a case where even simultaneous scanning of two lines does not secure full charging. It is found from FIG. 59 that although the configuration of (a) of FIG. 39 corresponding to the mode C is a bit inferior to the mode B (FIG. 38) in terms of the sensory evaluations, the configuration of (a) of FIG. 39 meets the required level, and besides, has less power consumption and less generation of heat of a source driver compared with the mode B since a refresh potential is supplied during each horizontal scanning period in the configuration of (a) of FIG. 39.

Figure 39:
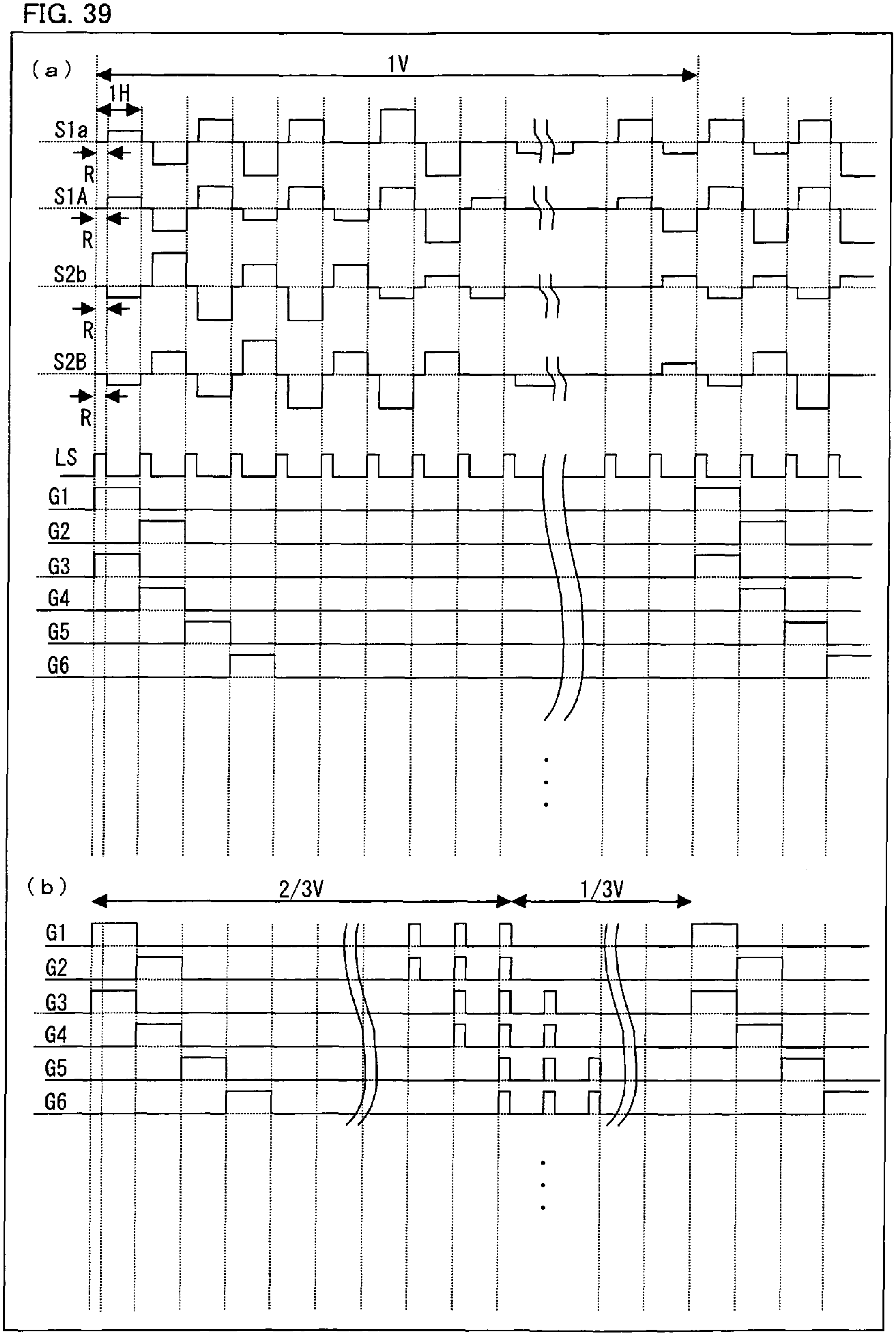
FIG. 39 (*a*) of FIG. 39 is a timing chart showing a method for driving the display section shown in (*a*) of FIG. 37. (*b*) of FIG. 39 is a timing chart showing a modification example of the method.

Further, as shown in (b) of FIG. 39, each scanning signal line is selected plural times with timing when approximately ⅔ frame period has passed from the previous scanning and in synchronization with the refresh period R, and the refresh potential (e.g. Vcom) is written in a pixel connected with each scanning signal line during this intermediate selection period. This reduces tailing etc. when displaying a moving image, thereby improving the quality of the displayed moving image.

Figure 40:
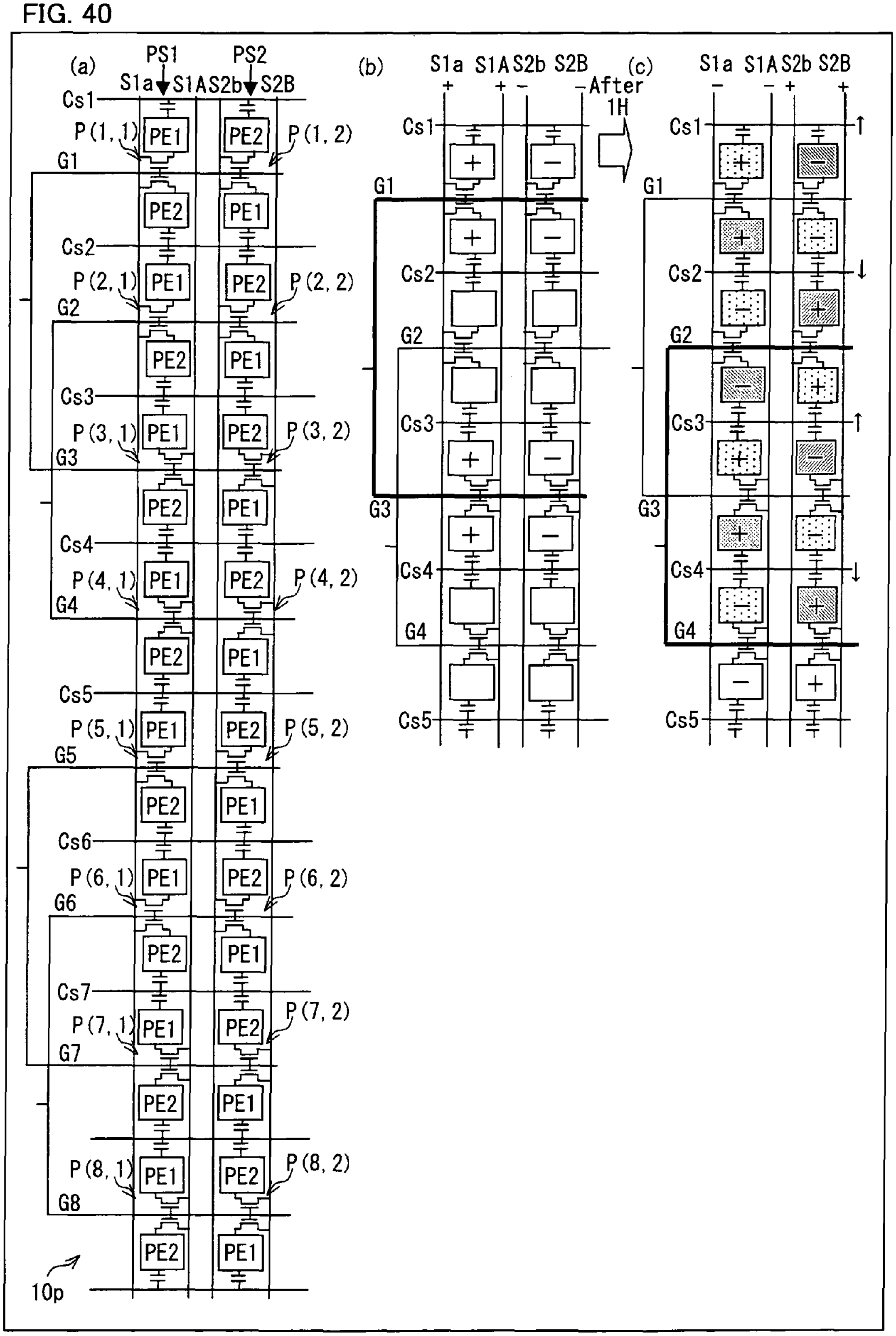
FIG. 40 (*a*) of FIG. 40 is a drawing schematically showing a display section of another liquid crystal display in accordance with Embodiment 8. (*b*)-(*c*) of FIG. 40 are drawings schematically showing a method for driving the display section.
Figure 41:
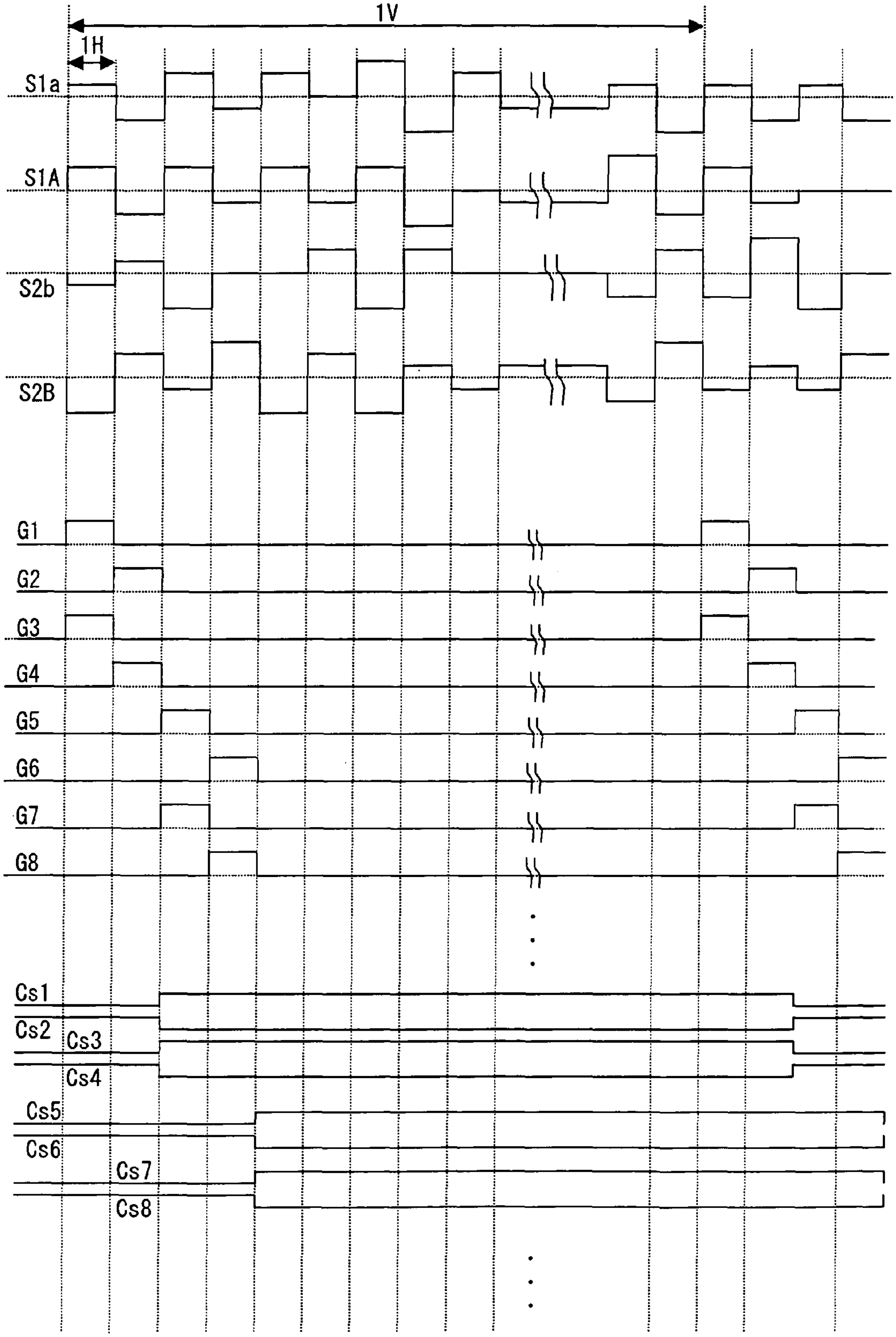
FIG. 41 is a timing chart showing a method for driving the display section shown in (*a*) of FIG. 40.

The display section 10k shown in (a) of FIG. 37 may be arranged to be a display section 10p shown in (a) of FIG. 40 based on a pixel division system (multi-pixel structure). (b)-(c) of FIG. 40 are drawings schematically showing a method for driving the display section 10p. FIG. 41 is a timing chart showing the method. Connections between each pixel of the display section 10p (first and second pixels PE1 and PE2 and first and second transistors included in the pixel) and a data signal line and a scanning signal line are the same as those of the display section 10k shown in (a) of FIG. 37, and the method for driving scanning signal lines shown in FIG. 41 is the same as that for the configuration of FIG. 38.

As shown in (b) of FIG. 40 and FIG. 41, in the display section 10p, during a first horizontal scanning period, scanning signal lines G1 and G3 are simultaneously made ON (put in a selected state), writing of a same signal potential having a plus polarity from the first data signal line S1a to the first and second pixel electrodes PE1 and PE2 of the pixel P(1,1) and writing of a same signal potential having a plus polarity from the second data signal line S1A to the first and second pixel electrodes PE1 and PE2 of the pixel P(3,1) are carried out simultaneously, and writing of a same signal potential having a minus polarity from the first data signal line S2b to the first and second pixel electrodes PE1 and PE2 of the pixel P(1,2) and writing of a same signal potential having a minus polarity from the second data signal line S2B to the first and second pixel electrodes PE1 and PE2 of the pixel P(3,2) are carried out simultaneously (see (b) of FIG. 40 and FIG. 41). During a next horizontal scanning period, scanning signal lines G2 and G4 are simultaneously made ON (put in a selected state), writing of a same signal potential having a minus polarity from the first data signal line S1a to the first and second pixel electrodes PE1 and PE2 of the pixel P(2,1) and writing of a same signal potential having a minus polarity from the second data signal line S1A to the first and second pixel electrodes PE1 and PE2 of the pixel P(4,1) are carried out simultaneously, and writing of a same signal potential having a plus polarity from the first data signal line S2*b* to the first and second pixel electrodes PE1 and PE2 of the pixel P(3,2) and writing of same a signal potential having a plus polarity from the second data signal line S2B to the first and second pixel electrodes PE1 and PE2 of the pixel P(4,2) are carried out simultaneously. In synchronization with making the scanning signal lines G2 and G4 OFF simultaneously, the retention capacitance line Cs1 is caused to rise and the retention capacitance line Cs2 is caused to fall, and the retention capacitance line Cs3 is caused to rise and the retention capacitance line Cs4 is caused to fall (see (*c*) of FIG. 40 and FIG. 41).

Consequently, a portion of the pixel P(1,1) which includes the first pixel electrode PE1 serves as a bright sub-pixel, a portion of the pixel P(1,1) which includes the second pixel electrode PE2 serves as a dark sub-pixel, a portion of the pixel P(2,1) which includes the first pixel electrode PE1 serves as a bright sub-pixel, a portion of the pixel P(2,1) which includes the second pixel electrode PE2 serves as a dark sub-pixel, a portion of the pixel P(3,1) which includes the first pixel electrode PE1 serves as a bright sub-pixel, a portion of the pixel P(2,1) which includes the second pixel electrode PE2 serves as a dark sub-pixel, and a portion of the pixel P(1,2) which includes the second pixel electrode PE2 serves as a dark sub-pixel, a portion of the pixel P(1,2) which includes the first pixel electrode PE1 serves as a bright sub-pixel, a portion of the pixel P(2,2) which includes the second pixel electrode PE2 serves as a dark sub-pixel, a portion of the pixel P(2,2) which includes the first pixel electrode PE1 serves as a bright sub-pixel, a portion of the pixel P(3,2) which includes the second pixel electrode PE2 serves as a dark sub-pixel, and a portion of the pixel P(3,2) which includes the first pixel electrode PE1 serves as a bright sub-pixel.

As describe above, the configuration of FIGS. 40 and 41 allows not only the effects yielded by the configuration of FIGS. 37 and 38 but also improvement of a viewing angle characteristic by multi-pixel driving. In this regard, since bright sub-pixels and dark sub-pixels are positioned in a checkered pattern, it is also possible to subdue jaggyness. The configuration of FIG. 41 may be arranged such that a refresh period R is provided at the beginning of each horizontal scanning period and a refresh potential (e.g. Vcom) is supplied to individual data signal lines during the refresh period R (see (*a*) of FIG. 42). This allows charging waveforms of a pixel to be substantially uniform with each other regardless of the levels of signal potentials supplied to the same data signal line during the previous horizontal scanning period in a case where even simultaneous scanning of two lines does not secure sufficient full charging. It is found from FIG. 59 that although the configuration of (*a*) of FIG. 42 corresponding to the mode C is a bit inferior to the mode B (FIG. 41) in terms of the sensory evaluations, the configuration of (*a*) of FIG. 42 meets the required level, and besides, has less power consumption and less generation of heat of a source driver compared with the mode B since a refresh potential is supplied during each horizontal scanning period in the configuration of (*a*) of FIG. 42.

Figure 42:
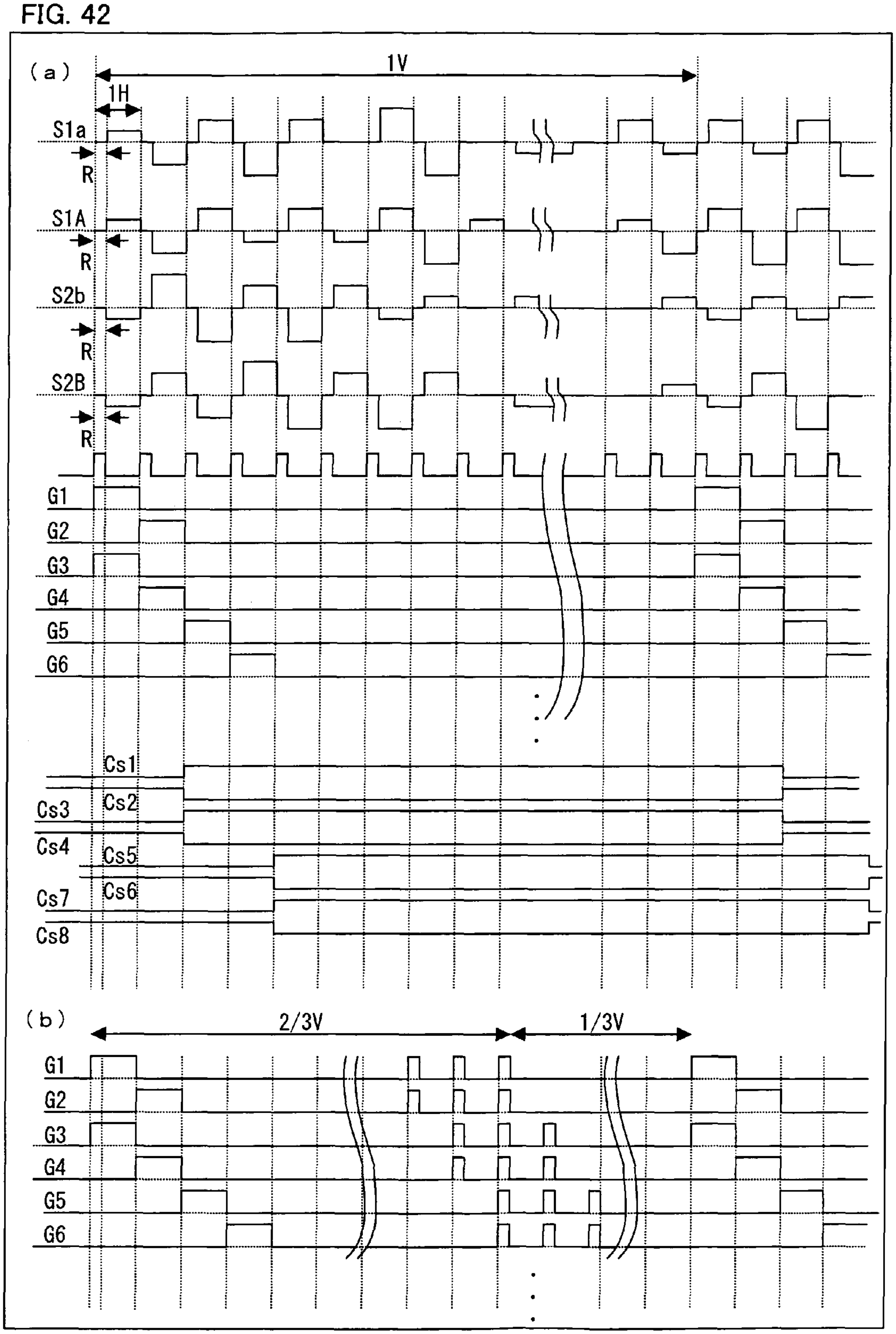
FIG. 42 (*a*) of FIG. 42 is a timing chart showing another method for driving the display section shown in (*a*) of FIG. 40. (*b*) of FIG. 42 is a timing chart showing a modification example of the method.

Further, as shown in (*b*) of FIG. 42, each scanning signal line is selected plural times with timing when approximately ⅔ frame period has passed from previous scanning and in synchronization with the refresh period R, and the refresh potential (e.g. Vcom) is written in a pixel connected with each scanning signal line during this intermediate selection period. This reduces tailing etc. when displaying a moving image, thereby improving the quality of the displayed moving image.

In the configuration of FIGS. 37 and 38, the polarity of signal potentials supplied to the first and second data signal lines is inverted with respect to one horizontal scanning period (1H). However, the present invention is not limited to this case. By changing the order of simultaneous selection of scanning signal lines based on connections of pixels as shown in (*a*) of FIG. 37, it is possible to invert the polarity of signal potentials supplied to the data signal lines with respect to a plurality of horizontal scanning periods. For example, in a case where the polarity of signal potentials is inverted with respect to every two horizontal scanning periods, the order of simultaneous selection of scanning signal lines is such that simultaneous selection of G1 and G3→simultaneous selection of G5 and G7→simultaneous selection of G2 and G4→simultaneous selection of G6 and G8. In this case, it is possible to reduce power consumption of a source driver compared with a case where the polarity of a signal potential is inverted with respect to each horizontal scanning period.

Further, in the configurations of FIGS. 40 and 41 and of FIGS. 40 and 42, shifts of levels of potentials of the retention capacitance lines Cs1 and Cs3 are made in the same direction and in synchronization with each other, and shifts of levels of potentials of the retention capacitance lines Cs2 and Cs4 are made in the same direction and in synchronization with each other. Accordingly, it is possible for the retention capacitance lines Cs1 and Cs3 to share the same signal (Cs signal) supplied thereto and possible for the retention capacitance lines Cs2 and Cs4 to share the same signal (Cs signal) supplied thereto. That is, when odd-number-positioned retention capacitance lines are sequentially paired with starting from a first retention capacitance line in such a manner that every successive two retention capacitance lines are regarded as a pair and even-number-positioned retention capacitance lines are sequentially paired with starting from a second retention capacitance line in such a manner that every successive two retention capacitance lines are regarded as a pair, it is possible for paired two retention capacitance lines to share the same Cs signal supplied thereto. This allows reducing the number (kind) of Cs signals supplied to all retention capacitance lines almost by half, thereby reducing the size of a Cs control circuit for generating Cs signals (see FIG. 48). Paired two retention capacitance lines (e.g. Cs1 and Cs3) may be connected in a panel (e.g. connected with the same Cs main line) or may be connected with the same output terminal in the Cs control circuit.

Regarding Individual Embodiments

Figure 55:
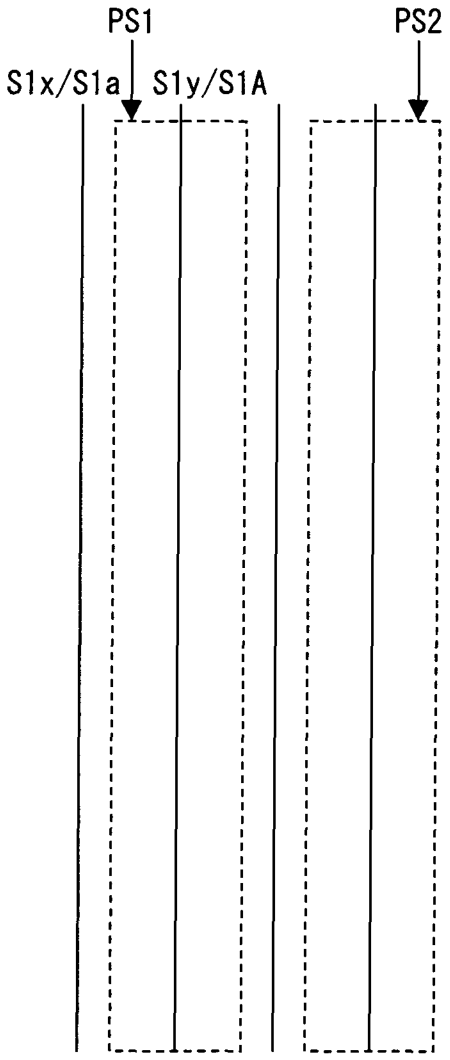
FIG. 55 is a drawing schematically showing another example of positioning of a pixel column and first and second data signal lines for the pixel column.

In individual embodiments as described above, first and second data signal lines for one pixel column are provided at both sides of the pixel column, respectively. However, the present invention is not limited to this configuration. For example, as shown in FIG. 55, first and second data signal lines for a pixel column may be provided in such a manner that the first data signal line (e.g. S1*x* or S1*a*) is positioned at one side of the pixel column and the second data signal line (e.g. S1*y* or S1A) are positioned so as to overlap the pixel column. This configuration allows the data signal lines to be separated from each other, thereby reducing parasitic capacitance between the data signal lines. Further, this configuration allows maintaining a wider distance between the data signal lines, compared with a configuration in which data signal lines for a pixel column are provided at both sides of the pixel column, respectively. This allows reducing the ratio of short-circuits between data signal lines, thereby increasing the yield ratio of products. It should be noted that since this configuration requires overlapping of a data signal line and a pixel electrode of each pixel, it is desirable to thicken an interlayer insulating film on the data signal line (e.g. use an organic insulating film as the interlayer insulating film).

Figure 60:
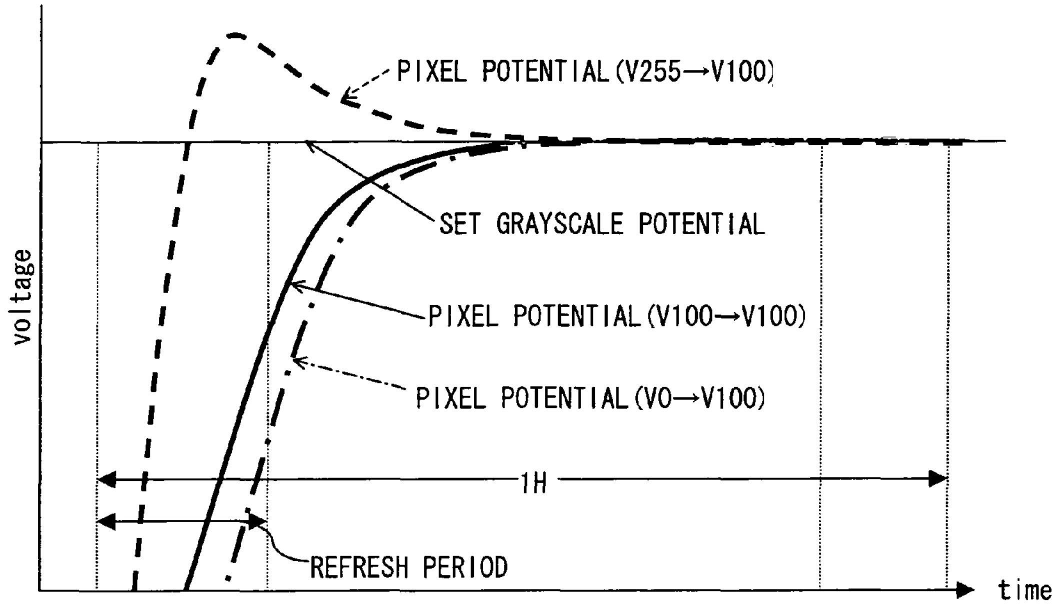
FIG. 60 is a waveform chart showing variation in reached potential during a current horizontal scanning period due to the level of a potential supplied during the previous horizontal scanning period in a case where the polarity of a signal potential supplied to a data signal line is inverted with respect to each vertical scanning period and active refresh (refresh period=100% of time constant of a data signal line) is performed.
Figure 61:
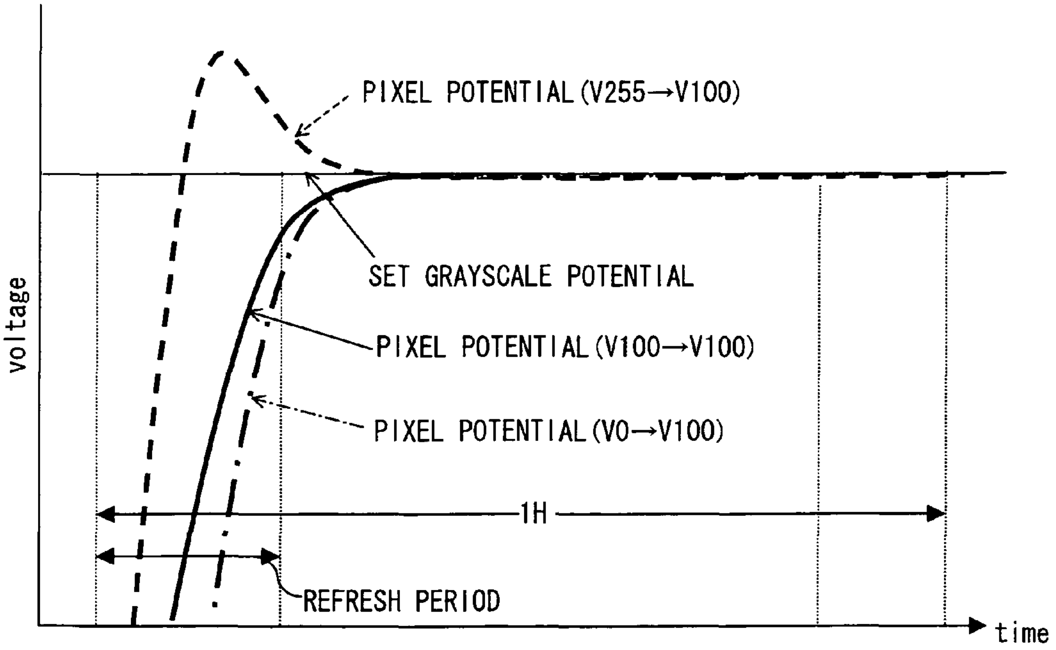
FIG. 61 is a waveform chart showing variation in reached potential during a current horizontal scanning period due to the level of a potential supplied during the previous horizontal scanning period in a case where the polarity of a signal potential supplied to a data signal line is inverted with respect to each vertical scanning period and active refresh (refresh period=90% of time constant of a data signal line) is performed.

The following explains a mode G of FIG. 59. When performing 1V inversion driving (driving in which the polarity of a signal potential supplied to a data signal line is inverted with respect to 1 frame) shown in (*a*) and (*b*) of FIG. 2, (*a*) and (*b*) of FIG. 4, (*a*) and (*b*) of FIG. 12, (*a*) and (*b*) of FIG. 14, (*a*) and (*b*) of FIG. 16, and (*a*) and (*b*) of FIG. 18, it is possible to set a refresh potential Vr based on a signal potential Vp during previous 1H (horizontal scanning period), a signal potential Vq during a current horizontal scanning period, and a potential Vcom of a common electrode on a counter substrate that faces an active matrix substrate (active refresh). For example, assume that $Vr=Vq+\{(Vq-Vcom)-(Vp-Vcom)\}/2$. In this case, a refresh period is set to 90-100 percent with respect to a time constant of a data signal line (time constant of a source line). FIG. 60 is a waveform chart showing variations in reached potential of a current horizontal scanning period due to the level of a potential supplied during the previous horizontal scanning period in a case where the above-described active refresh is performed with a refresh period being 90 percent of the time constant of a data signal line. It is understood from FIG. 60 that reached potentials of pixels are well uniformed and the reached potentials are substantially equal to set grayscale potentials in respective cases of grayscale 0 (previous horizontal scanning period)→grayscale 100 (current horizontal scanning period), grayscale 100→grayscale 100, and grayscale 255 (previous horizontal scanning period)→grayscale 100. FIG. 61 is a waveform chart showing variations in reached potential of a current horizontal scanning period due to the level of a potential supplied during the previous horizontal scanning period in a case where the above-described active refresh is performed with a refresh period being 100 percent of the time constant of a data signal line. It is understood from FIG. 61 that reached potentials of pixels are better uniformed and the reached potentials are substantially equal to set grayscale potentials in respective cases of grayscale 0 (previous horizontal scanning period)→grayscale 100 (current horizontal scanning period), grayscale 100→grayscale 100, and grayscale 255 (previous horizontal scanning period)→grayscale 100.

Figure 47:
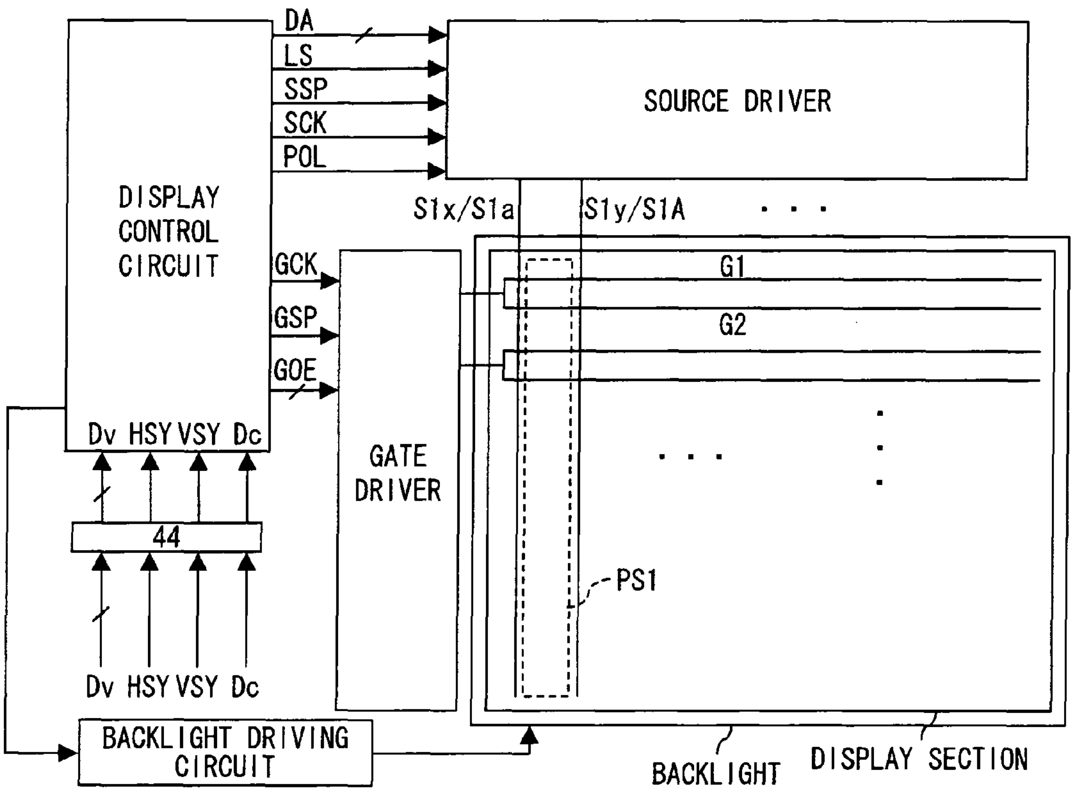
FIG. 47 is a block diagram showing a configuration of a liquid crystal display of the present invention (based on pixel-non-division system).

FIG. 47 is a block diagram showing a configuration of a liquid crystal display of the present invention which includes the display section 10A, 10C, 10E, 10F, 10*a*, 10*e*, 10*i*, 10*k* or the like (based on a pixel-non-division system). As shown in the drawing, the liquid crystal display includes a display section (liquid crystal panel), a source driver, a gate driver, a backlight, a backlight driving circuit, a display control circuit, and a data permutation circuit 44. The source driver drives data signal lines, the gate driver drives scanning signal lines, the data permutation circuit 44 permutates input data (mentioned later), and the display control circuit controls the source driver, the gate driver, and the backlight driving circuit.

The display control circuit receives, from an outside signal source, a digital video signal Dv indicative of an image to be displayed; a horizontal sync signal HSY and a vertical sync signal VSY each corresponding to the digital video signal Dv; and a control signal Dc for controlling display operation. Further, the display control circuit generates, based on the signals Dv, HSY, VSY, and Dc thus received, a data start pulse signal SSP, a data clock signal SCK, a latch strobe signal LS, digital image signal DA indicative of an image to be displayed (signal corresponding to video signal Dv), a gate start pulse signal GSP, a gate clock signal GCK, and a gate driver output control signal (scanning signal output control signal) GOE, each serving as a signal for enabling the display section to display an image indicated by the digital video signal Dv, and the display control circuit outputs these signals.

To be more specific, the video signal Dv is subjected to timing adjustment etc. in an internal memory if necessary and then outputted as the digital image signal DA from the display control circuit. The data clock signal SCK is generated as a signal consisting of pulses corresponding to pixels of an image indicated by the digital image signal DA. The data start pulse signal SSP is generated, based on the horizontal sync signal HSY, as a signal which has a high (H) level only during a predetermined period with respect to each horizontal scanning period. The gate start pulse signal GSP is generated, based on the vertical sync signal VSY, as a signal which has a H level only during a predetermined period with respect to each frame period (each vertical scanning period). The gate clock signal GCK is generated based on the horizontal sync signal HSY. The latch strobe signal LS and the gate driver output control signal GOE are generated based on the horizontal sync signal HSY and the control signal Dc.

Among the signals thus generated by the display control circuit, the digital image signal DA, the latch strobe signal LS, a signal POL for controlling the polarity of a signal potential (data signal potential), the data start pulse signal SSP, and the data clock signal SCK are input to the source driver, and the gate start pulse signal GSP, the gate clock signal GCK, and the gate driver output control signal GOE are input to the gate driver.

Based on the digital image signal DA, the data clock signal SCK, the latch strobe signal LS, the data start pulse signal SSP, and the polarity inversion signal POL, the source driver sequentially generates data signals that are analog voltages corresponding to pixel values in each horizontal scanning line of an image represented by the digital image signal DA, and applies the data signals to source lines (e.g. S1*a*, S1A, S1*x* and S1*y*).

Based on the gate start pulse signal GSP, the gate clock signal GCK, and the gate driver output control signal GOE, the gate driver generates scanning signals and applies the scanning signals to gate lines, so as to selectively drive the gate lines.

As described above, the source driver and the gate driver drive the source lines and the gate lines of the display section (liquid crystal panel), so that a signal potential is written in a pixel electrode from a data signal line via a TFT connected with the selected scanning signal line. Thus, a voltage corresponding to the digital image signal DA is applied to the liquid crystal layer in individual pixels, and application of the voltage controls transmittance of light from the backlight, enabling the display section to display an image indicated by the digital video signal Dv.

Figure 48:
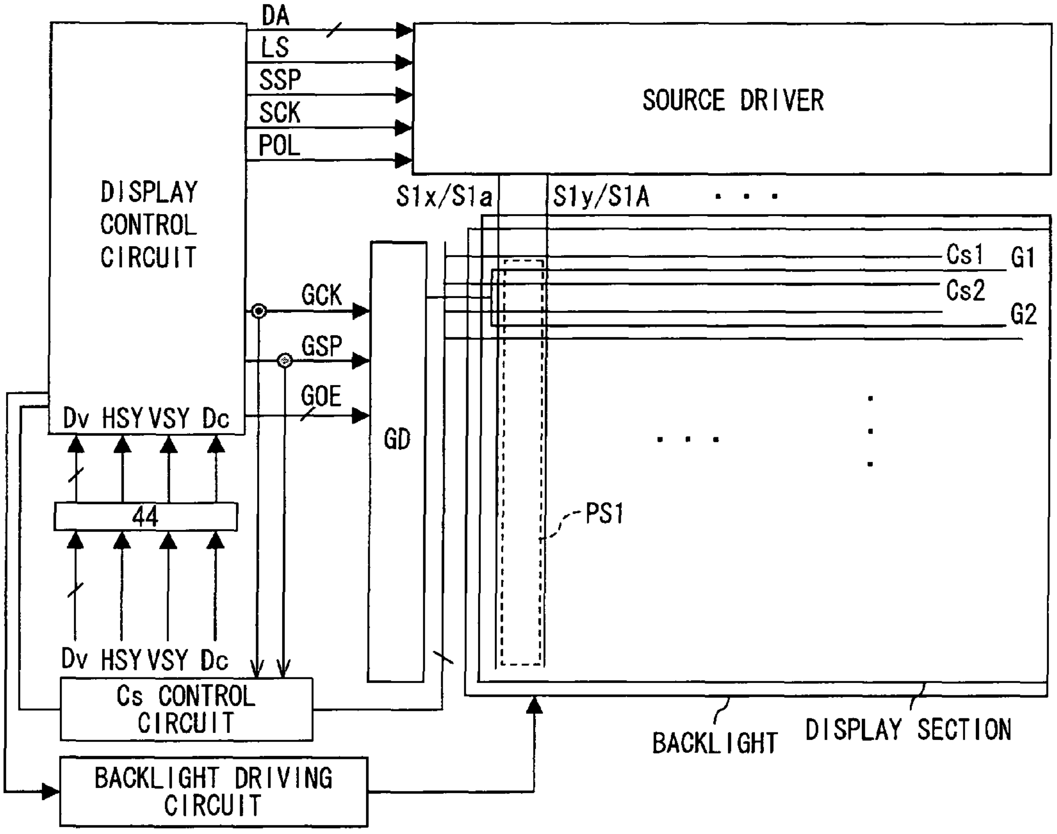
FIG. 48 is a block diagram showing a configuration of a liquid crystal display of the present invention (based on pixel-division system).

FIG. 48 is a block diagram showing a configuration of a liquid crystal display of the present invention which includes the display section 10B, 10D, 10*c*, 10*g*, 10*j*, 10*p* or the like (pixel-division system). The liquid crystal display includes a CS control circuit in addition to the configuration of FIG. 47. The CS control circuit is a circuit for controlling a phase, a cycle etc. of a CS signal for controlling a potential of a retention capacitance line (CS line). The CS control circuit receives a gate start pulse signal GSP and a gate clock signal GCK that are supplied from the display control circuit.

Figure 49:
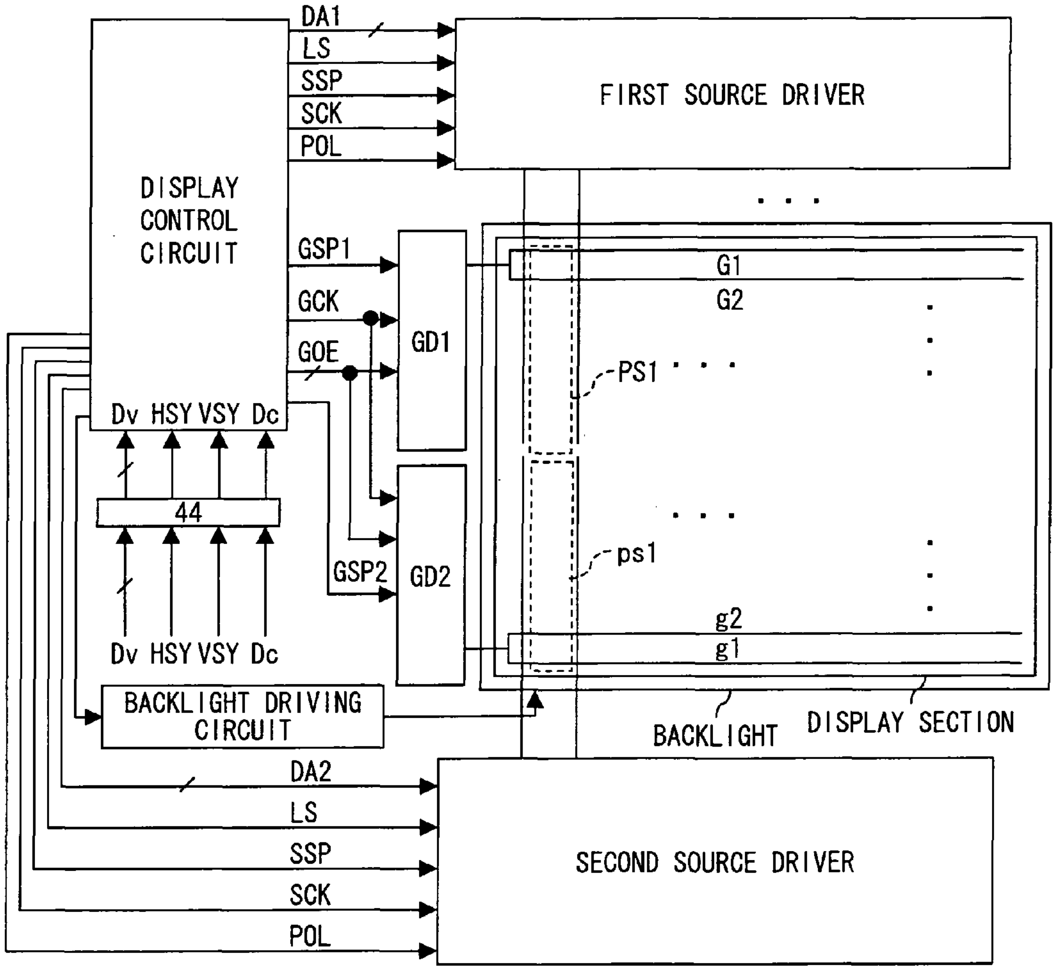
FIG. 49 is a block diagram showing another configuration (domain-divided drive configuration) of a liquid crystal display of the present invention (based on pixel-non-division system).
Figure 50:
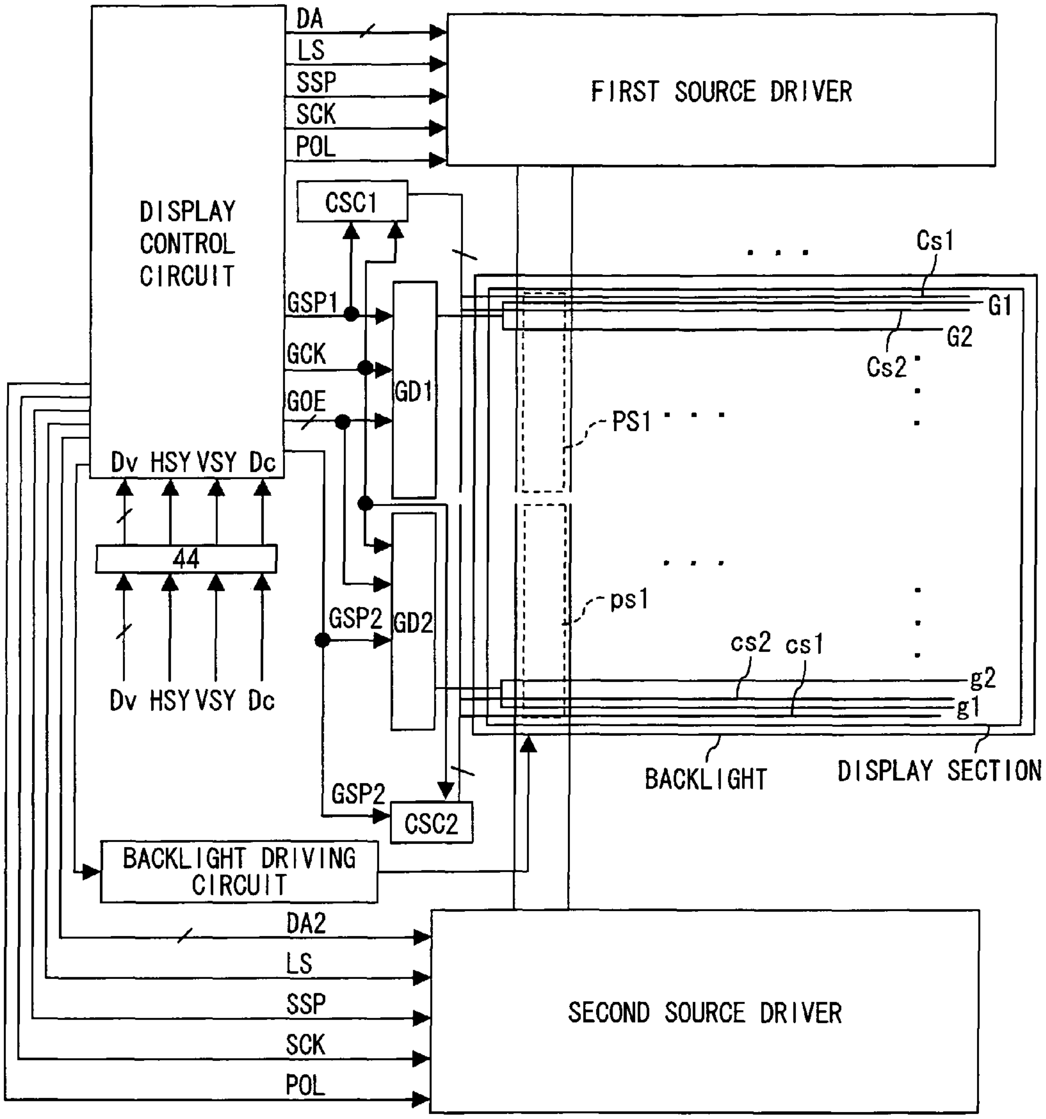
FIG. 50 is a block diagram showing another configuration (domain-divided drive configuration) of a liquid crystal display of the present invention (based on pixel-division system).

As shown in FIG. 49, the liquid crystal display of the present invention may be arranged such that an upper domain and a lower domain are provided in a display section (based on a pixel-non-division system) and each domain is provided with data signal lines, scanning signal lines, and pixels, and the data signal lines, the scanning signal lines, and the pixels are driven with respect to each domain. In this configuration, data signal lines are separately provided in the upper domain and the lower domain, and the data signal lines in the upper domain and the data signal lines in the lower domain are driven by first and second source drivers, respectively. Further, scanning signal lines G1, G2, . . . in the upper domain are driven by a first gate driver GD1 and scanning signal lines g1, g2, . . . in the lower domain are driven by a second gate driver GD2. Further, the first and second source drives receive DA1 and DA2, respectively, from the display control circuit. In a case where the display section is based on a pixel-division system, the liquid crystal display may be configured as shown in FIG. 50. That is, the liquid crystal display shown in FIG. 50 includes, in addition to the configuration shown in FIG. 49, a first CS control circuit CSC1 corresponding to the upper domain and a second CS control circuit CSC2 corresponding to the lower domain. The first CS control circuit CSC1 controls retention capacitance lines in the upper domain and the second CS control circuit CSC2 controls retention capacitance lines in the lower domain.

Figure 51:
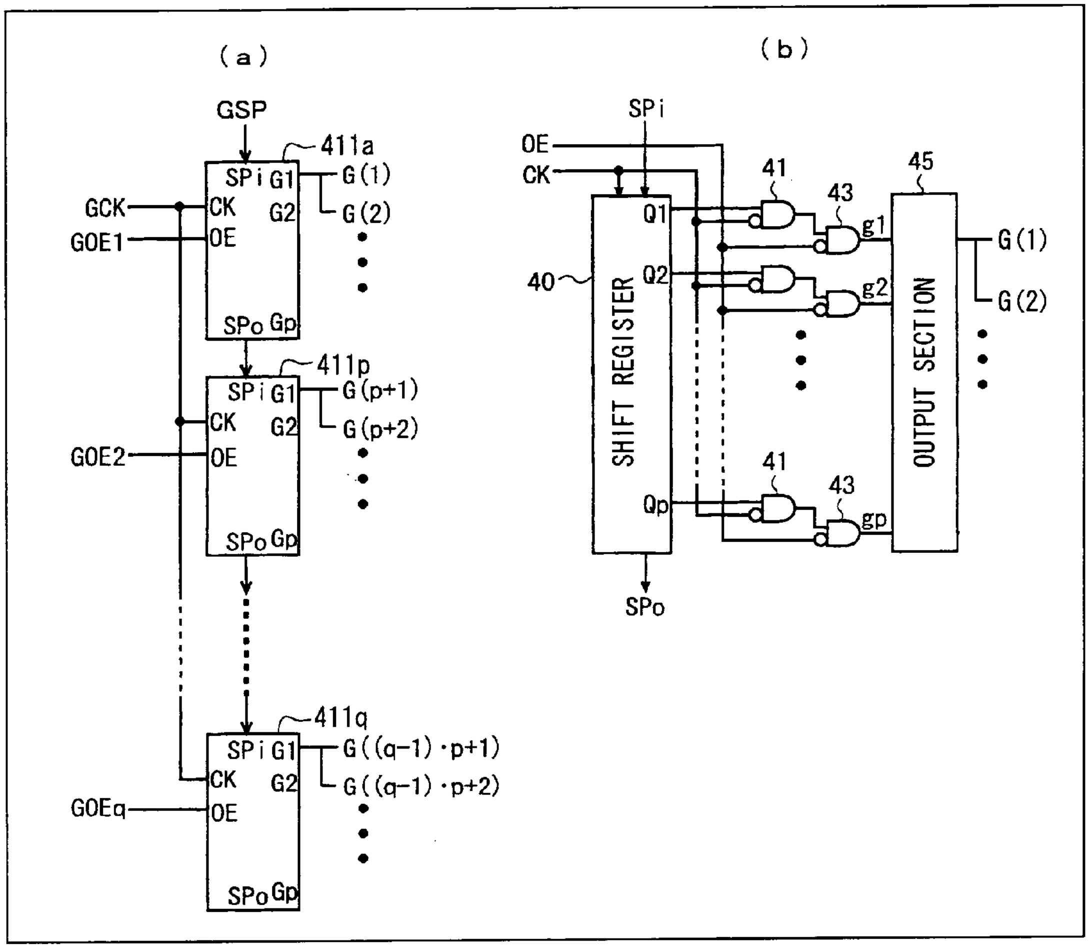
FIG. 51 (*a*) of FIG. 51 is a block diagram showing a configuration of a gate driver of a liquid crystal display of the present invention. (*b*) of FIG. 51 is a block diagram showing a configuration of a gate driver in a case where refresh drive is performed in the liquid crystal display of the present invention.

(*a*) and (*b*) of FIG. 51 show a configuration of a gate driver. As shown in the drawings, the gate driver includes gate driver IC (Integrated Circuit) chips 411*a*, 411*p*, . . . 411*q* serving as partial circuits each including a shift register 40 (see (*b*) of FIG. 51). As shown in FIG. (*b*) of 51, each of the gate driver IC chips includes the shift register 40, first AND gates 42 and second AND gates 43 that are provided so as to correspond to individual stages of the shift register 40, and an output section 45 for outputting scanning signals G(1), . . . based on output signals g(1) of the second AND gates 43, and the gate driver IC chip receives a start pulse signal SPi, a clock signal CK, and an output control signal OE that are supplied from outside.

The start pulse signal SPi is supplied to an input terminal of the shift register 40, and a start pulse signal SPo to be supplied to a subsequent gate driver IC chip is supplied from an output terminal of the shift register 40. Further, each of the first AND gates 41 receives a logic inversion signal of the clock signal CK, and each of the second AND gates 43 receives a logic inversion signal of the output control signal OE. Output signals Qk (k=1, . . . ) from individual stages of the shift register 40 are supplied to first AND gates 41 corresponding to the stages, and output signals from the first AND gates 41 are supplied to second AND gates 43 corresponding to the stages.

As shown in (*a*) of FIG. 51, the gate driver is realized by cascade-connecting the plurality of gate driver IC chips 411*a*-411*q* each having the above configuration. That is, in order that the shift registers 40 in the gate driver IC chips 411*a*-411*q* constitute one shift register, an output terminal of a shift register in a gate driver IC chip (output terminal for the start pulse signal SPo) is connected with an input terminal of a shift register in the next gate driver IC chip (input terminal for the start pulse signal SPi).

It should be noted that a gate start pulse signal GSP is supplied from the display control circuit to the shift register in the gate driver IC chip 411*a* at the head and the shift register in the gate driver IC chip 411*q* at the end is not connected with the outside. Further, a gate clock signal GCK from the display control circuit is supplied to individual gate driver IC chips as a clock signal CK common among the gate driver IC chips. On the other hand, the gate driver output control signal GOE generated in the display control circuit includes a first gate driver output control signal GOE1 to a qth gate driver output control signal GOEq. The first gate driver output control signal GOE1 to the qth gate driver output control signal GOEq are supplied as output control signals OE to the gate driver IC chips (411*a* to 411*q*), respectively.

Figure 52:
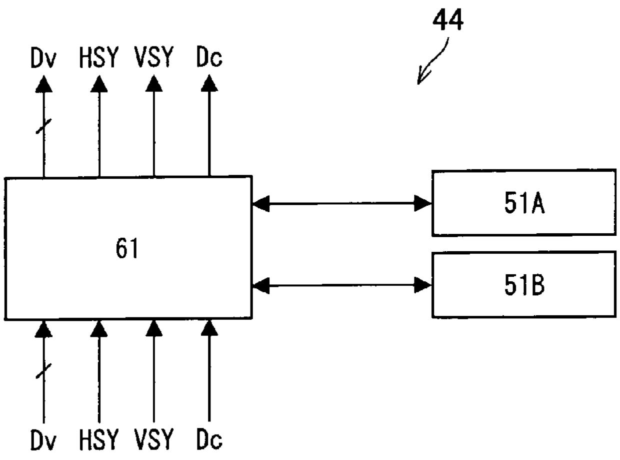
FIG. 52 is a block diagram showing a configuration of a data permutation circuit of a liquid crystal display of the present invention.

FIG. 52 shows a configuration of a data permutation circuit 44 (see FIGS. 47-50) used in the liquid crystal display of the present invention. As shown in FIG. 52, the data permutation circuit 44 includes a permutation control circuit 61, a first line memory 51A and a second line memory 51B. The permutation control circuit 61 serializes parallel input data corresponding to two lines (two pixel rows) using input signals Dv, HSY, VSY, and Dc, and considers the serialized data as output data corresponding to one horizontal scanning period (1H). For example, the permutation control circuit 61 temporarily writes individual data corresponding to an odd-number-positioned pixel row in the first line memory 51A, and temporarily writes individual data corresponding to a next row (even-number-positioned pixel row) in the second line memory 51B, and reads out data alternately from the first line memory 51A and the second line memory 51B, thereby serializing parallel input data corresponding to two lines (two pixel rows). Data which are read out alternately from the first line memory 51A and the second line memory 51B correspond to signal potentials supplied to first and second data signal lines.

Figure 53:
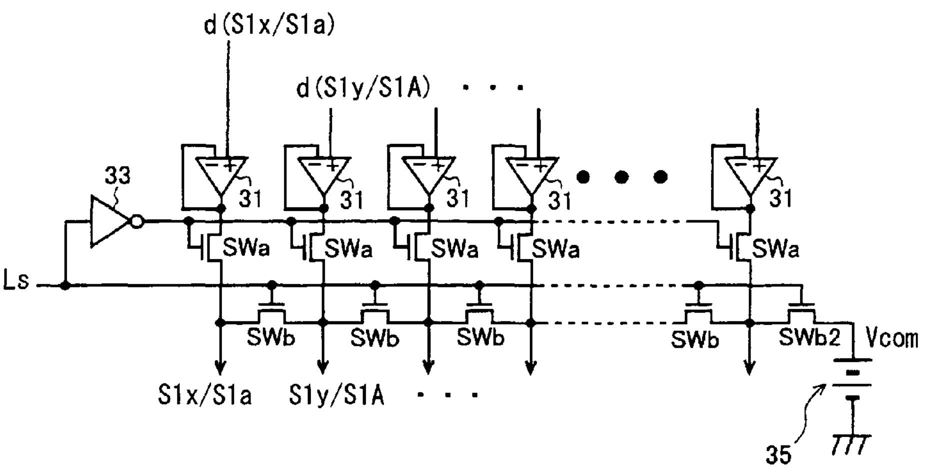
FIG. 53 (*a*) and (*b*) of FIG. 53 are block diagrams each showing a source driver in a case where refresh drive is performed in a liquid crystal display of the present invention.
Figure 53:
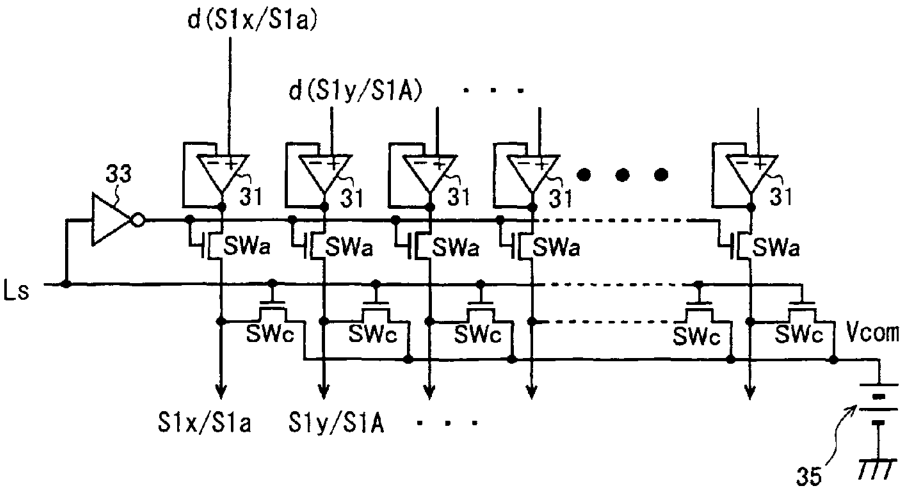

(*a*) and (*b*) of FIG. 53 show a configuration of a source driver in a case where a refresh period is provided in the liquid crystal display of the present invention. As shown in (*a*) of FIG. 53, the source driver includes buffers 31, data output switches SWa, and refresh switches SWb corresponding to individual data signal lines. Each of the buffers 31 receives corresponding data d, and an output of the buffer 31 is connected with an output terminal to a data signal line via a data output switch SWa. Further, output terminals respectively corresponding to adjacent two data signal lines are connected with each other via a refresh switch SWb. That is, the refresh switches SWb are connected in series, and one terminal thereof is connected with a refresh potential supply source 35 (Vcom). LS (latch strobe signal) is supplied to a gate terminal of a data output switch SWa via an inverter 33, and an LS signal is supplied to a gate terminal of a refresh switch SWb. This configuration is preferably used in a case where charge sharing of a refresh potential is relatively easy (in a case of using the display section 10A-10D, 10*b*, 10*f* or the like in which adjacent data signal lines do not have the same polarity).

The configuration shown in (*a*) of FIG. 53 may be arranged as shown in (*b*) of FIG. 53. The arranged configuration is such that refresh switches SWc are connected with only corresponding data signal lines and a refresh potential supply source 35 (Vcom), and the refresh switches SWc are not connected with one another in series. This configuration allows speedily supplying a refresh potential to individual data signal lines. This configuration is preferably used in a case where charge sharing of a refresh potential is relatively difficult (in a case of using the display section 10E, 10F, 10*a*, 10*e*, 10*k* or the like in which adjacent data signal lines have the same polarity).

Figure 54:
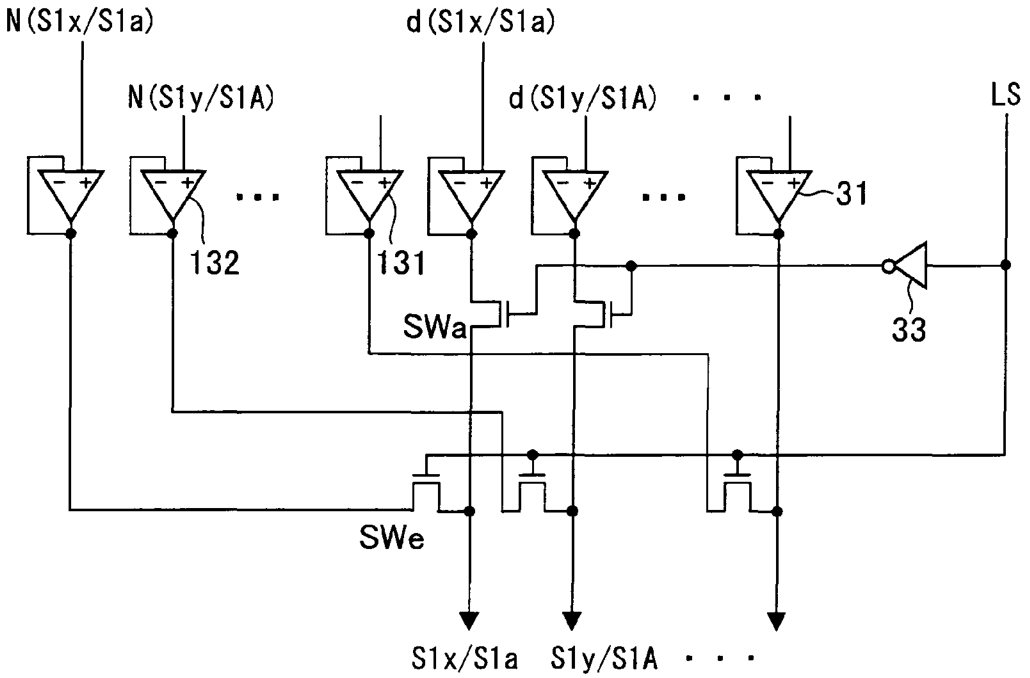
FIG. 54 is a block diagram showing another source driver in a case where refresh drive is performed in a liquid crystal display of the present invention.

In the above embodiments, an explanation was made as to a case where a refresh potential is Vcom. However, the present invention is not limited to this case. For example, the present invention may be arranged such that a suitable refresh potential is calculated based on the level of a signal potential supplied to a data signal line during the previous horizontal scanning period and a signal potential to be supplied to the data signal line during a current horizontal scanning period, and the refresh potential thus calculated is supplied to the data signal line. The configuration of the source driver in this case is shown in FIG. 54. In this configuration, data output buffers 131, refresh buffers 132, data output switches SWa, and refresh switches SWe are provided in such a manner as to correspond to individual data signal lines. Each of the data output buffers 131 receives corresponding data d, and an output of the data output buffer 131 is connected with an output terminal to a data signal line via a data output switch SWa. To the refresh buffer 132 is supplied corresponding non-image data N (data corresponding to a suitable refresh potential determined based on the level of a signal potential supplied during the previous horizontal scanning period and a signal potential to be supplied during a current horizontal scanning period), and an output of the refresh buffer 132 is connected with an output terminal to a data signal line via the refresh switch SWe.

In the present embodiment, for example, the potential of a retention capacitance line is controlled in response to a retention capacitance line signal supplied to the retention capacitance line. In this case, the above explanation may be interpreted that the potential (level) of a retention capacitance line indicates the potential (level) of a retention capacitance line signal supplied to the retention capacitance line.

Further, “the polarity of a potential” indicates being not more than a reference potential or being not less than a reference potential. Plus polarity indicates being not less than a reference potential, and minus polarity indicates being not more than a reference potential. The reference potential may be Vcom (common potential) that is a potential of a common electrode (counter electrode) or any other potential.

Further, “inversion of the polarity of a potential” indicates shifting from the level of not more than a reference potential to the level of not less than the reference potential, or shifting from the level of not less than a reference potential to the level of not more than the reference potential. As described above, the reference potential may be Vcom (common potential) that is a potential of a common electrode (counter electrode) or any other potential. Accordingly, “inversion of a potential (inversion of the polarity of a potential)” may be interpreted as “shift of the level of a potential”.

Figure 56:
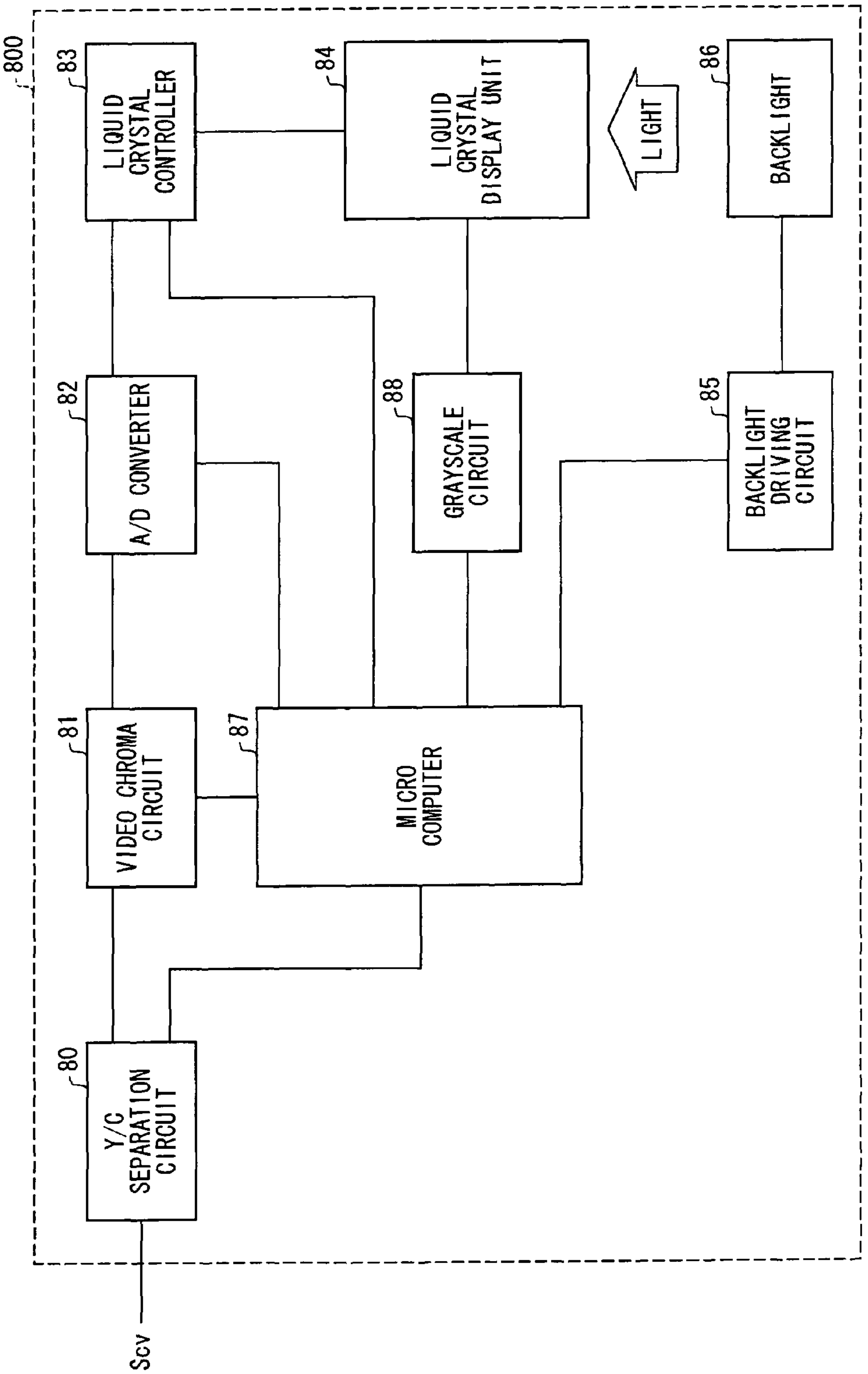
FIG. 56 is a block diagram explaining an operation of a liquid crystal display of the present invention.

Next, the following explains one example of configuration of applying the liquid crystal display according to the present invention to a television receiver. FIG. 56 is a block diagram showing a configuration of a liquid crystal display 800 for a television receiver. The liquid crystal display 800 includes a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 88. The liquid crystal panel 84 includes: a liquid crystal panel; and a source driver and a gate driver each for driving the liquid crystal panel.

In the liquid crystal display 800 having the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to analog RGB signals corresponding to three primary colors of light in the video chroma circuit 81. Further, the analog RGB signals are converted to digital RGB signals by the A/D converter 82. The digital RGB signals are inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

The liquid crystal display unit 84 receives, from the liquid crystal controller 83, the digital RGB signals as well as timing signals based on the sync signals with predetermined timing. Further, the gradation circuit 88 generates gradation potentials corresponding to three primary colors R, G, and B for color display, and supplies the gradation potentials to the liquid crystal display unit 84. In the liquid crystal display unit 84, drive signals (data signals=signal potentials, scanning signals etc.) are generated by source driver, gate driver etc. in accordance with the RGB signals, the timing signals, and the gradation potentials, and a color image is displayed by a liquid crystal panel. In order to enable the liquid crystal display unit 84 to display an image, it is necessary to emit light from the backside of the liquid crystal panel in the liquid crystal display unit. In the liquid crystal display 800, under control of the microcomputer 87, the backlight drive circuit 85 drives the backlight 86 so as to emit light to the backside of the liquid crystal panel.

Control of the whole system, including the aforementioned processes is carried out by the microcomputer 87. As the video signal (complex color video signal) inputted from the outside, not only a video signal in accordance with television broadcast but also a video signal picked up by a camera or supplied via the Internet line is also usable. In the liquid crystal display 800, image display in accordance with various video signals can be performed.

Figure 57:
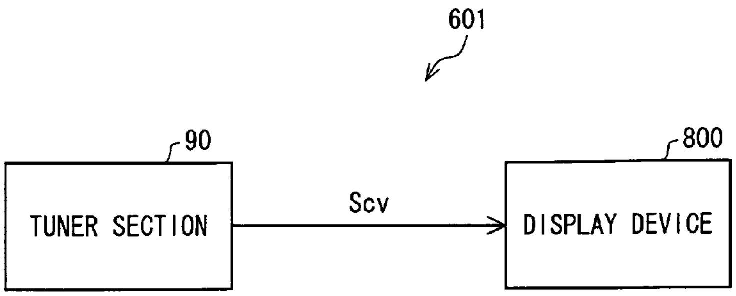
FIG. 57 is a block diagram explaining an operation of a television receiver of the present invention.

In displaying an image by the liquid crystal display 800 in accordance with television broadcast, a tuner section 90 is connected to the liquid crystal display 800 as shown in FIG. 57, and thus a television receiver 601 of the present invention is provided. The tuner section 90 extracts a channel signal to be received from waves (high-frequency signals) received by an antenna (not shown), and converts the channel signal to an intermediate frequency signal. The tuner section 90 detects the intermediate frequency signal, thereby extracting the complex color video signal Scv as the television signal. The complex color video signal Scv is inputted to the liquid crystal display 800 as described above and an image is displayed by the liquid crystal display 800 in accordance with the complex color video signal Scv.

Figure 58:
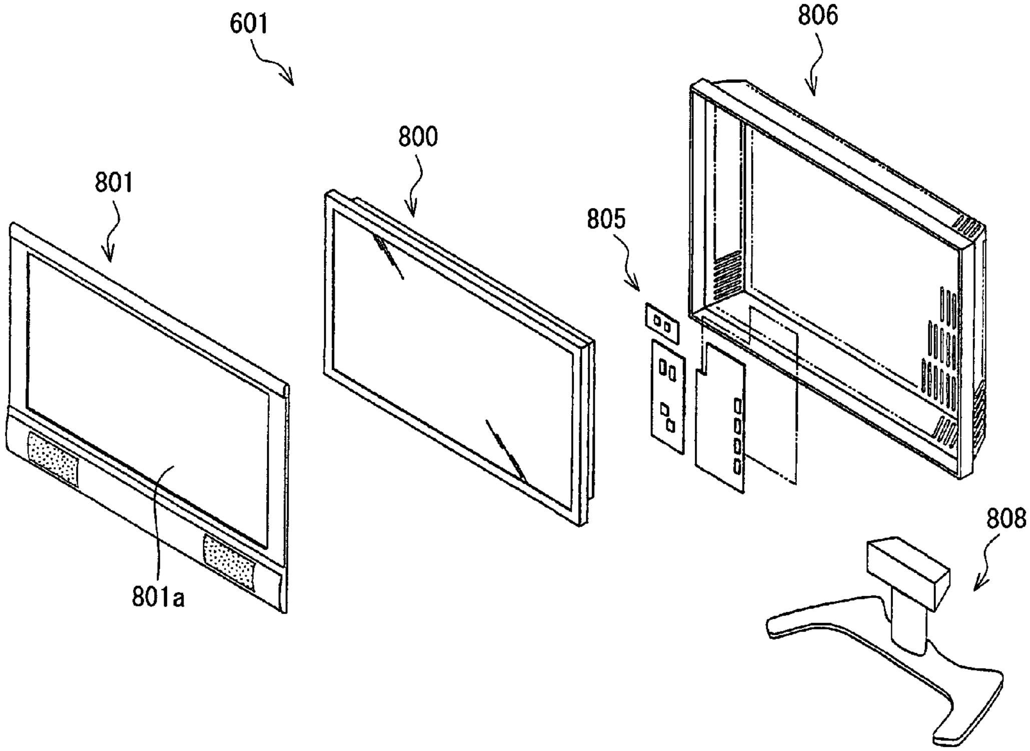
FIG. 58 is an exploded perspective drawing showing a configuration of the television receiver of the present invention.

FIG. 58 is an exploded perspective view showing one example of configuration of the television receiver of the present invention. As shown in the drawing, the television receiver 601 includes, as components thereof, a first housing 801 and a second housing 806 in addition to the liquid crystal display 800. The liquid crystal display 800 is arranged such that the first and second housings 801 and 806 hold the liquid crystal display 800 so as to wrap therein the liquid crystal display 800. The first housing 801 has an opening 801*a* for transmitting an image displayed on a liquid crystal display 800. On the other hand, the second housing 806 covers a back side of the liquid crystal display 800. The second housing 806 is provided with an operating circuit 805 for operating the liquid crystal display 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The liquid crystal panel and the liquid crystal display of the present invention are preferably applicable to a liquid crystal television receiver for example.

The invention claimed is:

1. A liquid crystal display, having pixels aligned in a row direction and a column direction, the row direction being a direction in which scanning signal lines are extended, the liquid crystal display comprising pixel columns, first data signal lines, and second data signal lines, a first data signal line and a second data signal line being provided for each pixel column, each pixel included in the pixel column being connected with a scanning signal line, in a case where every two pixels in the pixel column are paired, one of two pixels in each pair being connected with the first data signal line and the other of the two pixels being connected with the second data signal line, two scanning signal lines respectively connected with two pixels in a pair being simultaneously selected during one horizontal scanning period so that signal potentials are written into the two pixels in a pair from the first data signal line and the second data signal line, respectively, during each horizontal scanning period, supply of the signal potentials to the first data signal line and the second data signal line being performed after supply of preliminary potentials to the first data signal line and the second data signal line, wherein the preliminary potential is based on a signal potential supplied to a data signal line during a previous horizontal scanning period and a signal potential to be supplied to the data signal line during a current horizontal scanning period, and the preliminary potential is represented by, $$Vr=Vq+\{(Vq-V\mathrm{com})-(Vp-V\mathrm{com})\}/2,$$

Vr represents the preliminary potential, Vp represents a signal potential supplied to a data signal line during a previous horizontal scanning period, Vq represents a signal potential supplied to the data signal line during a current horizontal scanning period, and Vcom represents a common electrode potential.

2. The liquid crystal display as set forth in claim 1, wherein a polarity of the signal potential is inverted with respect to one horizontal scanning period.

3. The liquid crystal display as set forth in claim 1, wherein a polarity of the signal potential is inverted with respect to n (n is an integer of two or more) scanning periods.

4. The liquid crystal display as set forth in claim 1, wherein a polarity of the signal potential is inverted with respect to one vertical scanning period.

5. The liquid crystal display as set forth in claim 1, wherein an intermediate selection period is provided between scanning periods for a scanning signal line in accordance with timing of supplying the preliminary potential, and the preliminary potential is written in a pixel connected with the scanning signal line during the intermediate selection period.

6. The liquid crystal display as set forth in claim 2, wherein signal potentials with opposite polarities are supplied to the first data signal line and the second data signal line, respectively, in a case where a first pixel in the pixel column is regarded as a first-positioned pixel from which counting of pixel starts, an odd-number-positioned pixel and an even-number-positioned pixel are paired, and each pair is given a count number, an odd-number-positioned pixel in one of two pairs with successive count numbers and an odd-number-positioned pixel in the other of the two pairs with successive count numbers are connected with different data signal lines, a pair is selected according to the count number, and scanning signal lines respectively connected with two pixels in the selected pair are simultaneously selected.

7. The liquid crystal display as set forth in claim 6, wherein two pixels in each pair are adjacent to each other, the first pixel in the pixel column is regarded as a first-positioned pixel from which counting of a pixel starts, each pixel other than 2×i+1st (i is a natural number) pixel and its upstream-adjacent pixel are connected with different data signal lines and the 2×i+1st pixel and its upstream-adjacent pixel are connected with a same data signal line, and the scanning signal lines are sequentially selected with starting from a scanning signal line connected with the first pixel in such a manner that adjacent two scanning signal lines are selected simultaneously.

8. The liquid crystal display as set forth in claim 3, wherein signal potentials with opposite polarities are supplied to the first data signal line and the second data signal line, respectively, in a case where a first pixel in the pixel column is regarded as a first-positioned pixel from which counting of pixel starts, an odd-number-positioned pixel and an even-number-positioned pixel counted in a scanning direction are paired, n (n is an integer of two or more) pairs are regarded as a group, and each group is given a count number, each group is configured such that two pixels in each pair are connected with different signal lines and when n is two or more, each odd-number-positioned pixel is connected with one data signal line, and in two groups with successive count numbers, an odd-number-positioned pixel in one group and an odd-number-positioned pixel in the other group being connected with different data signal lines, a group is selected according to the count number, in the selected group, simultaneous selection of scanning signal lines respectively connected with two pixels in a pair is performed, and the simultaneous selection is performed sequentially with respect to each pair.

9. The liquid crystal display as set forth in claim 8, wherein the first pixel is regarded as a first-positioned pixel from which counting of a pixel starts, each pixel other than 2×n×i+1st pixel counted in a scanning direction and its upstream-adjacent pixel of the pixel are connected with different data signal lines and the 2×n×i+1st pixel and its upstream-adjacent pixel are connected with a same data signal line, and the scanning signal lines are sequentially selected from a scanning signal line connected with the first pixel in such a manner that adjacent two scanning signal lines are selected simultaneously.

10. The liquid crystal display as set forth in claim 4, wherein signal potentials with opposite polarities are supplied to the first data signal line and the second data signal line, respectively, in a case where a first pixel in the pixel column is regarded as a first-positioned pixel from which counting of pixel starts, an odd-number-positioned pixel and an even-number-positioned pixel counted in a scanning direction are paired, and each pair is given a count number, two pixels in each pair are connected with different data signal lines, in two pairs with successive count numbers, an odd-number-positioned pixel in one of the two pairs and an odd-number-positioned pixel in the other of the two pairs are connected with a same data signal line, a pair is selected according to the count number, and scanning signal lines respectively connected with two pixels in the selected pair are selected simultaneously.

11. The liquid crystal display as set forth in claim 10, wherein the pixels in a pair are adjacent to each other, each pixel provided at downstream of the scanning direction from the first pixel and a pixel which is upstream-adjacent of the pixel are connected with different data signal lines, the scanning signal lines are sequentially selected from a scanning signal line connected with the first pixel in such a manner that adjacent two scanning signal lines are selected simultaneously.

12. The liquid crystal display as set forth in claim 6, wherein pixels in one pixel row are connected with a same scanning signal line, a first data signal line for one of adjacent two pixel columns and a first data signal line for the other of the adjacent two pixel columns are supplied with a signal potential with a same polarity, and connections with a first data signal line and a second data signal line are made oppositely between pixels adjacent in a row direction.

13. The liquid crystal display as set forth in claim 6, wherein a first data signal line and a second data signal line for a pixel column are provided at both sides of the pixel column, and a first data signal line for one of adjacent two pixel columns and a first data signal line for the other of the adjacent two pixel columns are adjacent to each other without a pixel column therebetween or a second data signal line for one of adjacent two pixel columns and a second data signal line for the other of the adjacent two pixel columns are adjacent to each other without a pixel column therebetween.

14. The liquid crystal display as set forth in claim 6, wherein a first data signal line and a second data signal line for a pixel column are provided at both sides of the pixel column, and a first data signal line for one of adjacent two pixel columns and a second data signal line for the other of the adjacent two pixel columns are adjacent to each other without a pixel column therebetween or a second data signal line for one of adjacent two pixel columns and a first data signal line for the other of the adjacent two pixel columns are adjacent to each other without a pixel column therebetween.

15. The liquid crystal display as set forth in claim 2, wherein signal potentials with a same polarity are supplied to the first data signal line and the second data signal line, respectively, in a case where a first pixel in the pixel column is regarded as a first-positioned pixel from which counting of pixel starts, two odd-number-positioned pixels counted in a scanning direction are paired and two even-number-positioned pixels counted in the scanning direction are paired, and a pair consisting of two odd-number-positioned pixels and a pair consisting of two even-number-positioned pixels are alternately given a count number, two pixels in each pair are connected with different data signal lines, and a pair is selected according to the count number, and scanning signal lines respectively connected with two pixels in the selected pair are selected simultaneously.

16. The liquid crystal display as set forth in claim 3, wherein signal potentials with a same polarity are supplied to the first data signal line and the second data signal line, respectively, in a case where first pixel in the pixel column is regarded as a first-positioned pixel from which counting of pixel starts, two odd-number-positioned pixels counted in a scanning direction are paired and two even-number-positioned pixels counted in the scanning direction are paired, and a group including n pairs each consisting of two odd-number-positioned pixels and a group including n pairs each consisting of two even-number-positioned pixels are alternately given a count number, two pixels in each pair are connected with different data signal lines, and a group is selected according to the count number, in the selected group, scanning signal lines respectively connected with two pixels in a pair are selected simultaneously, and the simultaneous selection is performed sequentially with respect to each pair.

17. The liquid crystal display as set forth in claim 15, wherein a polarity of a signal potential supplied to a first data signal line and a second data signal line for one of adjacent two pixel columns is different from a polarity of a signal potential supplied to a first data signal line and a second data signal line for the other of the adjacent two pixel columns.

18. The liquid crystal display as set forth in claim 1, wherein there are provided a plurality of retention capacitance lines whose potentials are controllable, the pixel includes a first transistor, a second transistor, a first pixel electrode, and a second pixel electrode, the first pixel electrode and the second pixel electrode are connected with a same data signal line via the first transistor and the second transistor, respectively, the first transistor and the second transistor are connected with the scanning signal line, and the first pixel electrode and the second pixel electrode form retention capacitances with different retention capacitance lines, respectively.

19. The liquid crystal display as set forth in claim 18, wherein a retention capacitance line is provided for two pixels adjacent in a column direction, and a first pixel electrode or a second pixel electrode provided in one of the two pixels and a first pixel electrode or a second pixel electrode provided in the other of the two pixels form retention capacitances with the retention capacitance line.

20. The liquid crystal display as set forth in claim 1, wherein the first data signal line and the second data signal line are supplied with signal potentials with opposite polarities, respectively.

21. The liquid crystal display as set forth in claim 1, wherein the first data signal line and the second data signal line are supplied with signal potentials with a same polarity, respectively, and a polarity of a signal potential supplied to a first data signal line and a second data signal line for one of adjacent two pixel columns is different from a polarity of a signal potential supplied to a first data signal line and a second data signal line for the other of the adjacent two pixel columns.

22. The liquid crystal display as set forth in claim 1, wherein one of the first data signal line and the second data signal line is provided at one side of the pixel column and the other of the first data signal line and the second data signal line is provided in such a manner as to overlap the pixel column.

23. The liquid crystal display as set forth in claim 1, wherein the simultaneously selected scanning signal lines are connected in a liquid crystal panel or connected with a same output terminal of a gate driver for driving the scanning signal lines.

24. The liquid crystal display as set forth in claim 1, wherein a display section includes a plurality of domains, and each of the plurality of domains includes data signal lines, scanning signal lines, and pixels, and the data signal lines, scanning signal lines, and the pixels included in each domain are driven with respect to said each domain.

25. The liquid crystal display as set forth in claim 1, wherein the number of frames displayed per one second is more than 60.

26. The liquid crystal display as set forth in claim 1, wherein a period for supplying a preliminary potential is 90 to 100% with respect to a time constant of the data signal lines.

27. A television receiver, comprising a liquid crystal display as set forth in claim 1, and a tuner section for receiving television broadcasting.

28. The liquid crystal display as set forth in claim 16, wherein a polarity of a signal potential supplied to a first data signal line and a second data signal line for one of adjacent two pixel columns is different from a polarity of a signal potential supplied to a first data signal line and a second data signal line for the other of the adjacent two pixel columns.

* * * * *